US012568927B1

(12) United States Patent
Bickel et al.

(10) Patent No.: US 12,568,927 B1
(45) Date of Patent: Mar. 10, 2026

(54) COLLAPSIBLE FOLDING WAGON

(71) Applicant: Carlson Pet Products, Inc., Burnsville, MN (US)

(72) Inventors: Shannon R. Bickel, Lakeville, MN (US); Daniel J. Folk, Hammond, WI (US)

(73) Assignee: Carlson Pet Products, Inc., Burnsville, MN (US)

( * ) Notice: Subject to any disclaimer, the term of this patent is extended or adjusted under 35 U.S.C. 154(b) by 306 days.

(21) Appl. No.: 18/513,555

(22) Filed: Nov. 18, 2023

Related U.S. Application Data

(60) Provisional application No. 63/427,076, filed on Nov. 21, 2022.

(51) Int. Cl.
| | |
|---|---|
| *B62B 3/02* | (2006.01) |
| *A01K 1/02* | (2006.01) |
| *B62B 5/04* | (2006.01) |
| *B62B 3/04* | (2006.01) |
| *B62B 5/06* | (2006.01) |

(52) U.S. Cl.
CPC .............. *A01K 1/0236* (2013.01); *B62B 3/02* (2013.01); *B62B 5/0433* (2013.01); *B62B 3/04* (2013.01); *B62B 5/065* (2013.01)

(58) Field of Classification Search
CPC .......... A01K 1/0236; A01K 1/02; B62B 3/02; B62B 5/0433; B62B 3/04; B62B 5/065; B62B 2205/06; B62B 3/007; B62B 2202/42
USPC ....................................................... 280/651
See application file for complete search history.

(56) References Cited

PUBLICATIONS

The Best Collapsible Folding Wagon, by Katharine Gammon, www.nytimes.com [online], Published Jun. 23, 2022 [retrieved on Nov. 9, 2022], Retrieved from the Internet: <URL: https://www.nytimes.com/wirecutter/reviews/best-folding-Wagons/> (Year: 2022).

*Primary Examiner* — James A Shriver, II
*Assistant Examiner* — Hilary L Johns

(57) ABSTRACT

The present collapsible folding wagon includes a frame that folds. The frame includes right side oblique support members that pivot relative to each other at a right side pivot location and left side oblique support members that pivot relative to each other at a left side pivot location. The right side and left side pivot locations are equidistant from a front end of the frame and a rear end of the frame. A U-shaped handle is pivotally engaged at the right and left side locations and may swing over the wagon from a pull or push position at the front of the wagon to a pull or push position at the rear of the wagon.

15 Claims, 50 Drawing Sheets

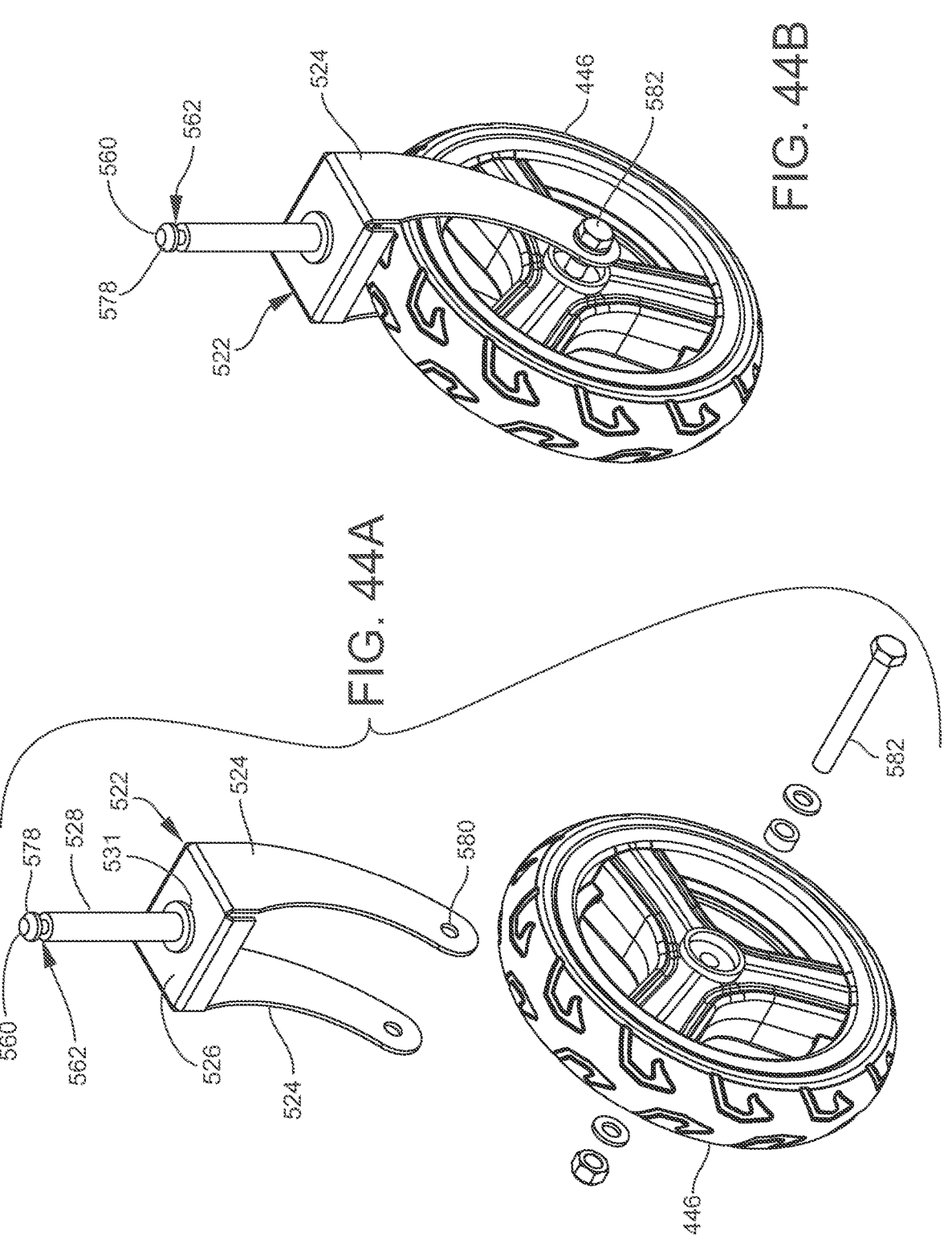

COLLAPSIBLE FOLDING WAGON

This application claims the benefit under 35 U.S.C. 119(e) of U.S. Provisional Patent Application No. 63/427,076 filed Nov. 21, 2022, which application is hereby incorporated by reference in its entirety into this application.

FIELD OF THE INVENTION

The present invention relates to a wagon with four wheels and more particularly to a collapsible folding wagon with four wheels.

BACKGROUND OF THE INVENTION

A wagon has four wheels. The four wheels make the wagon stable. A cart is not a wagon. A cart has two wheels. A wheelbarrow is not a wagon. A wheelbarrow has one wheel.

A conventional wagon has a handle engaged to the front end of the wagon. The handle extends frontwardly. Using the handle, the wagon may be pulled in a forward direction. Using the handle, the wagon may be pushed in a rearward direction.

SUMMARY OF THE INVENTION

A feature of the present invention is a wagon.

Another feature of the present invention is a foldable wagon.

Another feature of the present invention is the provision in a foldable wagon, of a frame that includes a folded out configuration and a folded in configuration, where the foldable wagon is operable in the folded out configuration, and where the foldable wagon is in a compact state in the folded in configuration.

Another feature of the present invention is the provision in a foldable wagon, of the frame of the foldable wagon having front end support members, rear end support members, right side support members, left side support members, front corner support members, rear corner support members, and bottom support members.

Another feature of the present invention is the provision in a foldable wagon, of the frame of the foldable wagon having a first pivot location where right side support members are pivotally engaged and a second pivot location where the left side support members are pivotally engaged, where the first pivot location is about one-half a distance between one of the front end support members and one of the rear end support members and where the second pivot location is about one-half the distance between one of the front end support members and one of the rear end support members.

Another feature of the present invention is the provision in a foldable wagon, of a receptacle engaged to the frame of the foldable wagon, where the receptacle is between the front end and rear end support members when the frame is in the folded out configuration, where the receptacle is between the right side and left side support members when the frame is in the folded out configuration, and where the receptacle is on or above the bottom support members when the frame is in the folded out configuration.

Another feature of the present invention is the provision in a foldable wagon, of the receptacle of the foldable wagon being flexible such that the receptacle remains engaged to the frame when the frame is folded out to the folded out configuration from the folded in configuration and such that the receptacle remains engaged to the frame when the frame is folded in to the folded in configuration from the folded out configuration.

Another feature of the present invention is the provision in a foldable wagon, of a handle engaged to the frame of the foldable wagon, where the handle includes first, second, and third handle support members, where the third handle support member extends between the first and second handle support members, where the first handle support member is pivotally engaged to the frame at the first pivot location, and where the second handle support member is pivotally engaged to the frame at the second pivot location.

Another feature of the present invention is the provision in a foldable wagon, of the first handle support member including a first elongate section, a second elongate section, and a first pivot connection, where the first and second elongate sections of the first handle support member are engaged by the first pivot connection, where the first and second elongate sections of the first handle support member extend away from the first pivot connection, where the first elongate section of the first handle support member engages the third handle support member, and where the second elongate section of the first handle support member is pivotally engaged to the frame.

Another feature of the present invention is the provision in a foldable wagon, of the second handle support member including a first elongate section, a second elongate section, and a second pivot connection, where the first and second elongate sections of the second handle support member are engaged by the second pivot connection, where the first and second elongate sections of the second handle support member extend away from the second pivot connection, where the first elongate section of the second handle support member engages the third handle support member, and where the second elongate section of the second handle support member is pivotally engaged to the frame.

Another feature of the present invention is the provision in a foldable wagon, of each of the first and second pivot connections being equidistance from the third handle support member such that the first elongate sections of the first and second handle support member may be pivoted as a unit relative to the second elongate sections of the first and second handle support members.

Another feature of the present invention is the provision in a foldable wagon, of each of the first elongate sections of the first and second handle support members including an underside and where each of the second elongate sections of the first and second handle support members includes an underside, and where the first elongate sections are pivotable as a unit about the first and second pivot connections such that the undersides of the first elongate sections can be drawn adjacent to the undersides of the second elongate sections.

Another feature of the present invention is the provision in a foldable wagon, of the second elongate section of the first handle support member including a first pivot opening for a first pivot pin for the first pivot location.

Another feature of the present invention is the provision in a foldable wagon, of the second elongate section of the second handle support member including a second pivot opening for a second pivot pin for the second pivot location.

Another feature of the present invention is the provision in a foldable wagon, of the second elongate section of the first handle support member including a first set of at least two button openings, where the first set of button openings is between the first pivot opening and the connection.

Another feature of the present invention is the provision in a foldable wagon, of the second elongate section of the second handle support member including a second set of at least two button openings, where the second set of button openings is between the second pivot opening and the connection.

Another feature of the present invention is the provision in a foldable wagon, of each of the second elongate sections including first and second portions that telescope relative to each other, where one of the first and second portions includes the button openings and the other of the first and second portions includes a spring biased button engagable in the button openings to fix the first and second portions relative to each other such that each of the first and second handle support members can be extendible in length.

Another feature of the present invention is the provision in a foldable wagon, of first and second handle rests, where the first handle rest is engaged to a right side support member of the frame, where the second handle rest is engaged to a left side support member of the frame, where the first handle rest extends outwardly from the right side support member of the frame, and where the second handle rest extends outwardly from the left side support member of the frame.

Another feature of the present invention is the provision in a foldable wagon, of the first handle rest being disposed at a location that is higher than the first pivot location, and where the second handle rest is disposed at a location that is higher than the second pivot location.

Another feature of the present invention is the provision in a foldable wagon, of the first handle support member being engagable on the first handle rest and is disposed at an oblique angle when the frame is in the folded out configuration, and the second handle support member being engagable on the second handle rest and is disposed at an oblique angle when the frame is in the folded out configuration.

Another feature of the present invention is the provision in a foldable wagon, of the first handle support member being engaged to the frame outwardly of the right side support members such that the first handle support member is disposed outwardly of the frame, and where the second handle support member is engaged to the frame outwardly of the left side support members such that the second handle support member is disposed outwardly of the frame.

Another feature of the present invention is the provision in a foldable wagon, of first and second fork arrangements depending respectively from first and second front corner support members.

Another feature of the present invention is the provision in a foldable wagon, of a pair of first and second front wheels, where the first and second front wheels are engaged to the first and second fork arrangements respectively, and where each of the first and second front wheels is independently spinnable about a vertical axis.

Another feature of the present invention is the provision in a foldable wagon, of the first and second receivers depending respectively from first and second rear corner support members and engaging therein the first and second rear corner support members.

Another feature of the present invention is the provision in a foldable wagon, of an axle engaging the first and second receivers and having first and second end portions.

Another feature of the present invention is the provision in a foldable wagon, of a first rear wheel rotatably engaged on the first end portion of the axle and a second rear wheel rotatably engaged on the second end portion of the axle, where a first receptor extends inwardly from the first rear wheel and a second receptor extends inwardly from the second rear wheel, where the first receptor is rigidly fixed to the first rear wheel and rotates therewith, and where the second receptor is rigidly fixed to the second rear wheel and rotates therewith.

Another feature of the present invention is the provision in a foldable wagon, of the first and second pedals being pivotally engaged to the first and second receivers, where each of the first and second pedals includes a proximal end and a distal end, where an elongate member is engaged to and extends between the distal ends of the first and second pedals, and where each of the distal ends includes an outwardly extending extension.

Another feature of the present invention is the provision in a foldable wagon, of the steps when the elongate member is stepped upon the distal ends of the pedals are pivoted downwardly, so as to pivot the proximal ends of the pedals upwardly, such that the outwardly extending extensions of the pedals engage the first and second receptors that extend inwardly from the first and second rear wheels so as to brake or lock the pet wagon.

Another feature of the present invention is the provision in a foldable wagon, of a first front corner support member and a first rear corner support member defining a first plane, where a second front corner support member and a second rear corner support member define a second plane, where a vertical axis about which the first front wheel is spinnable is in the first plane, where a vertical axis about which the second front wheel is spinnable is in the second plane, where the first rear wheel rotates in a third plane that is disposed outwardly of the first plane, and where the second rear wheel rotates in a fourth plane that is disposed outwardly of the second plane.

Another feature of the present invention is the provision in a foldable wagon, of the bottom support members defining a plane, where the first and second front corner support members engage first and second fork arrangements at a location adjacent to the plane, and where the first and second rear corner support members engage the first and second receivers at a location below and spaced from the plane.

Another feature of the present invention is the provision in a foldable wagon, of top portions of the first and second front wheels and top portions of the first and second rear wheels define a plane, where first and second front corner support members engage the first and second fork arrangements at respective locations above and spaced from the plane, and where the first and second rear corner support members engage the first and second receivers at respective locations below and spaced from the plane.

Another feature of the present invention is the provision in a foldable wagon, of a frame including first and second front corner posts.

Another feature of the present invention is the provision in a foldable wagon, of a frame including first and second rear corner posts.

Another feature of the present invention is the provision in a foldable wagon, of a frame including a lower front support member engaged to the first and second front corner posts.

Another feature of the present invention is the provision in a foldable wagon, of a frame including a lower rear support member engaged to the first and second rear corner posts.

Another feature of the present invention is the provision in a foldable wagon, of a frame including a front U-shaped support member engaged to the first and second front corner posts and extending rearwardly therefrom, where the front U-shaped support member includes first and second rear ends.

Another feature of the present invention is the provision in a foldable wagon, of a frame including a rear U-shaped support member engaged to the first and second rear corner posts and extending frontwardly therefrom, where the rear U-shaped support member includes first and second front ends.

Another feature of the present invention is the provision in a foldable wagon, of a frame including a first oblique support member having front and rear ends, where the front end of the first oblique support member is pivotally engaged to the first rear end of the front U-shaped support member, and where the rear end of the first oblique support member is pivotally engaged to the lower rear support member.

Another feature of the present invention is the provision in a foldable wagon, of a frame including a second oblique support member having front and rear ends, where the front end of the second oblique support member is pivotally engaged to the second rear end of the front U-shaped support member, and where the rear end of the second oblique support member is pivotally engaged to the lower rear support member.

Another feature of the present invention is the provision in a foldable wagon, of a frame including a third oblique support member having front and rear ends, where the rear end of the third oblique support member is pivotally engaged to the first front end of the rear U-shaped support member, and where the front end of the third oblique support member is pivotally engaged to the lower front support member.

Another feature of the present invention is the provision in a foldable wagon, of a frame including a fourth oblique support member having front and rear ends, where the rear end of the fourth oblique support member is pivotally engaged to the second front end of the rear U-shaped support member, and where the front end of the fourth oblique support member is pivotally engaged to the lower front support member.

Another feature of the present invention is the provision in a foldable wagon, of a frame including the first and third oblique support members being pivotally engaged at a first pivot location.

Another feature of the present invention is the provision in a foldable wagon, of a frame including the second and fourth oblique support members being pivotally engaged at a second pivot location.

Another feature of the present invention is the provision in a foldable wagon, of a frame including a support base, where the support base includes a first base support member pivotally engaged to the lower front support member, a second base support member pivotally engaged to the lower front support member, a third base support member pivotally engaged to the lower rear support member and being pivotally engaged to the first base support member, and a fourth base support member pivotally engaged to the lower rear support member and being pivotally engaged to the third base support member.

Another feature of the present invention is the provision in a foldable wagon, of the support base including first and second front transverse support members extending to and between the first and second base support members.

Another feature of the present invention is the provision in a foldable wagon, of the support base including first and second rear transverse support members extending to and between the third and fourth base support members.

An advantage of the present invention is that the wagon may be pulled or pushed from the front end with a handle and pulled or pushed from the rear end with the same handle.

Another advantage of the present invention is that it is simple and easy and quick to change the position of the handle from the front end of the wagon to the rear end of the wagon.

Another advantage of the present invention is that the pivot axis for changing the handle from pulling the wagon front end to pulling the wagon rear end is at a mid-point of the frame of the wagon.

Another advantage of the present invention is that the handle may pivot over a receptacle of the wagon with or without the receptacle of the wagon having a canopy.

Another advantage of the present invention is that the handle may be engaged by a cradle to prevent the handle from pivoting to the ground.

Another advantage of the present invention is that, even when the handle is engaged by the cradle, the handle may be pulled to transmit force to the wagon to pull the wagon.

Another advantage of the present invention is that, even when the handle is not engaged by the cradle, the handle may be pulled to transmit force to the wagon to pull the wagon.

Another advantage of the present invention is that the portion of the handle having a handle grip may be set at an angle relative to the portion of the handle that is engaged to the frame to customize a feel for the user of the wagon.

Another advantage of the present invention is that the portion of the handle having a handle grip may be set at an angle relative to the portion of the handle that is pivotally engaged to the frame to further customize a feel for the user of the wagon.

Another advantage of the present invention is that the portion of the handle having a handle grip may be set at an angle relative to the portion of the handle that is pivotally and telescopically engaged to the frame.

Another advantage of the present invention is that an easy to use connection provides for setting at an angle the portion of the handle having a handle grip relative to the portion of the handle that is engaged to the frame.

Another advantage of the present invention is that the easy to use connection is easy to loosen to permit the pivoting of the handle grip handle portion relative to the portion of the handle that is engaged to the frame.

Another advantage of the present invention is that the easy to use connection is easy to tighten to fix at a desired angle the handle grip portion relative to the portion of the handle that is engaged to the frame.

Another advantage of the present invention is that the handle includes first and second pivot axes, where the first pivot axis permits the handle grip portion to be pivotally adjusted relative to the handle portion that is engaged to the frame, and where the second pivot axis permits the handle portion that is engaged to the frame to pivot relative to the frame.

Another advantage of the present invention is that the handle may be doubled back on itself to attain a compact form for storage or transport. In other words, the handle grip portion of the handle may be pivoted about the easy to use connection such that the length of the handle grip portion may pivoted to be adjacent to the length of the portion of the handle that is engaged to the frame.

Another advantage of the present invention is that the wagon is collapsible, with the receptacle engaged, to a compact form for storage or transport and is expandable, with the receptacle engaged, from such a compact form to an open and operating form for use. One feature that contributes to this advantage is the provision, outwardly of and adjacent to the sides of the flexible receptacle, of first and second rearwardly extending oblique support members that pivotally engage respective first and second frontwardly extending oblique support members. Another feature that contributes to this advantage is the provision, outwardly of and underneath the middle bottom of the receptacle, of a support base portion that pivots relative to another support base portion. Another feature that contributes to this advantage is the provision, outwardly of and adjacent to the bottom four corners of the receptacle, of pivot connections between the support base and oblique members.

Another advantage of the present invention is that the rear corner posts extend further beyond the support base than do the front corner posts so as to provide for a braking arrangement to the rear wheels. The front wheels are engaged to forks that depend from the front corner posts. The rear wheels are engaged to receivers that depend from the rear corner posts. These receivers engage the rear axle for the rear wheels. These receivers provide the base for pedals that pivot and whose extensions engage fins on the rear wheels to brake or lock the pet wagon. The pedals are interconnected by an elongate member such that the user steps just once to operate both pedals to engage both rear wheels to stop the pet wagon.

Another advantage of the present invention is that support members of the frame are tubular such that the frame is lightweight but strong. The first and second U-shaped support members are tubular. The four oblique support members depending from ends of the first and second U-shaped support members are tubular. The front and rear corner posts are tubular. The front lower support member that extends between the front posts is tubular. The rear lower support member that extends between the rear corner posts is tubular. The longitudinally extending support members of the support base are tubular. The laterally extending support members of the support base are tubular.

Another advantage of the present invention is that support members of the handle are tubular such that the handle is lightweight but strong.

Another advantage of the present invention is that the elongate member extending between the pedals of the brake or lock arrangement is tubular such that the elongate member is lightweight but strong.

Another advantage of the present invention is that the wagon is inexpensive to manufacture.

Another advantage of the present invention is that the wagon is simple to operate. It is simple to fold out and fold in. It is simple to change the position of the handle from pulling the front end of the wagon to pulling the rear end of the wagon. It is simple to operate the braking arrangement. It is simple to steer.

Another advantage of the present invention is that it has a tight turning radius. One feature contributing to this advantage is the independently spinnable front wheels.

Another advantage of the present invention is that it is stable. One feature contributing to this advantage is that the rear wheels rotate in planes disposed outwardly of the vertical axis about which the front wheels are spinnable.

Another advantage is that the present invention eliminates the need to push a wagon backwards. A conventional wagon has front wheels that turn and rear wheels that are fixed so as to rotate in respective first and second planes. Thus, with a conventional wagon, where the user must from the front push the wagon rearwardly with the handle, the user finds it difficult to steer from the front as the wagon is pushed rearwardly. However, here with the present wagon, if the user encounters a tight space and must back up the wagon, the user can simply pivot the handle from the front side to the rear side, and then walk to the rear side where the user can pull the wagon rearwardly, i.e., in a direction where the rear wheels lead the front wheels.

Another advantage is that the present invention may be folded to a relatively small size. In other words, the present wagon folds tightly into itself.

Another advantage is that the present invention minimizes assembly by the user.

BRIEF DESCRIPTION OF THE DRAWINGS

FIG. 44A is a perspective exploded view of a front wheel arrangement of the pet wagon of FIG. 41.

FIG. 44B is a perspective assembled view of the front wheel arrangement of FIG. 44A.

DESCRIPTION

Figure 1:
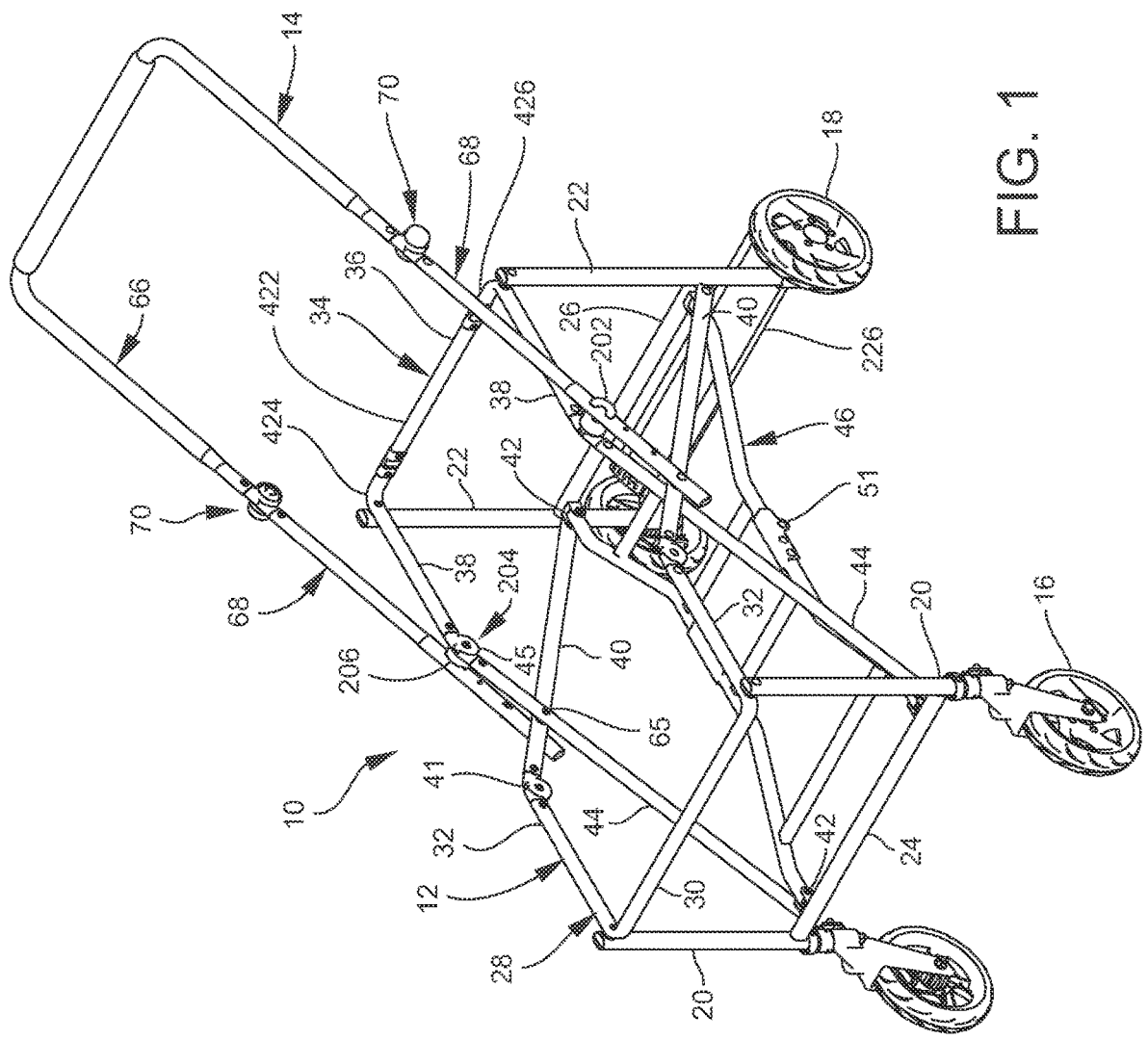
FIG. 1 is a perspective view of the frame of the pet wagon of the present invention.

As shown in FIG. 1, the present pet wagon is indicated in general by reference number 10. Pet wagon 10 includes a frame 12, a pivoting handle 14, front wheels 16, and rear wheels 18.

Frame 12 includes first and second front support member posts 20 and first and second rear support member posts 22. Posts 20, 22 are tubular and oblong in section. Front posts 20 are engaged to each other by a front lower support member 24 extending laterally between lower portions of the front posts 20 to space the front posts 20 apart and tie the front posts 20 rigidly together. Front support member 24 is tubular and oblong in section. Rear posts 22 are engaged to each other by a rear support member 26 extending laterally between the rear posts 22 to space the rear posts 22 apart and tie the rear posts 22 rigidly together. Rear support member 26 is tubular and oblong.

Frame 12 includes a U-shaped support member 28 having a front portion 30 and two side portions 32. U-shaped support member 28 is one-piece and integral. Upper portions of the front posts 20 are engaged to each other by the U-shaped support member 28. The U-shaped support member 28 spaces the front posts 20 apart and ties the front posts 20 rigidly together. U-shaped support member 28 is tubular and oblong in section.

Frame 12 includes a U-shaped support member 34 having a rear portion 36 and two side portions 38. U-shaped support member 34 may or may not be one-piece and integral. If the pet wagon 10 has a rear door, the support member 34 is not integral and one-piece. If the pet wagon 10 does not have a rear door, the U-shaped support member 34 may be one-piece and integral.

Upper portions of the rear posts 22 are engaged to each other by the U-shaped support member 34. The U-shaped support member 34 spaces the rear posts 22 apart and ties the rear posts 22 rigidly together. U-shaped support member 34 is tubular and oblong in section.

U-shaped support member 28 defines a plane. Front posts 20 are disposed at a right angle to such plane. U-shaped support member 34 defines a plane. Rear posts 22 are disposed at a right angle to such plane. U-shaped support members 28, 34 lie in the same plane.

Front lower support member 24 is parallel to the front portion 30 of the U-shaped support member 28. Rear lower support member 26 is parallel to the rear portion 36 of the U-shaped support member 34.

Frame 12 includes first and second oblique support members 40 extending rearwardly and downwardly from the distal ends of side frame portions 32 of U-shaped support member 28. Support members 40 are tubular and oblique in section. Each of the upper ends of the first and second oblique support members 40 is pivotally engaged to a respective distal end of one of the side frame portions 32 at a respective pivot hub 41. Each of the lower ends of the first and second oblique support members 40 is pivotally engaged to an outer ear of a respective U-shaped receiver 42, where the respective U-shaped receiver 42 is engaged to the rear lateral lower support member 26. Oblique support members 40 are oblique relative to the plane in which the U-shaped support members 28, 34 lie.

Frame 12 includes third and fourth oblique support members 44 extending frontwardly and downwardly from pivot hubs 45 disposed at the proximal ends of side frame portions 38 of U-shaped support member 34. Support members 44 are tubular and oblong in section. Each of the upper ends of the third and fourth oblique support members 44 is pivotally engaged to the pivot hub 45 at a respective proximal end of one of the side frame portions 38. Each of the lower ends of the third and fourth oblique support members 44 is pivotally engaged to an outer ear of a respective U-shaped receiver 42, where the respective U-shaped receiver 42 is engaged to the front lateral lower support member 24. Oblique support members 44 are oblique relative to the plane in which the U-shaped support members 28, 34 lie.

There are four U-shaped receivers 42. Two of the U-shaped receivers 42 are engaged to the front lateral lower support member 24 and extend rearwardly therefrom. The other two of the U-shaped receivers 42 are engaged to the rear lateral lower support member 26 and extend frontwardly therefrom. The four U-shaped receivers 42 engage a support base 46.

Figure 3:
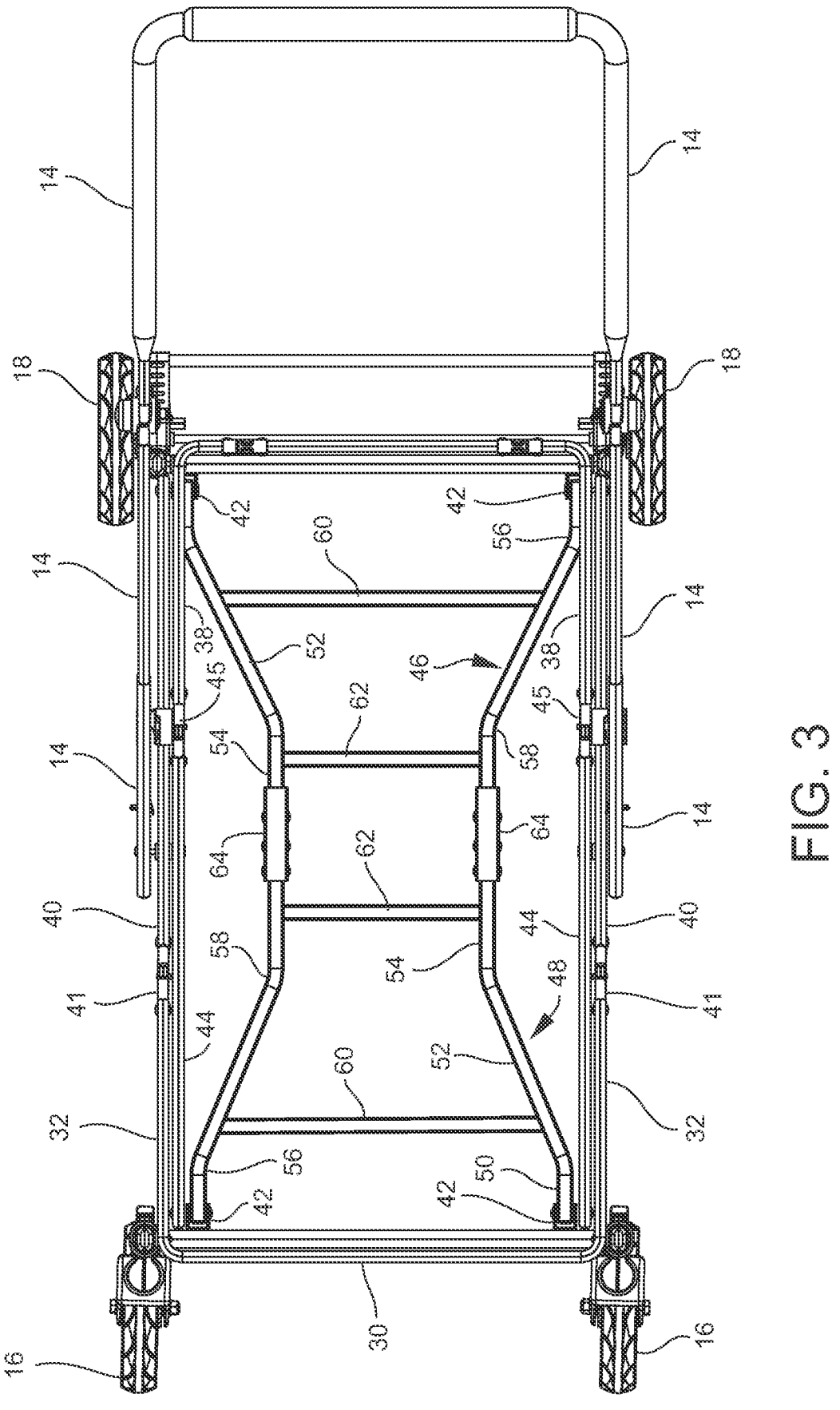
FIG. 3 is a top view of the frame of the pet wagon of FIG. 1.

As shown in FIG. 3, support base 46 includes first, second, third, and fourth undulating support members 48. Each of the support members 48 is tubular and oblong in section. Each of the undulating support members 48 includes a straight portion 50 extending at a right angle relative to lateral support members 24, 26, a straight portion 52 extending inwardly from straight portion 50, and a straight portion 54 extending at a right angle relative to lateral support members 24, 26. A support member transition portion 56 is disposed between straight portions 50 and 52 and a support member transition portion 58 is disposed between straight portions 52 and 54. Each of the straight portions 50 is engaged in one of the U-shaped receivers 42 such that the support base 46 is engaged to the U-shaped receivers 42.

Support base 46 includes first and second long lateral straight support members 60. Each of the lateral support members 60 extends to and between opposing inwardly extending support members 52.

Support base 46 includes first and second short lateral straight support members 62. Support members 62 are tubular and oblong in section. Each of the lateral support members 62 extends to and between opposing straight support members 54 to which the support members 62 are engaged.

Axially aligned first and third straight frame portions 54 are engaged to each other by a first U-shaped channel connection 64. Axially aligned second and fourth straight frame portions 54 are engaged to each other by a second U-shaped channel connection 64.

Figures 25A, 25B, 25C, 25D:
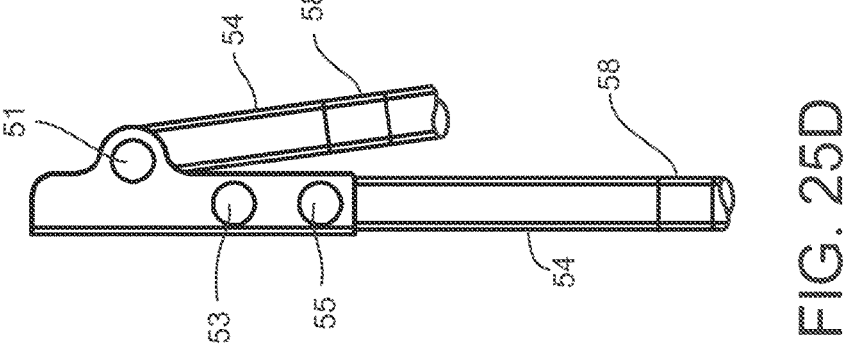
FIG. 25A is a perspective isolated view of a channel connection for two portions of a support base of the pet wagon of FIG. 1.
FIG. 25B is a side elevation isolated view of the channel connection of FIG. 25A.
FIG. 25C is a top isolated view of the channel connection of FIG. 25A.
FIG. 25D is a side elevation view of the channel connection of FIG. 25A in an open position where the pet wagon is in the folded in and collapsed state.

Channel connection 64 is shown in FIGS. 25A, 25B, 25C, and 25D. FIGS. 25A, 25B, and 25C show unfolded or folded out or operating positions for the support members 54 engaging the channel connection 64 on each of the ends of the channel connection 64. FIG. 25D shows a folded in position for the support members 54 engaging the channel connection 64 on each of the ends of the channel connection 64.

Straight frame portion or support member 54 that extends out of the channel connection 64 toward the front end of the pet wagon 10 having the front wheels 16 is rigidly fixed to the channel connection 64 by first and second pins 53, 55. Channel connection 64 and such support member share a common axis at all times, i.e., in the folded in state and in the folded out state.

Straight frame portion or support member 54 that extends out of the channel connection 64 toward the rear end of the pet wagon 10 having the rear wheels 18 is pivotally engaged to the channel connection 64 by pivot pin 51. Channel connection 64 and such support member share a common axis when the pet wagon 10 is in the folded out position. When pet wagon 10 is in the folded in or collapsed position, the underside of such support member may be swung to be adjacent to the underside of the other support member, as shown in FIG. 25D.

When the pet wagon 10 is folded between the operating position shown in FIG. 1 and the collapsed or folded in position of FIG. 38, 39, 40A, or 40B (where such pet wagon 10 has the same frame 12 but different wheels than the pet wagon 10 of FIG. 1), the channel connection or channel receiver 64 stops such a folding when the folding is from the collapsed state to the operating state. Here the upper side of the three sided channel connection 64 prevents the pivoting support member 54 from further pivoting. The rigidly connected support member 54 does not pivot relative to channel connection 64 since it is fixed thereto with pins 53, 55. When such pivoting is stopped, the oppositely extending support members 64 are co-axial.

As to the first and second channel connections 64, pins 51 are co-axial, pins 53 are co-axial, and pins 55 are co-axial. Channel connection 64 has three sides, with the adjacent sides disposed at right angles to each other. The ends of the channel connection 64 are open. The bottom of the channel connection 64 is open. Pin 51 is disposed at a lower elevation than are pins 53, 55. The two opposing sides of the channel connection 64 have aligned openings for their respective pins 51, 53, 55.

The upper ends of oblique support members 40 are pivotally engaged by pivot hubs 41 to the inner ends of the side support members 32 of the U-shaped support member 28. The lower ends of oblique support members 40 are pivotally engaged to the outside ears of the U-shaped connections 42, where such U-shaped connections 42 engage and extend from rear lateral support member 26. The upper ends of oblique support members 44 are pivotally engaged to pivot hubs 45 at the inner ends of the side support members 38 of the U-shaped support member 34. The lower ends of oblique support members 44 are pivotally engaged to the outside ears of the U-shaped connections 42, where such U-shaped connections 42 engage and extend from front lateral support member 26. Each of the U-shaped connections 42 is formed by a pair of ears and a base extending between such ears. The bases of the U-shaped connections 42 may be rigidly fixed, such as by welding, to their respective front or lateral support member 24 or 26. Support member portions 50 are pivotally engaged between the ears of one respective U-shaped connection 42.

The oblique support members 44 are pivotally engaged to the oblique support members 40 by pivot pin 65. Oblique support members 44 are disposed inwardly of the outer oblique support members 40. When in the open and folded out position shown in FIG. 1, each of the pairs of the crossing oblique support members 40, 44 forms an X. Pivot pins 65 further pivotally engage distal end portions of the handle 14 to the frame 12 of the pet wagon 10.

Figures 4A, 4B:
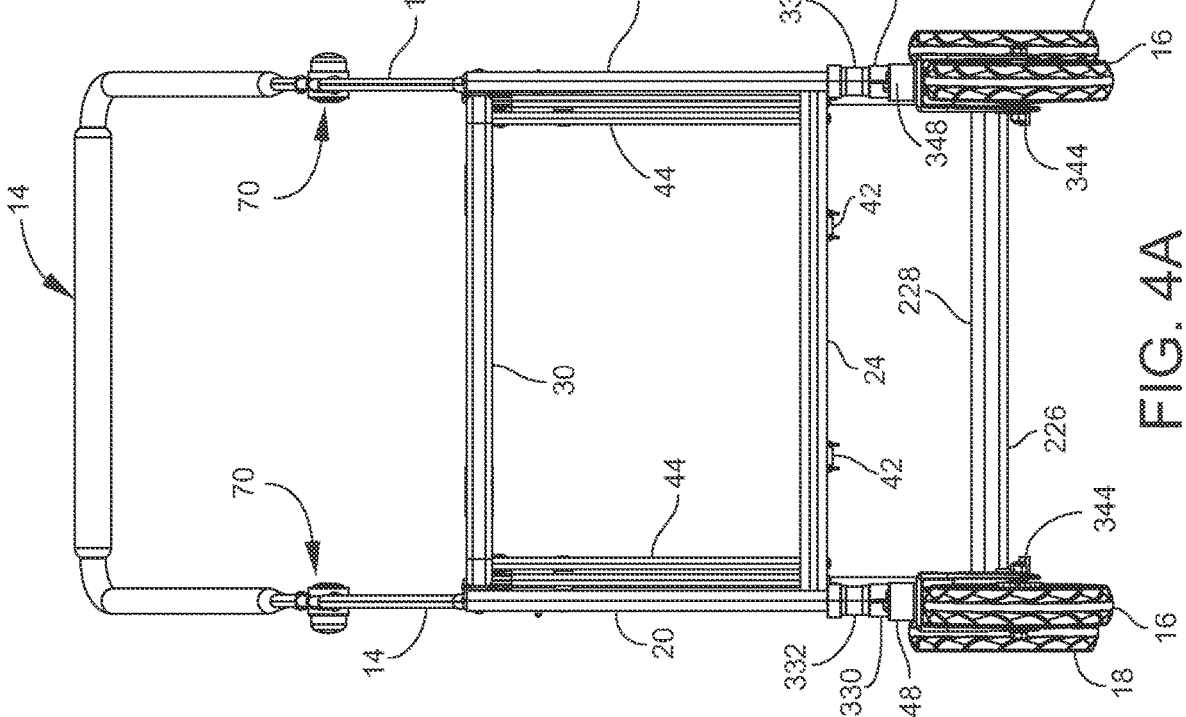
FIG. 4A is a front end view of the frame of the pet wagon of FIG. 1.
FIG. 4B is a rear end view of the frame of the pet wagon of FIG. 1, opposite of the front end view of FIG. 4A.

As shown in FIGS. 3, 4A, and 4B, each of the front wheels 16 define a plane that is disposed inwardly of the plane that is defined by the rear wheels 18. However, the front posts 20 that rise from the front wheels 16 lie in planes that are disposed outwardly of the rear posts 22. In other words, the rear posts 22 are disposed more closely together than the front posts 20 and the rear wheels 18 are disposed further apart than are the front wheels 16.

As shown in FIG. 1, pet wagon 10 includes the handle 14. Handle 14 is U-shaped. Handle 14 includes an upper portion 66 and first and second lower portions 68. The upper portion 66 is U-shaped. Each of the first and second lower portions 68 is straight. The upper portion 66 is pivotally engaged to the first lower portion 68 by a first pivot connection 70. The upper portion 66 is pivotally engaged to the second lower portion 68 by a second pivot connection 70.

Figure 9:
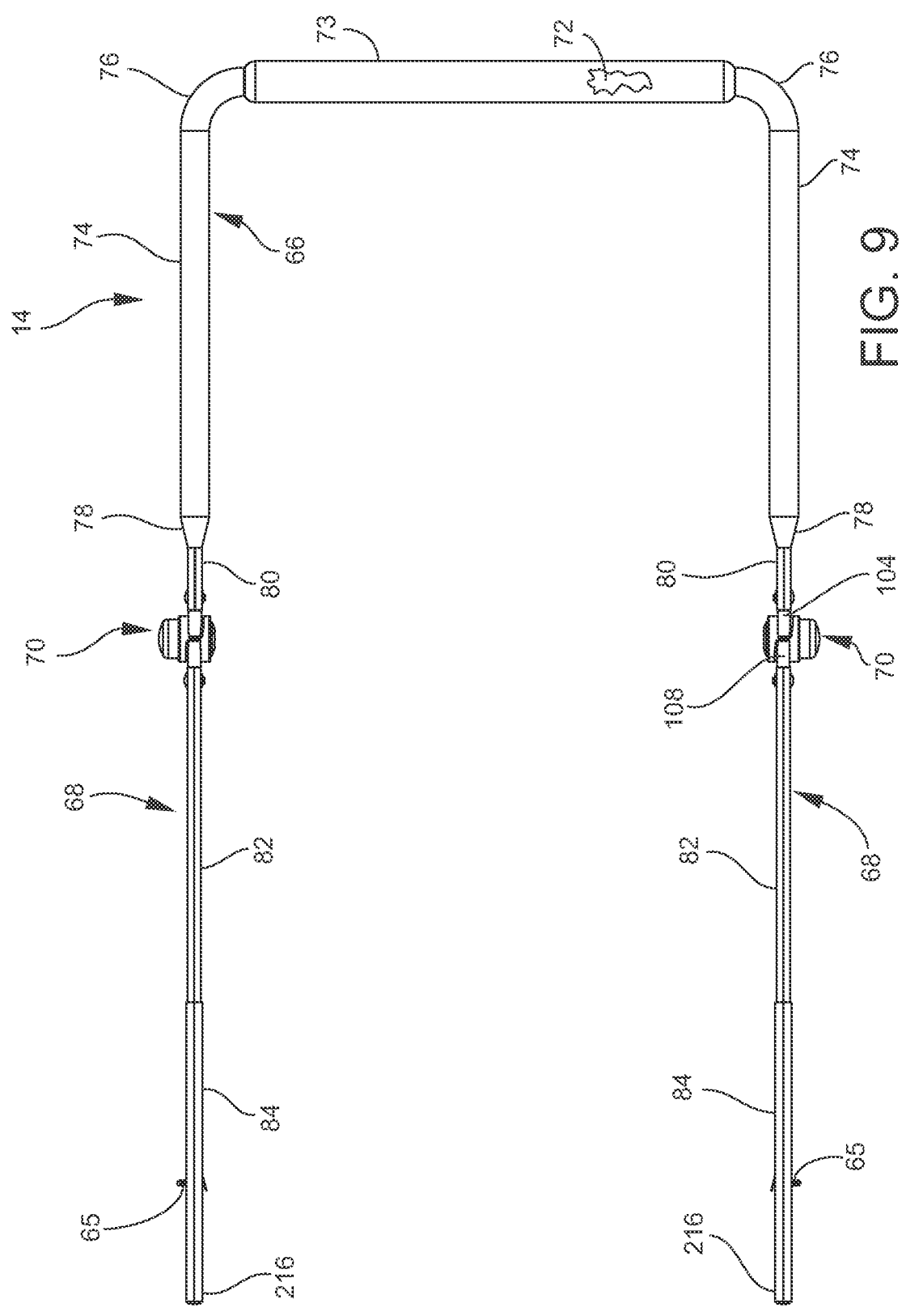
FIG. 9 is a top view of the handle of FIG. 8.

As shown in FIG. 9, upper portion 66 of the handle 14 includes a straight end cylindrical support member portion 72 having engaged thereon a cylindrical grip 73. Cylindrical grip 73 may be made of a resilient, nonslip material such as a rubber or foam or elastomer. Upper portion 66 further includes first and second straight side cylindrical support member portions 74. Upper portion 66 further includes curved transition portions 76 between end support member portion 72 and side support member portions 74. End support member portion 72 and side support member portions 74 have the same outside diameter. Cylindrical grip 74 has an outside diameter greater than the end support member portion 72. Each of the side support member portions 74 leads into a distal tapered transition portion 78.

Figure 7:
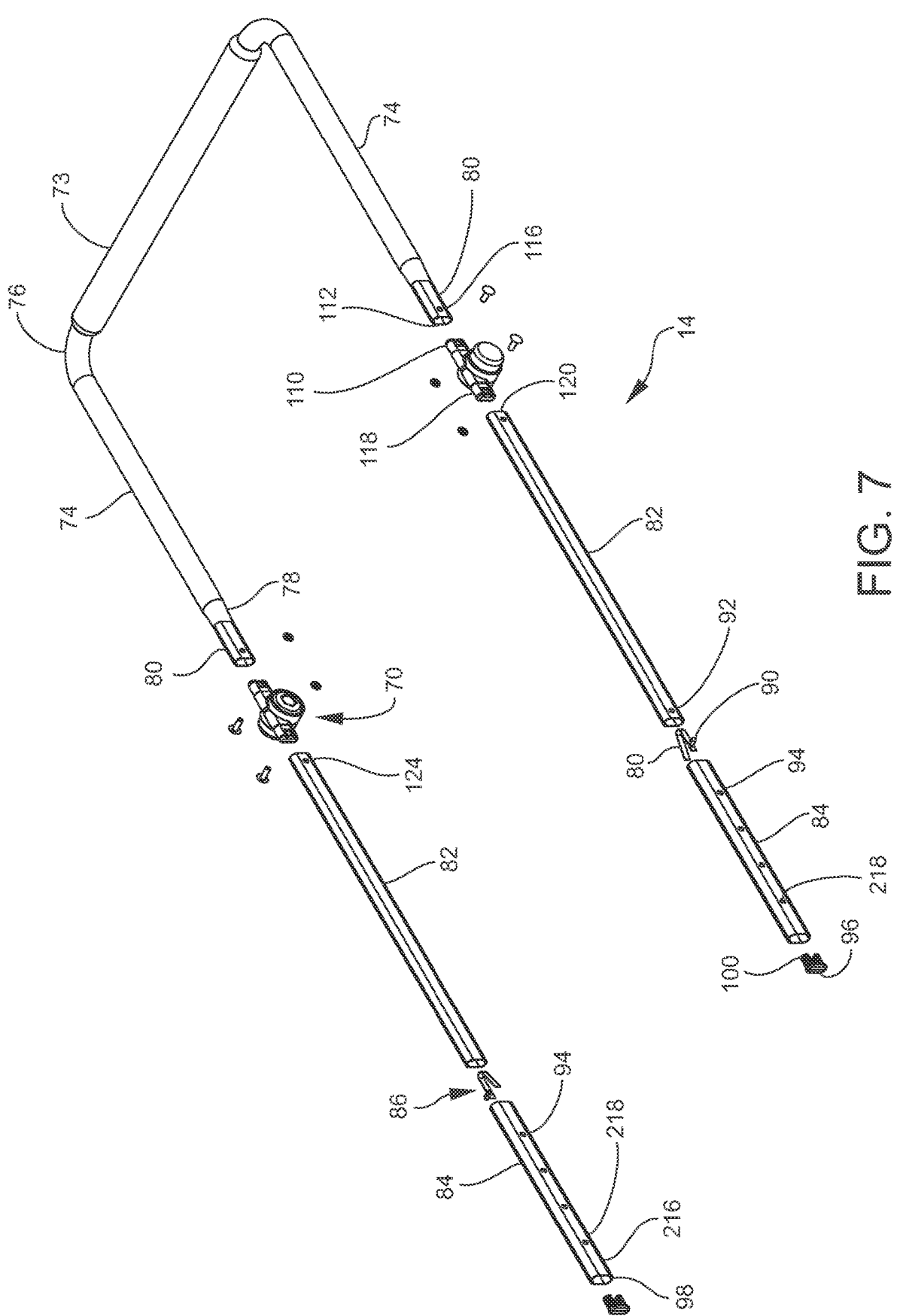
FIG. 7 is a perspective, exploded, and isolated view of the handle of the pet wagon of FIG. 1.
Figure 8:
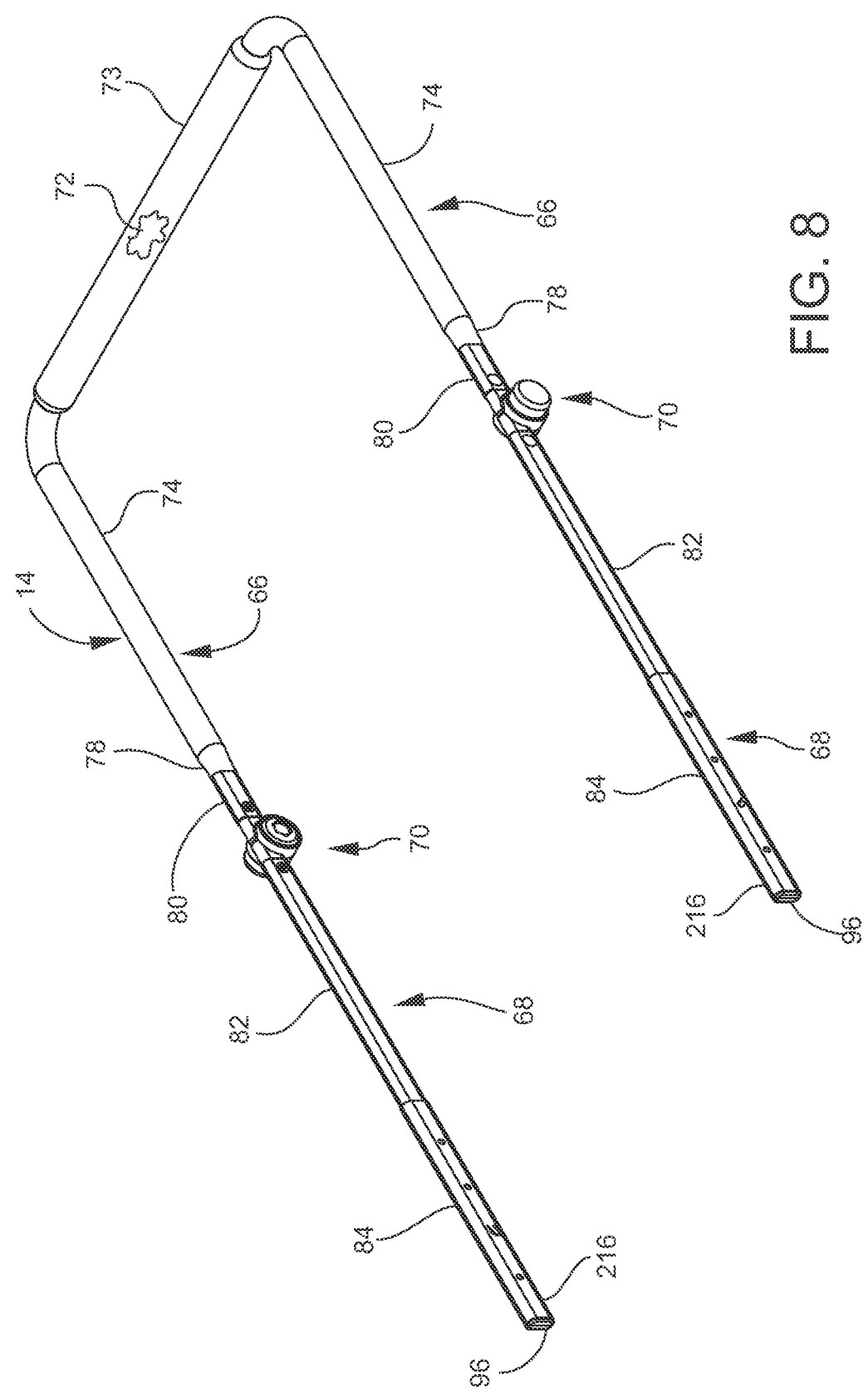
FIG. 8 is a perspective, assembled, and isolated view of the handle of FIG. 7.

As shown in FIG. 7, upper portion 66 of handle 14 further includes first and second oblong straight support member portions 80. Each of the oblong support member portions 80 is disposed between one of the tapered transition portions 78 and one of the pivot connections 70. Each of the oblong support member portions 80 engage one of the pivot connections 70. Oblong portion 80 is shown in detail in FIGS. 12A and 12B. Support member portions 80 are oblong in section.

The lower portion 68 of the handle 14 includes first and second upper straight oblong support members 82. Each of the oblong support members 82 engages one of the pivot connection 70 and depends downwardly therefrom.

The lower portion 68 of the handle includes first and second lower straight oblong support members 84. Each of the lower larger oblong support members 84 telescopes or slides onto or over one of the upper smaller oblong support members 82. A spring biased button mechanism 86 is disposed in each of the pairs of upper and lower oblong support members 82, 84 to fix the lower oblong support member 84 at a certain distance in the upper oblong support member 82 so as to shorten or lengthen the length of handle 14. Spring biased button mechanism 86 includes a U-shaped or V-shaped flat snap spring 88 having a button 90. Snap button spring 88 is fixed in the smaller oblong support member 82 where the button 90 engages button opening 92. Button 90 then further engages any one of the button openings 94 formed in the larger oblong support member 84 to as to increase or decrease the length of the handle 14.

Handle 14 further includes plastic end caps 96 that close off opening 98 formed in the lower end of each of the larger oblong support members 84. Each of the end caps 96 includes a pair of resilient prongs 100 that friction fit within opening 98.

Figures 12A, 12B:
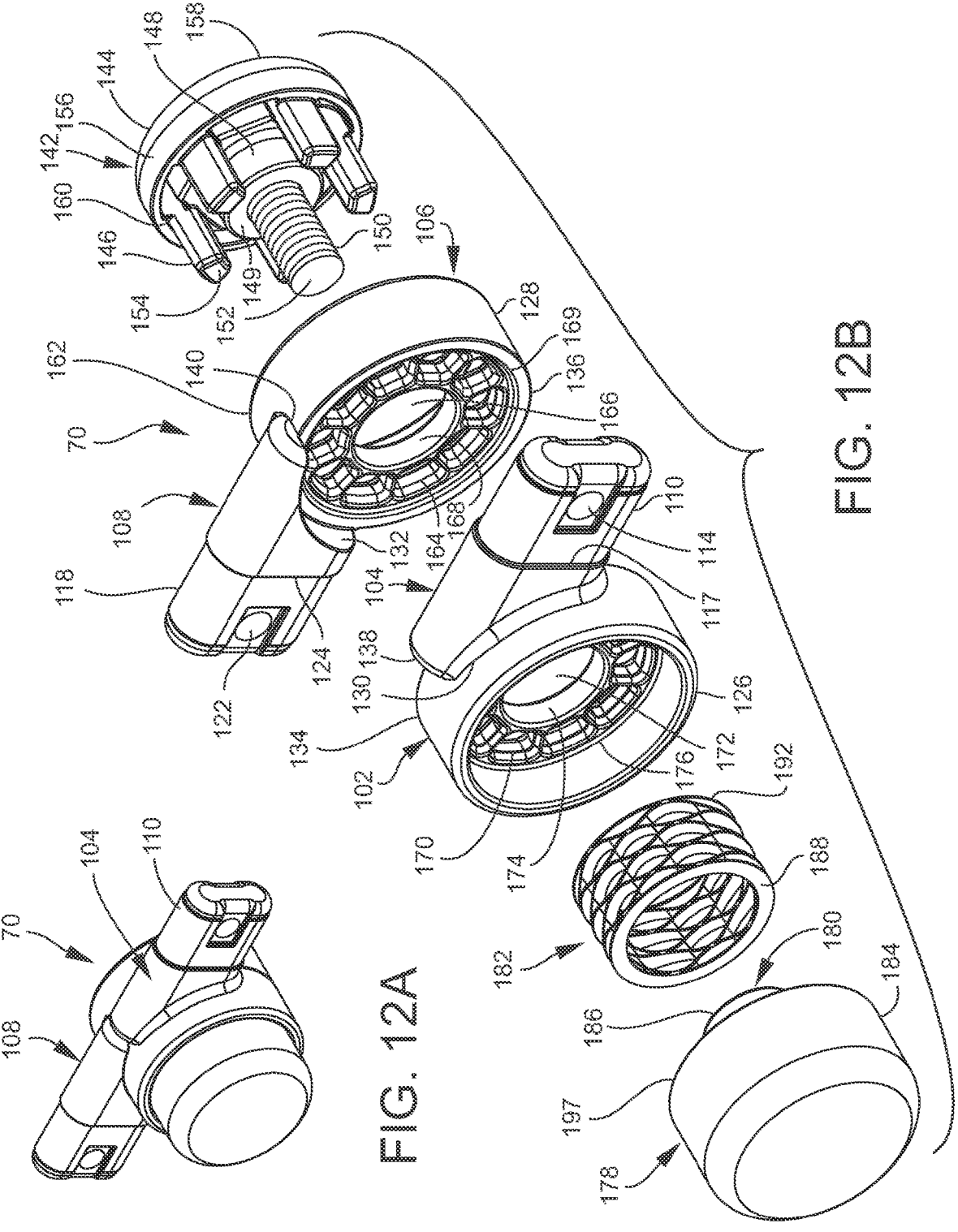
FIG. 12A is a perspective assembled view of the pivot connection between the upper portion of the handle and the lower portion of the handle of the pet wagon of FIG. 1.
FIG. 12B is a perspective exploded view of the pivot connection of FIG. 12A.
Figures 13A, 13B:
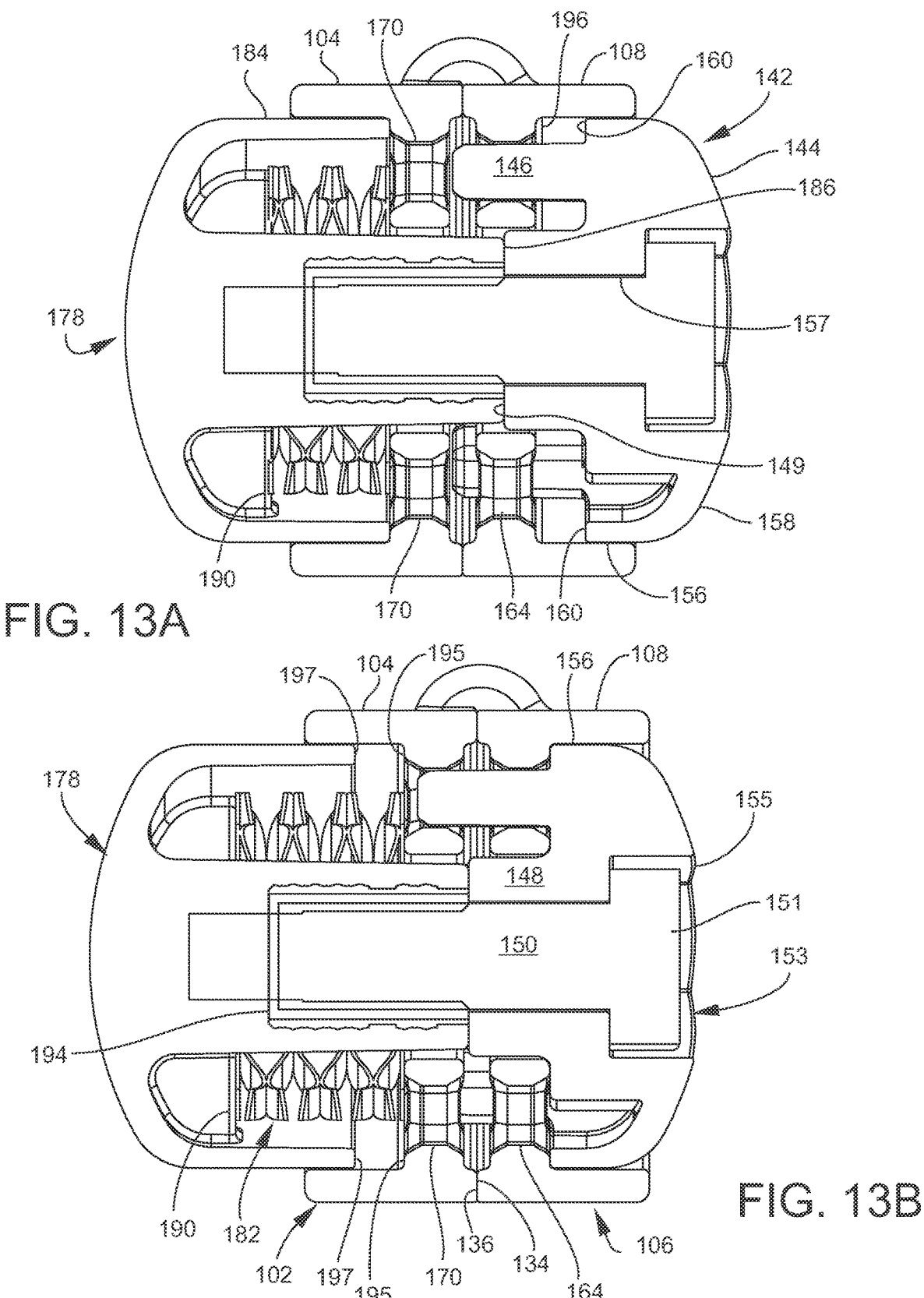
FIG. 13A is a section diagrammatic and partially cut away view of the pivot connection of FIG. 12A in an open state where the upper and lower portions of the handle may pivot relative to each other.
FIG. 13B is a section diagrammatic and partially cut away view of the pivot connection of FIG. 12A in a locked state where the upper and lower portions of the handle are prevented from pivoting.
Figures 14A, 14B:
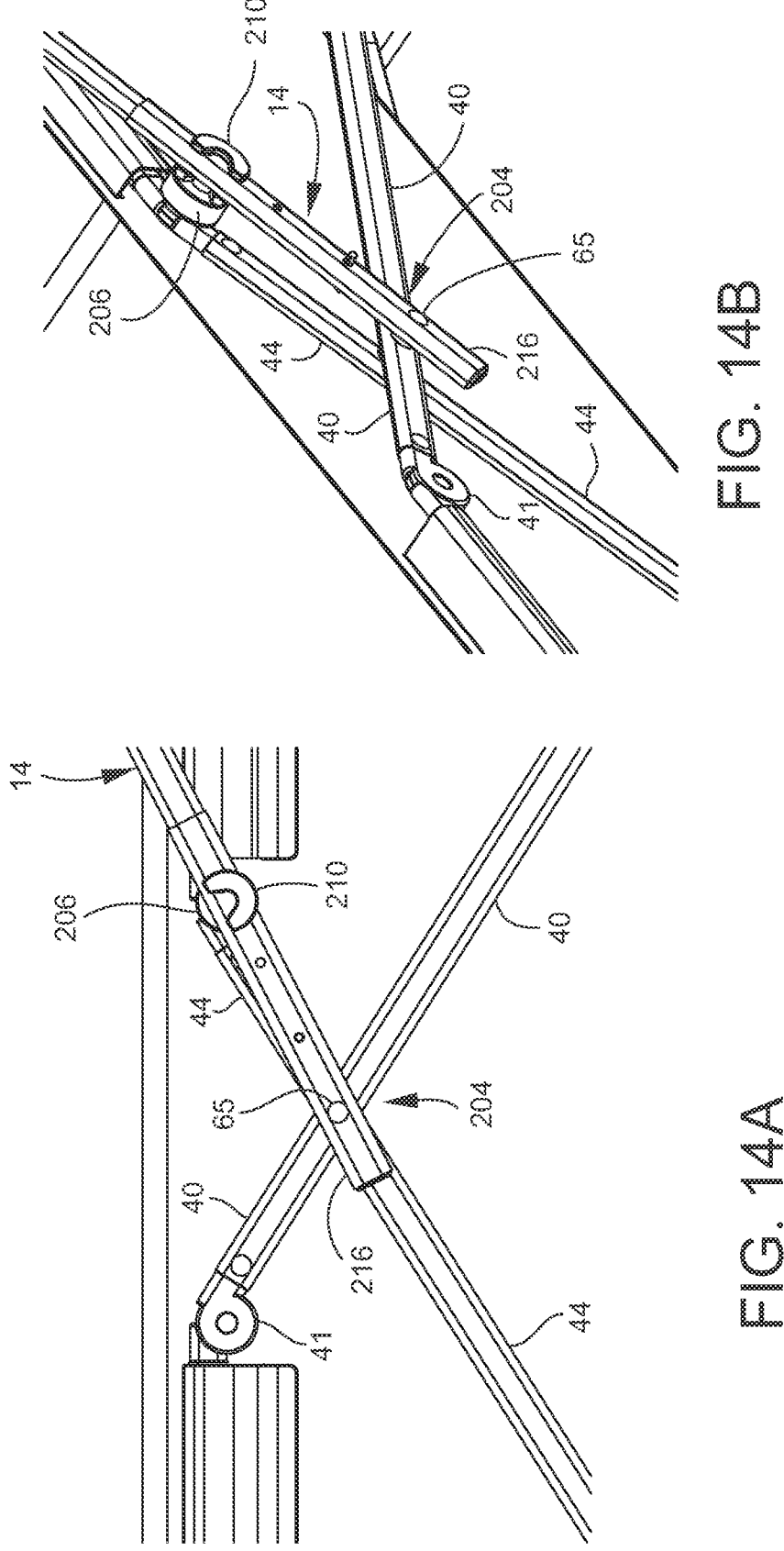
FIG. 14A is a detail side view of a lower section or lower portion of the handle of the pet wagon of FIG. 1, where such lower section is engaged with a cradle fixed to the frame of the pet wagon.
FIG. 14B is a detail perspective view of the lower section or lower portion of the handle of the pet wagon of FIG. 1, where such lower section is engaged with the cradle that is fixed to the frame of the pet wagon.

Handle 14 further includes connection 70. Connection 70 is shown in FIGS. 12A, 12B, 13A, and 13B. FIG. 12A shows an assembled perspective view. FIG. 12B shows an exploded perspective view. FIGS. 13A and 13B show section views. Connection 70 includes a first hub 102 having an oblong support member connection 104 and a second hub 106 having an oblong support member connection 108.

Oblong support connection 104 includes a male connection 110 that fits inside of opening 112 of oblong support member portion 80. Male connection 110 includes a pin opening 114 for engagement by a pin that also engages pin opening 116 in oblong support member 80. Oblong support connection 104 includes an oblong stop 117 that rises from the male connection 110 and that abuts the oblong end of oblong support member portion 80 that forms oblong opening 112.

Oblong support connection 108 includes a male connection 118 that fits inside of opening 120 on the upper end of oblong support member portion 82. Male connection 118 includes a pin opening 122 for engagement by a pin that also engages pin opening 124 formed in the upper end of oblong support member portion 82. Oblong support connection 108 includes an oblong stop 124 that rises from the male connection 118 and that abuts the oblong end of oblong support member portion 82 that forms oblong opening 120.

Hub 102 includes a cylindrical shell 126. Hub 106 includes a cylindrical shell 128.

Connection 104 includes a cylindrical imprint or receptor 130 that includes first and second half portions. One such half portion is integral and one-piece with cylindrical shell 126. The other such half portion perfectly receives the other cylindrical shell 128 when the hubs 102, 106 are engaged to each other.

Connection 108 includes a cylindrical imprint or receptor 132 that includes first and second half portions. One such half portion is integral and one-piece with cylindrical shell 128. The other such half portion perfectly receives the other cylindrical shell 126 when the hubs 102, 106 are engaged to each other.

When hubs 102, 106 are engaged to each other, an inner circular edge 134 of hub 102 engages an inner circular edge 136 of hub 106. When hubs 102, 106 are engaged to each other, circular imprint 130 receives each of the cylindrical shells 126, 128. When the hubs 102, 106 are engaged to each other, circular imprint 132 receives each of the cylindrical shells 126, 128. When the hubs 102, 106 engage each other and when the upper portion 66 of the handle 14 is coplanar with the lower portion 68 of the handle 14, inner end 138 of connection 104 is disposed adjacent to inner end 140 of connection 108. When hubs 102, 106 are engaged to each other and when the upper portion 66 of the handle 14 is coplanar with the lower portion 68 of the handle 14, a straight axis of oblong support portion 80 and connection 104 is offset from a straight axis of oblong support portion 82 and connection 108.

Connection 70 includes hubs 102 and 106 and further includes a first lock portion 142. Lock portion 142 includes a cap 144 having a set of five extensions 146 extending inwardly therefrom. Each of the extensions 146 defines a quadrilateral in section or more specifically defines an isosceles trapezium in section. Lock portion 142 further includes a cylindrical base 148 having a circular face 149. Lock portion 42 further includes a threaded pin 153 having a head 151 and a threaded pin shaft 150. The cylindrical threaded pin shaft 150 extends axially from the cylindrical base 148. An axis of each of the extensions 146, an axis of the cylindrical base 148, and an axis of the cylindrical pin shaft 150 run parallel to each other. The axis of each of the extensions 146 is of equal radial distance from the axis of the cylindrical pin shaft 150. The axis of each of the extensions 146 is of equal radial distance from the axis of the cylindrical base 148. Threaded pin shaft 150 includes an inner end 152. The inner end 152 of the pin shaft 150 is disposed inwardly of the inner ends 154 of the extensions 146. Cap 144 includes a cylindrical portion 156 and a spherical portion 158. Cylindrical portion 156 includes a circular edge 160 that axially slides within circular edge 162 of shell 128 such that cylindrical portion 156 and cap 144 axially slide inside of shell 128 of hub 106. Extensions 146 extend from cap 144 from a location in the cap 144 that is immediately adjacent to and immediately inwardly of the circular edge 160 of the cylindrical portion 156. Cap 144 includes a cylindrical opening 157 through which pin shaft 150 extends.

The head 151 of pin 153 is set inside or sunk inside of cap 144 such that the outer surface of head 151 is inwardly of the outer surface of the cap 144. Pin 153 may be glued or rigidly fixed to cap 144. The head 151 of pin 153 may be nonrotational relative to the cap 144. The head 151 may have the shape of a hexagon and the cap 144 may have a head opening 155 formed in the shape of a hexagon, and the head 151 and head opening 155 may be about the same width, such that the pin 153 is nonrotatable within opening 155. Instead of having the shape of a hexagon, the opening 155 and pin head 151 may have other shapes such as a rectangle having straight edges that prevent rotation.

Extensions 146 engage receptors 164 disposed in the shell 128 of hub 106. There are five extensions 146. There are ten receptors 164 disposed in the shell 128. Each of the receptors 164 is isosceles trapezium shaped in section.

Pin shaft 150 extends through an opening 166 in hub 106. Opening 166 is formed by an inner cylindrical wall 168. Receptors 164 are engaged between inner cylindrical wall 168 and an outer cylindrical wall 169, which is in turn immediately engaged to the inner surface of the cylindrical shell 128.

Extensions 146 further engage receptors 170 disposed in the shell 126 of hub 102. There are five extensions 146. There are ten receptors 170 disposed in the shell 126. Each of the receptors 170 is isosceles trapezium shaped in section.

Pin shaft 150 extends through an opening 172 in hub 102. Opening 172 is formed by an inner cylindrical wall 174. Receptors 170 are disposed between inner cylindrical wall 174 and an outer cylindrical wall 176. Outer cylindrical wall 176 is immediately engaged to the inner surface of cylindrical shell 126.

The connection 70 further includes a second lock portion 178 having a cylindrical threaded receptor 180 and a stacked wave spring 182. Second lock portion 178 includes a cylindrical sidewall 184 and the stacked wave spring 182 is disposed between the cylindrical inner surface of the sidewall 184 and the cylindrical outer surface of the threaded receptor 180. Pin shaft 150 threadingly engages the threaded receptor 180 to tie the pin shaft 150 and threaded receptor 180 together such that first lock portion 142 and second lock portion 178 act and move as one-piece in an axial sliding movement actuated by finger pressure in one direction to push the extensions 146 one way and actuated by an expansion of spring 182 to push the extensions 146 the other way so as to draw the extensions 146 into and out of engagement with the receptors 170 of the hub 102. When the extensions 146 are engaged in such receptors 170 of the hub 102, the hubs 102 and 106 are locked and nonrotatable relative to each other. When extensions 146 are drawn out of or pushed out of such receptors 170, the hubs 102 are unlocked and rotatable and the upper portion 166 of the handle 14 may be rotated relative to the lower portion 68 of the handle 14.

Threaded receptor 180 includes a circular innermost portion or face 186. This innermost portion 186 engages face 149 of base 148 throughout the drawing in and drawing out of extensions 146 relative to receptors 170. Stacked wave spring 182 is continuously biased to expand. One end 188 of stacked wave spring 182 engages an integral cylindrical stop 190 within sidewall 184. The other end 192 of the stacked wave spring 182 engages inner cylindrical wall 176 of hub 102, which inner cylindrical wall 176 immediately engages the inner cylindrical surface of the cylindrical shell 126.

When the second lock portion 178 is pushed in, such as the pushing step shown from the position of FIG. 13B to the position shown in FIG. 13A, the threaded receptor 180 pushes out the pin shaft 150 by the annulus or face 186 pushing on the annulus or face 149, which pushes the extensions 146 out of the receptors 170 of hub 102, which unlocks the hubs 102, 106. During this pushing step, the spring 182 is compressed.

When pressure from a finger or thumb is released upon the second lock portion 178, the spring 182 expands against annulus or stop 190 which, by virtue of the threaded engagement between the threaded receptor 180 and pin shaft 150 and the abutment engagement between faces 149 and 186 and pin shaft 150, draws in the pin shaft 150, which draws the extensions 146 into receptors 170, which locks the hubs 102, 106. Thus, connection 70 is always biased toward a lock position. Extensions 146 automatically snap into receptors 170 when aligned with such and when finger pressure is off of lock portion 178, and such alignment and snapping occurs as the hubs 102, 106 are rotated relative to each other.

Pin 153 and its pin shaft 150 are metal. Pin receiver 180 includes a cylindrical metal threaded insert 194 rigidly fixed in the second lock portion 178. Threaded insert 194 engages the threaded pin shaft 150.

A drawing in of extensions 146, when spring 182 expands, is terminated when circular edge 160 of first lock portion 142 abuts the circular edge 196 of hub 106. Circular edge 196 is an end edge of outer cylindrical wall 169. Receptors 164 are engaged between inner cylindrical wall 168 and outer cylindrical wall 169.

A pushing out of extensions 146, when spring 182 is compressed, is terminated when anulus or face 197 of second lock portion 178 abuts anulus or face 195 of cylindrical wall 176 of shell 126.

Figures 10A, 10B, 10C, 10D:
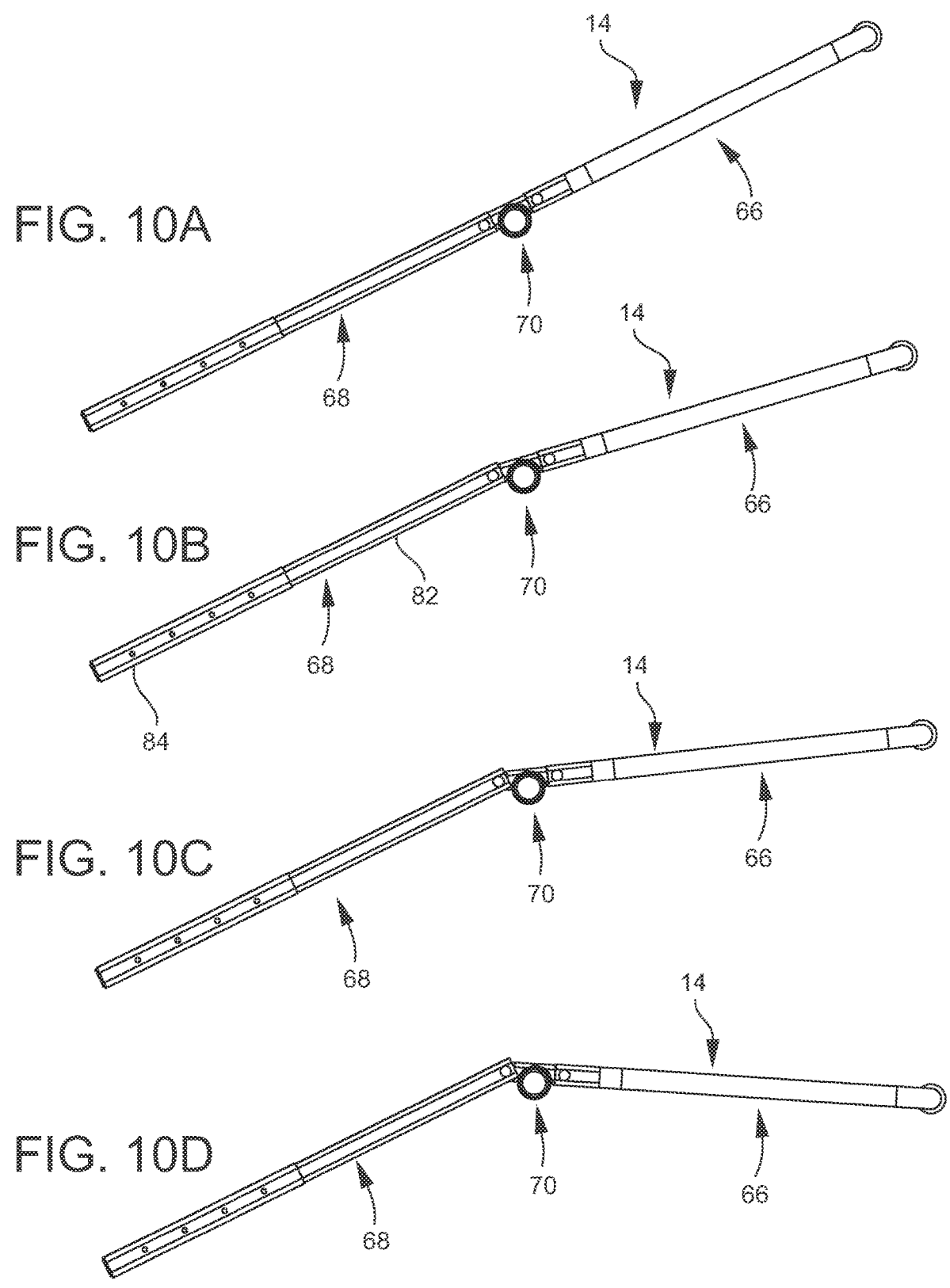
FIG. 10A is a side elevation view of the handle of FIG. 8 where an axis of an upper portion of the handle is aligned with an axis of a lower portion of the handle.
FIG. 10B is a side elevation view of the handle of FIG. 8 where the upper portion of the handle is pivoted relative to the lower portion of the handle.
FIG. 10C is a side elevation view of the handle of FIG. 8 where the upper portion of the handle is pivoted relative to the lower portion of the handle to a greater degree than that shown in FIG. 10B.
FIG. 10D is a side elevation view of the handle of FIG. 8 where the upper portion of the handle is pivoted relative to the lower portion of the handle to a greater degree than that shown in FIG. 10C.

FIGS. 10A, 10B, 10C, and 10D show different angles of the upper handle portion 66 of the handle 14 relative to lower handle portion 68 of the handle 14, where such different angles are generated by loosening and tightening the connection 70. FIG. 10A shows the axis of the upper handle portion 66 parallel to the axis of the lower handle portion 68. FIG. 10B shows the axis of the upper handle portion 66 at an oblique angle relative to the lower handle portion 68. FIG. 10C shows the axis of the upper handle portion 66 at an oblique angle relative to the lower handle portion 68, where such oblique angle is less than the oblique angle shown in FIG. 10B. FIG. 10C shows the axis of the upper handle portion at an oblique angle relative to the lower handle portion 68, where such oblique angle is less than the oblique angle shown in FIG. 10C. Such oblique angle is defined by the undersides of the upper and lower handle portions 66, 68. As the oblique angle is decreased, the grip 73 of the handle 14 is lowered. In other words, the highest position of the grip 73 is found in FIG. 10A and the lowest position of the grip is found in FIG. 10D. It should be noted that the axis of the upper handle portion 66 is offset from the axis of the lower handle portion 68. This offset is shown in FIGS. 9 and 12A where the connections 104 and 108 are offset from each other.

Figure 11:
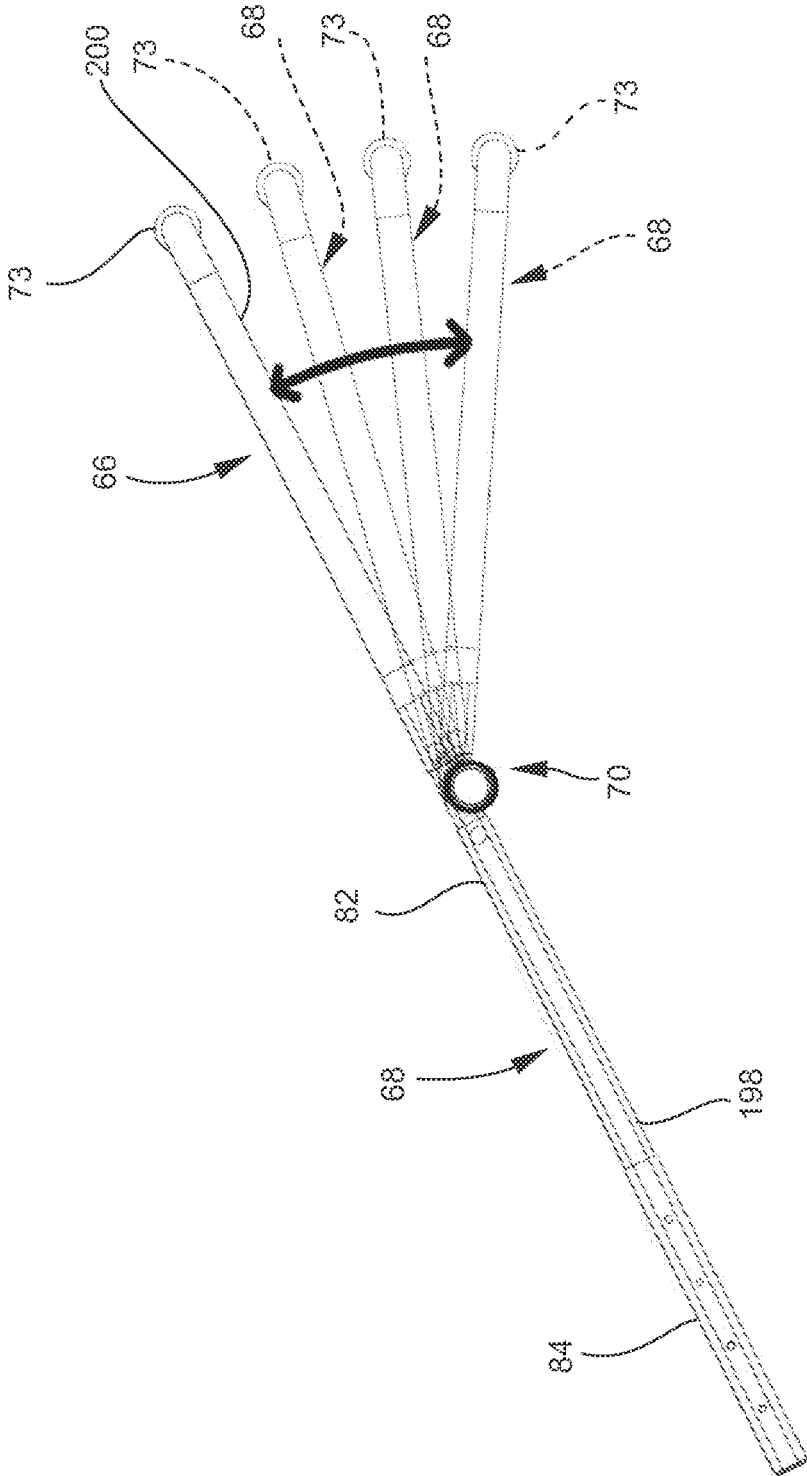
FIG. 11 is a side elevation view of the handle of FIG. 8 that shows multiple positions of the upper portion of the handle relative to the lower portion of the handle.

FIG. 11 shows that upper handle portion 66 and the grip 73 change positions while the lower handle portion 68 maintains its position. In other words, a user may favor a relatively high position for the grip 73, a relatively low position, or one of two intermediate positions.

Reference number 198 is shown in FIG. 11. This denotes an underside of the lower portion 68 of the handle 14. Reference number 200 is shown in FIG. 11. This denotes an underside of the upper portion 66 of the handle 14. Underside 200 may rotate by the connection 70 to be adjacent to the underside 198 of the lower portion 68 such that the handle 14 may take a compact form. In this compact form, the axis of the upper portion 66 of handle 14 is parallel to the axis of the lower portion 68 of handle 14.

Figure 2:
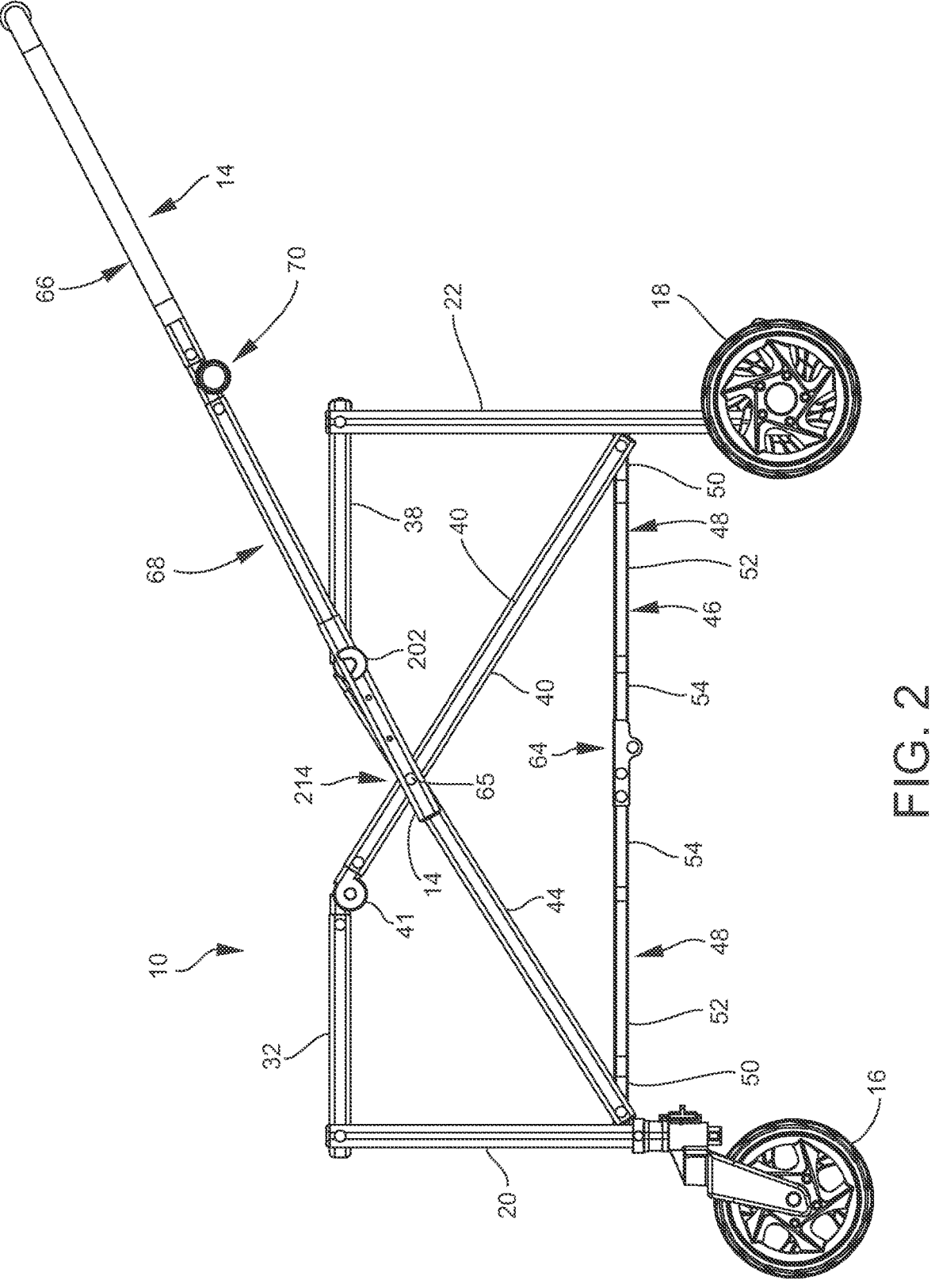
FIG. 2 is a side elevation view of the frame of the pet wagon of FIG. 1.

FIGS. 1 and 2 show the handle 14 engaged by a cradle 202 that is in turn engaged to the frame 12 of the pet wagon 10. Cradle 202 is shown in detail in FIGS. 14A, 14B, 26, 36A, 36B, 36C, and 36D. Each of the side support members 38 is pivotally engaged to its respective oblique support member 44 at a junction 204 and it is at this junction 204 that the cradle 202 is engaged to the frame 12. Cradle 202 includes a base 206 that is engaged by a pin connector 208. Pin connector 208 pivotally engages side support member 38 to their respective oblique support members 44. Base 206 extends outwardly from its respective support members 38, 44 to form a cradle portion 210 that extends under handle 14 to engage the underside 198 of the lower portion 68 of the handle 14. Base 206 is formed in the shape of a disk. From the underside 198 the cradle portion 210 extends upwardly to engage the outer side of the lower portion 68 of the handle 14. The cradle portion 210 frictionally engages a portion of the oblong shape of the tube of the handle 14. In other words, the cradle portion 210 frictionally engages at least the lower half of an oblong cross section of the tube of the handle 14. To provide such a frictional engagement, the outer dimensions of the tube of the handle 14, at the location on the handle 14 where the handle engages the cradle portion 210, is slightly greater than or equal to the engagement dimensions of the cradle portion 210 at such location. Cradle portion 210 forms an oblong shaped receiver to engage the handle 14 at such location, and the dimensions of such oblong shaped receiver are slightly less or equal to the oblong shaped dimensions of the handle 14 at such location such that there is a friction fit between the handle 14 and the cradle portion 210. The outer side section 476 of the cradle portion 210 forms a U-shape to minimize surface area to decrease friction and such that the user can tell how deeply the handle 14 is engaged in the cradle portion 210. Base 206 and cradle portion 210 are integral and one-piece.

Figure 26:
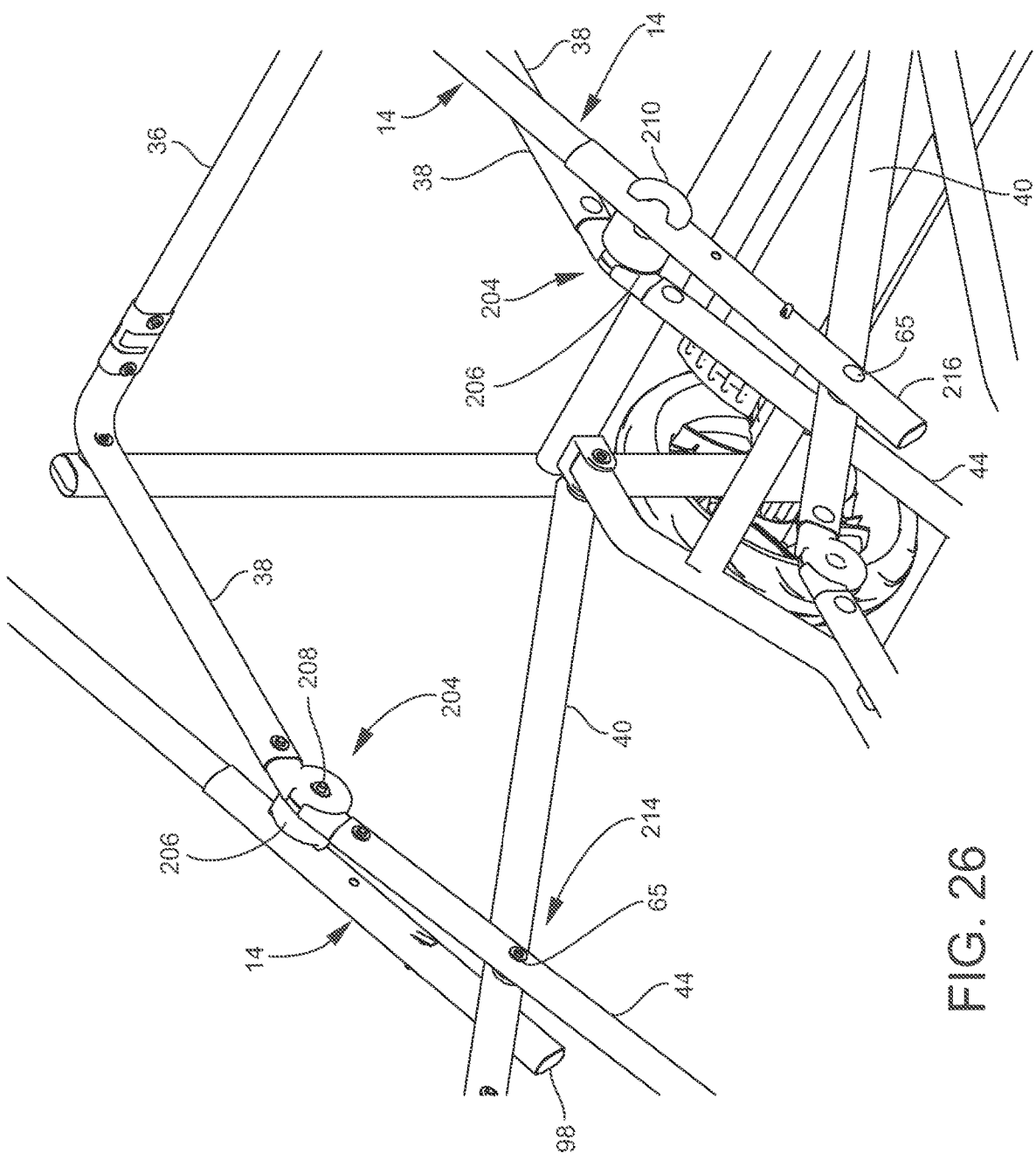
FIG. 26 is a detail view of a portion of FIG. 1 and in particular shows the cradles used for engaging the handle.

FIGS. 1 and 26 show that the handle 14 is pivotally engaged to the frame 12 at junction 214 by pin connectors 65 to respective oblique support members 40 of the frame 12 where the oblique support members 40 cross and pivotally engage oblique support members 44 of the frame 12. Pin connector 65 pivotally engages its respective handle 14, oblique support member 40, and oblique support member 44 at junction 214.

Handle 14 includes first and second ends 216. Adjacent to and inwardly from each of the first and second ends 216 is a junction pin opening 218 for pin 65 that engages each of handle 14, oblique support member 40, and oblique support member 44. Pin 65 extends entirely through each of handle 14, oblique support member 40, and oblique support member 44. Handle 14 is on the outer face of oblique support member 40 that in turn is on the outer face of oblique support member 44. Oblique support member 44 is positioned inwardly of each of oblique support member 40 and handle 14. Oblique support member 40 is sandwiched between handle 14 and oblique support member 44.

Junction 214 is disposed between handle end 216 and cradle 202. Cradle 202 is disposed between junction 214 and connection 70. Connection 70 is disposed between cradle 202 and end support member 72 of the handle 14.

FIGS. 5, 6A, 6B, 6C, 6D, and 6E show that the handle 14 can engage and disengage the cradle 202. When engaged in the cradle 202, the handle 14 lies at position A shown in FIG. 5. At position A, the connection 70 lies outwardly of a plane defined by upright support members 22. From position A, the handle 14 may be disengaged from the cradle 202 and rotated rearwardly and upwardly to position B. At position B, the connection 70 is disposed inwardly of the plane defined by upright support members 22 and inwardly. From position B, the handle 14 may be rotated upwardly and rearwardly to position C, where the handle 14 is disposed in an upright or vertical position. From position C, the handle 14 may be rotated downwardly and rearwardly to position D, where the connection 70 is disposed inwardly of a plane defined by support members 20. From position D, the handle 14 may be rotated downwardly and rearwardly to position E where the connection 70 is disposed outwardly of a plane defined by support members 20. A user holds the handle at position E.

At each of the positions A, B, C, D, and E, and between each of the positions A, B, C, D, and E, the U-shaped handle 14 is outside of the frame 12 of the pet wagon 14. In other words, as the U-shaped handle 14 rotates from position A to position E, there is no interference from the frame 12, including from a canopy 220.

At each of the positions A-E, and between the positions A-E, there is one pivot point. Such single pivot point is junction 214.

Figure 15:
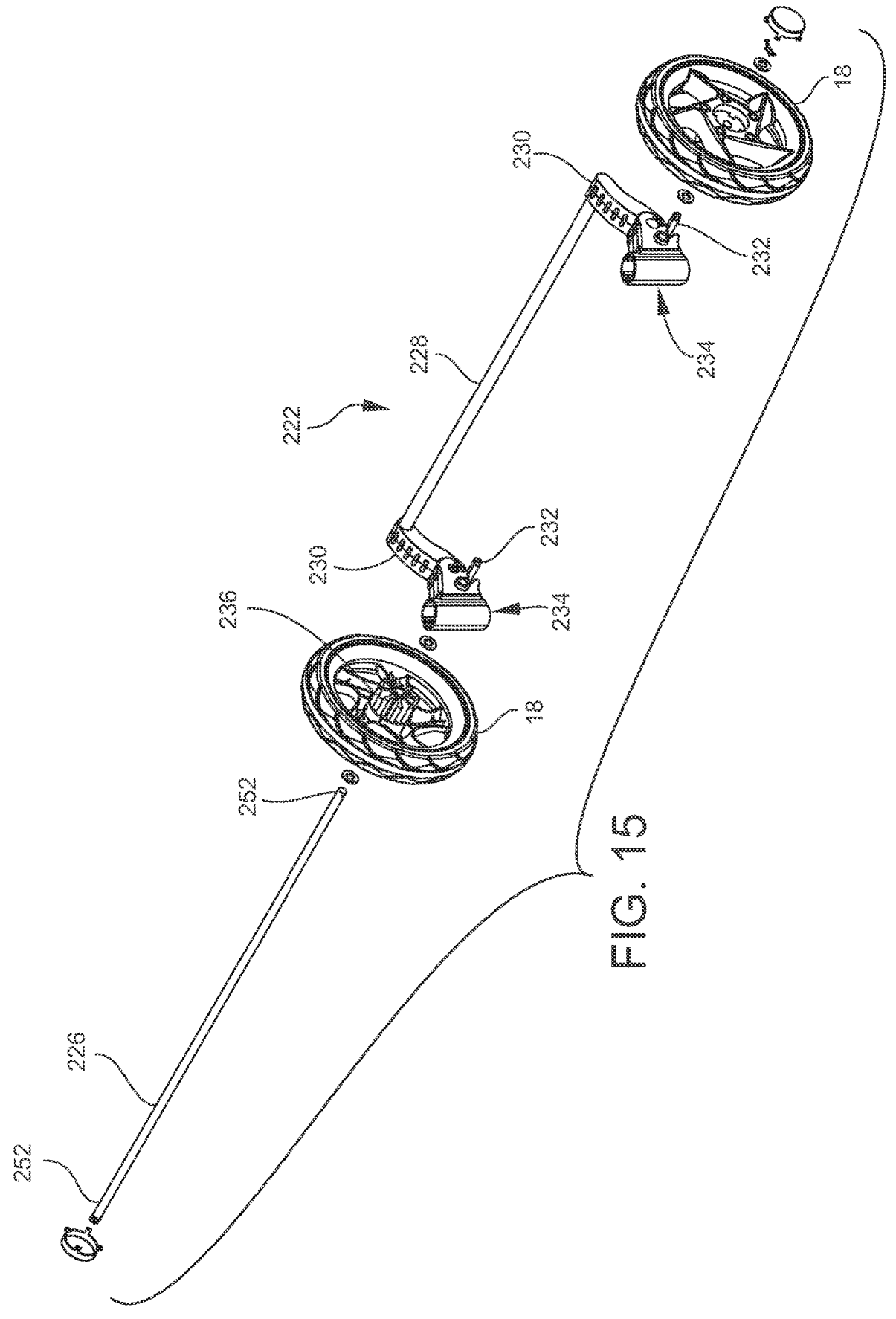
FIG. 15 is a perspective exploded view of the rear wheel arrangement of the pet wagon of FIG. 1.
Figure 16:
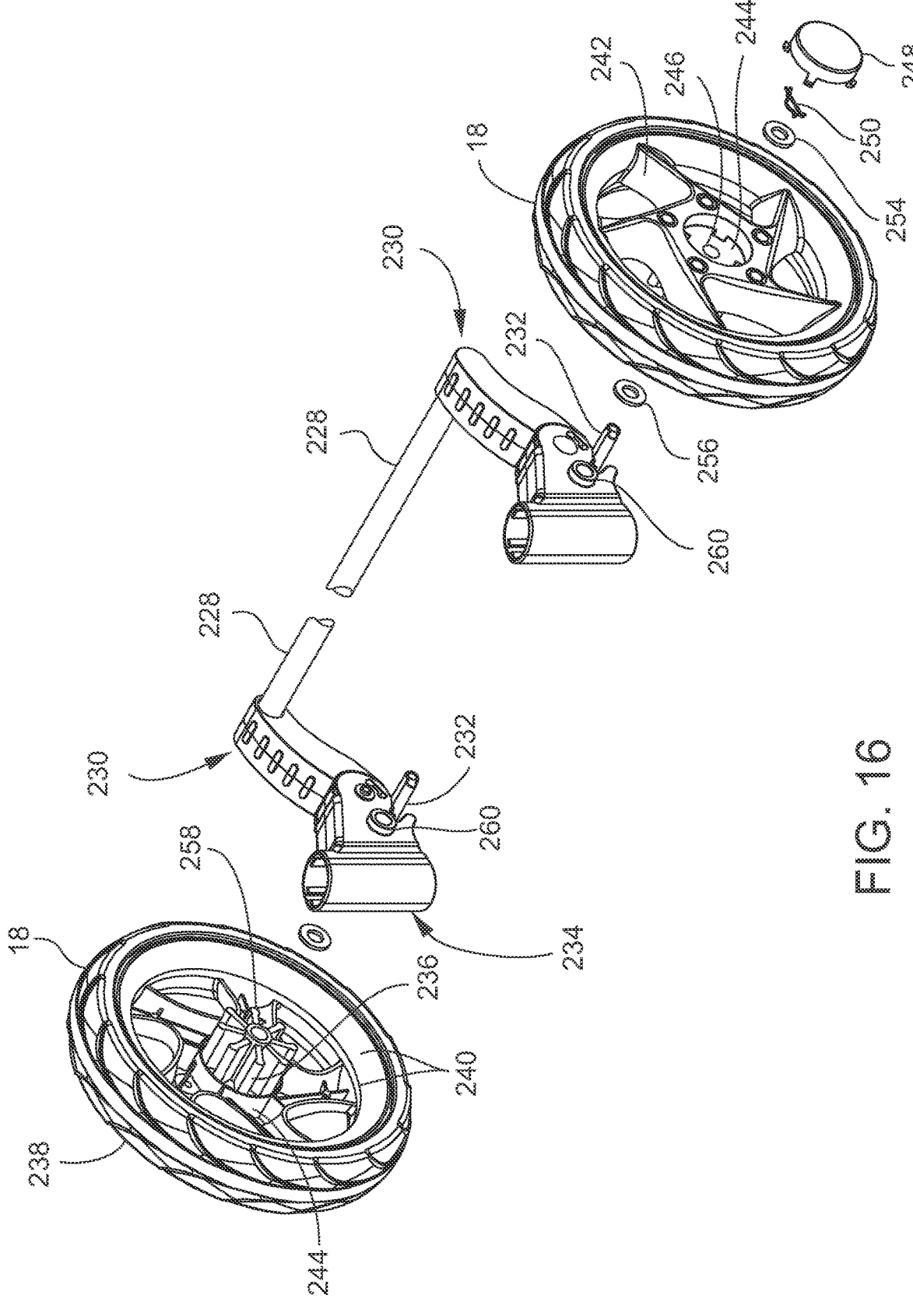
FIG. 16 is a perspective detailed exploded view of a portion of the rear wheel arrangement of FIG. 15.
Figure 17:
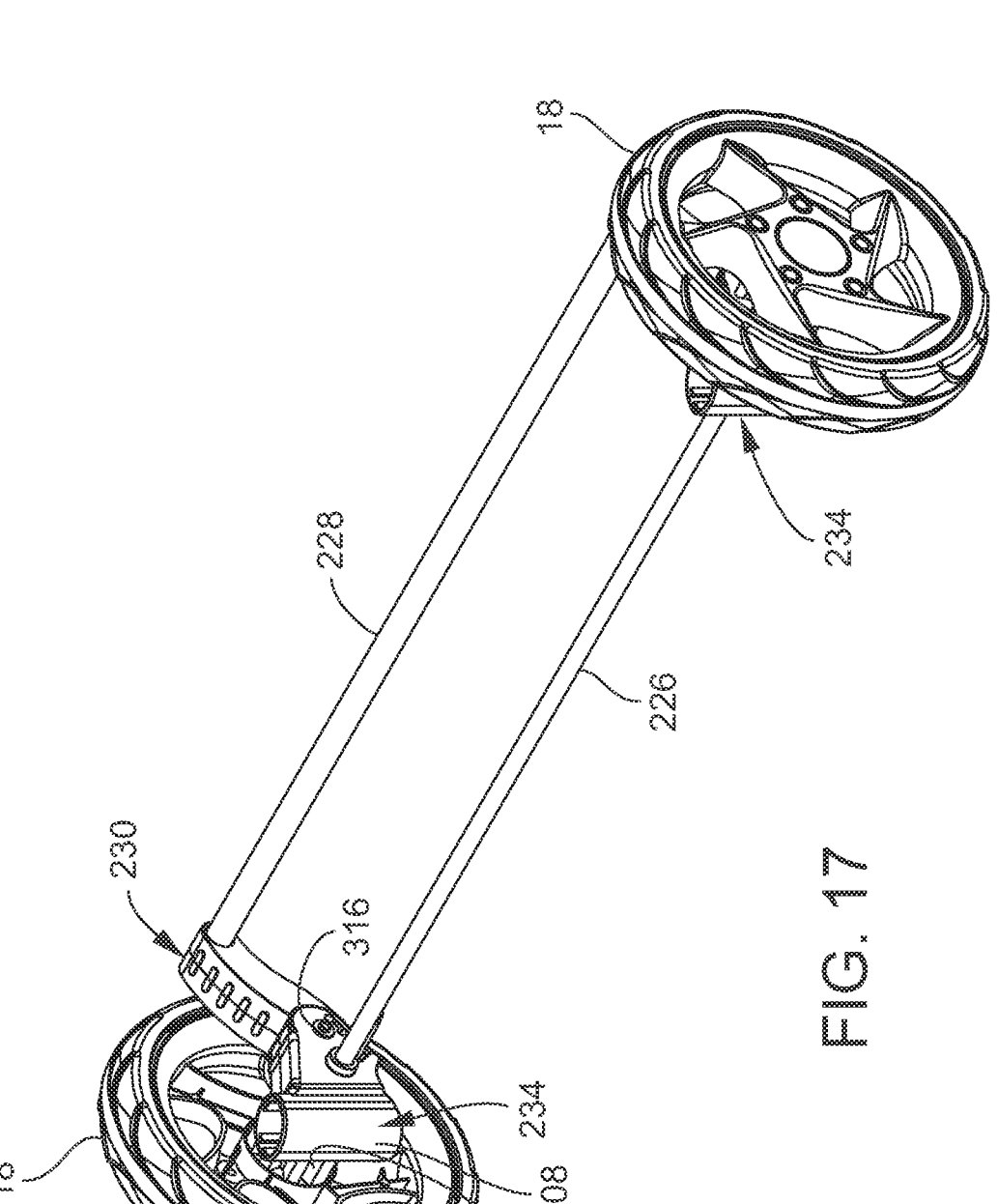
FIG. 17 is a perspective detailed assembled view of the rear wheel arrangement of FIG. 15.

FIGS. 15, 16, and 17 show a rear wheel arrangement 222 of the pet wagon 10. Rear wheel arrangement 222 includes a first and second rear wheels 18, an axle 226, a brake or lock foot push tubular member 228, brake or lock pivot levers 230 having brake or lock fin engaging extensions 232, brake or lock bases 234, and brake or lock inwardly extending fins 236 fixed to the first and second wheels 18.

Figure 18:
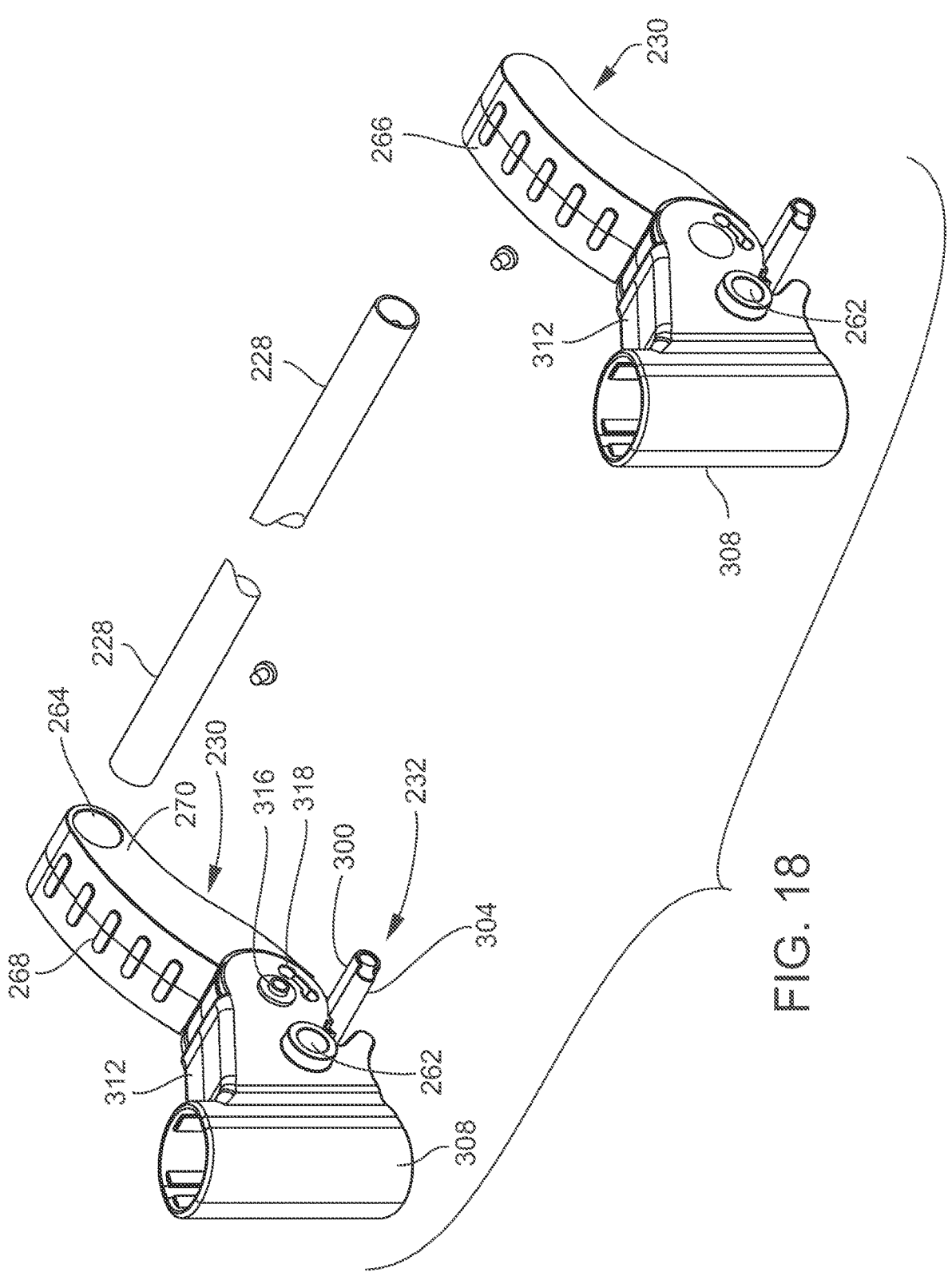
FIG. 18 is a perspective detailed view of a portion of the brake or lock assembly of the rear wheel arrangement of FIG. 16.

Each of the first and second wheels 18 includes a tire mounted on a rigid interior rim 240. A spoke arrangement 242 extends inwardly from the rim 240 and includes a bearing portion 244 that rotatably engages the axle 226 though opening 246. Bearing portion 244 includes the brake or lock fins 236 that radiate from inner bearing portion 258 that forms axle opening 246. Rim 240, spoke arrangement 242, bearing portion 244, and brake or lock fins 236 are one-piece. Rear wheel arrangement 222 further includes dirt excluding end caps 248 that engage their respective bearing portions 244, cotter pins 250 for engaging their respective axle ends 252, axle engaging outer washers 254 for being disposed between their respective cotter pins 250 and bearing portions 244, and axle engaging inner washers 256 for being disposed between "a" and "b" where "a" is an inner bearing portion 258 from which the fins 236 radiate and that forms axle opening 246 and "b" is a boss 260 extending outwardly from brake or lock base 260. Axle opening 262, shown in FIG. 18, extends through brake or lock base 234 and bosses 260, which bosses 260 are found on each of the sides of the bases 234.

Brake or lock foot push tubular member 228 is engaged to and between pivot levers 230. Tubular member 228 is preferably formed of metal. If desired, member 228 may be rod. Tubular member 228 is straight. Each of the pivot members 230 includes an inner opening 264 in a proximal upper end of a respective pivot member 230. One end portion of the tubular member 228 is fixed, such as by welding, gluing, or with pins, in a respective inner opening 264. When the tubular member 228 is stepped on or pushed down on, regardless of the location where the tubular member 228 is stepped upon, the pivot levers 230 pivot downwardly. Further, if the roughened surface 266 of one pivot lever 230 is stepped upon so as to pivot downwardly such pivot lever 230, the other pivot lever 230 also pivots downwardly.

Each of the pivot levers 230 includes the upper roughened surfaced 266. Upper surface 266 is roughened by the inclusion thereon of spaced apart oblong shaped raised portions 268 such that a foot is less likely to slip off a respective pivot lever 230.

Figures 19A, 19B:
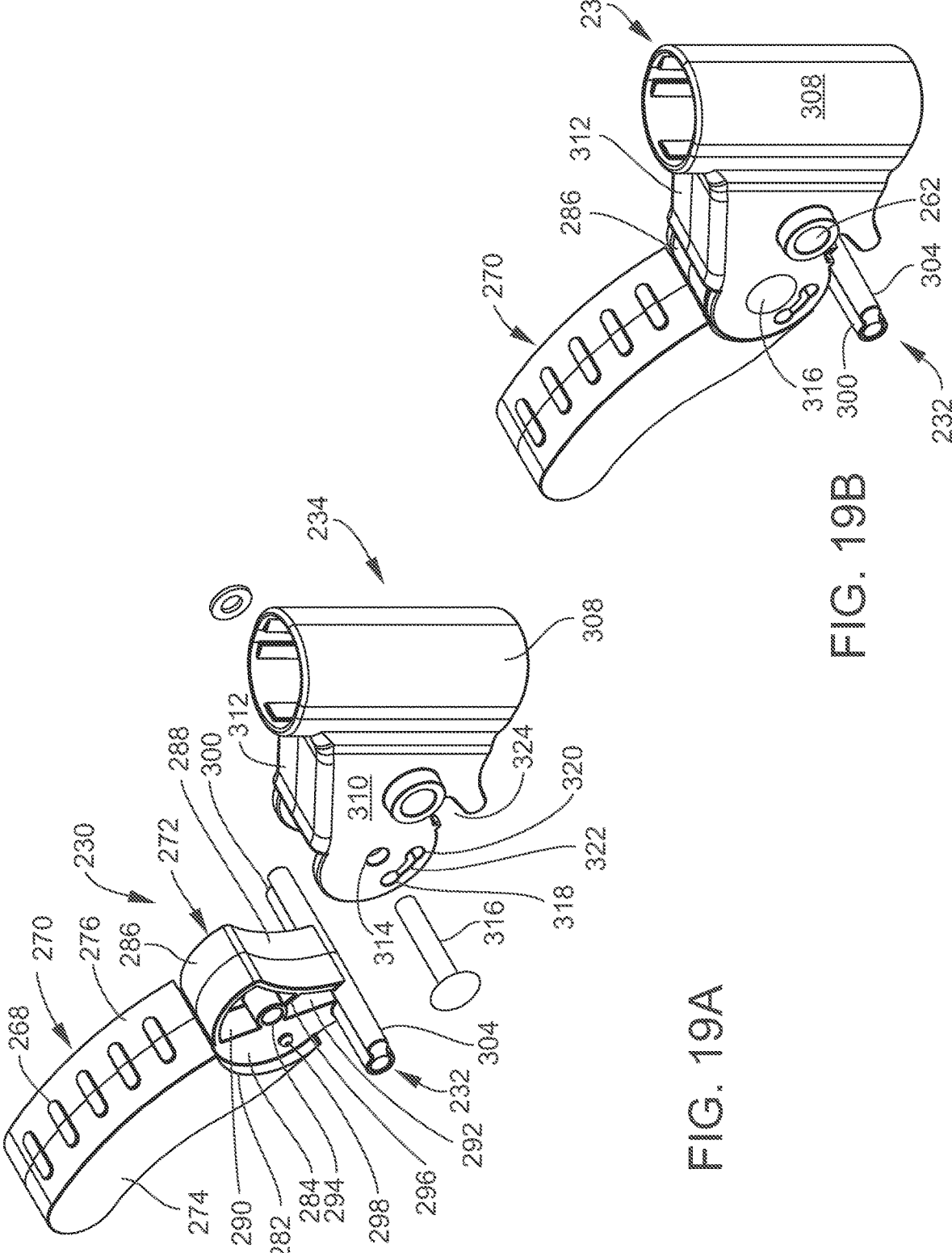
FIG. 19A is a perspective detailed exploded view of a portion of the brake or lock assembly of the rear wheel arrangement of FIG. 16.
FIG. 19B is a perspective detailed assembled view of the portion of the brake or lock assembly shown in FIG. 19A.

As shown in FIG. 19A, each of the pivot levers 230 includes a proximal end portion 270 and a distal end portion 272. The proximal and distal end portions 270, 272 are one-piece such that when proximal end 270 is pivoted, such as when stepped upon or when actuated by the foot push elongate member 228, the extensions 232 also are pivoted. The proximal end portion 270 is the portion of the pivot lever 230 that may be stepped upon.

Figures 20A, 20B:
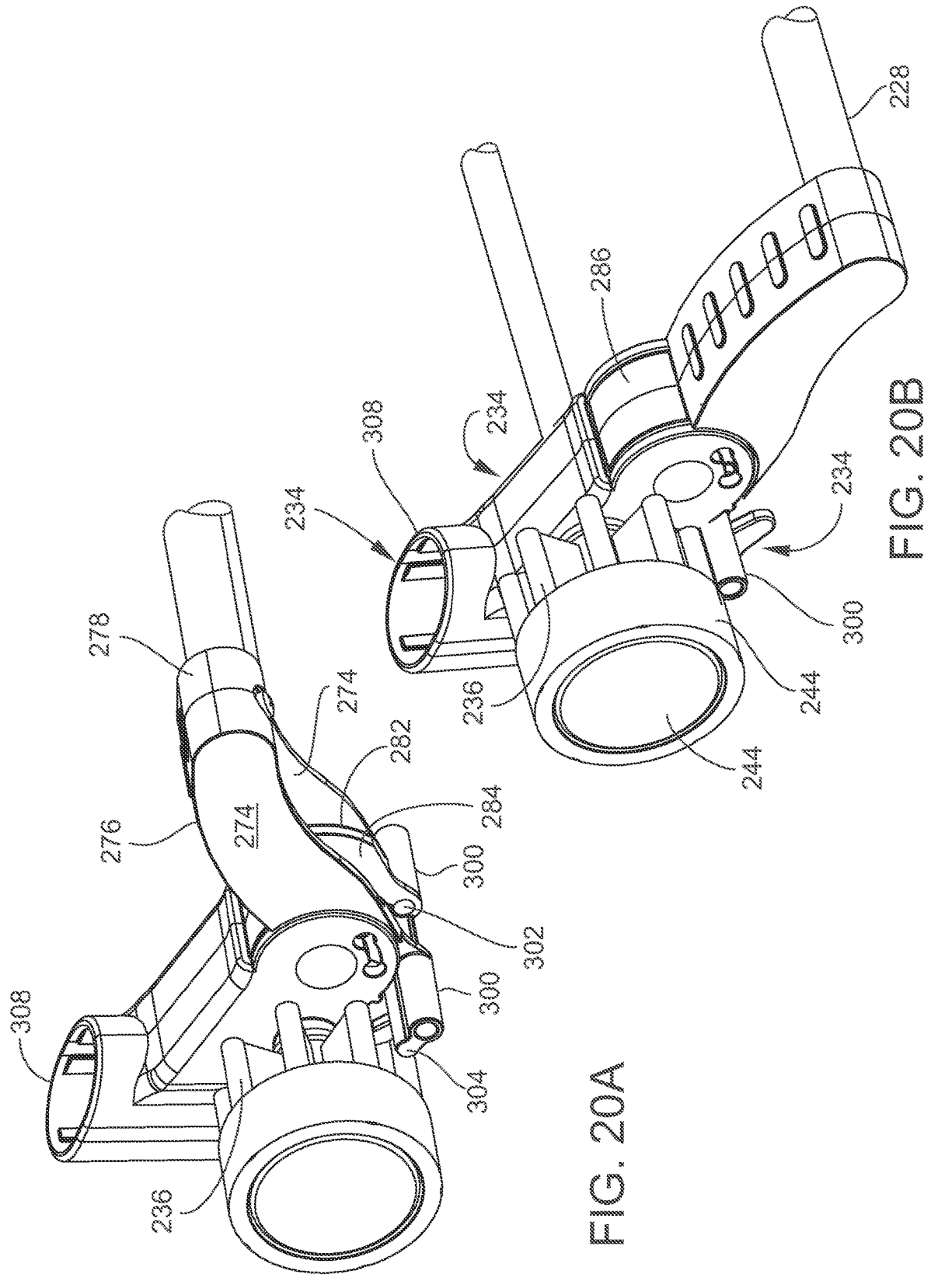
FIG. 20A is a perspective detailed view of the brake or lock assembly of FIG. 16 shown in a disengaged state with fins of a wheel.
FIG. 20B is a perspective detailed view of the brake or lock assembly of FIG. 20A shown in an engaged or braking state with the fins of the wheel.
Figure 21:
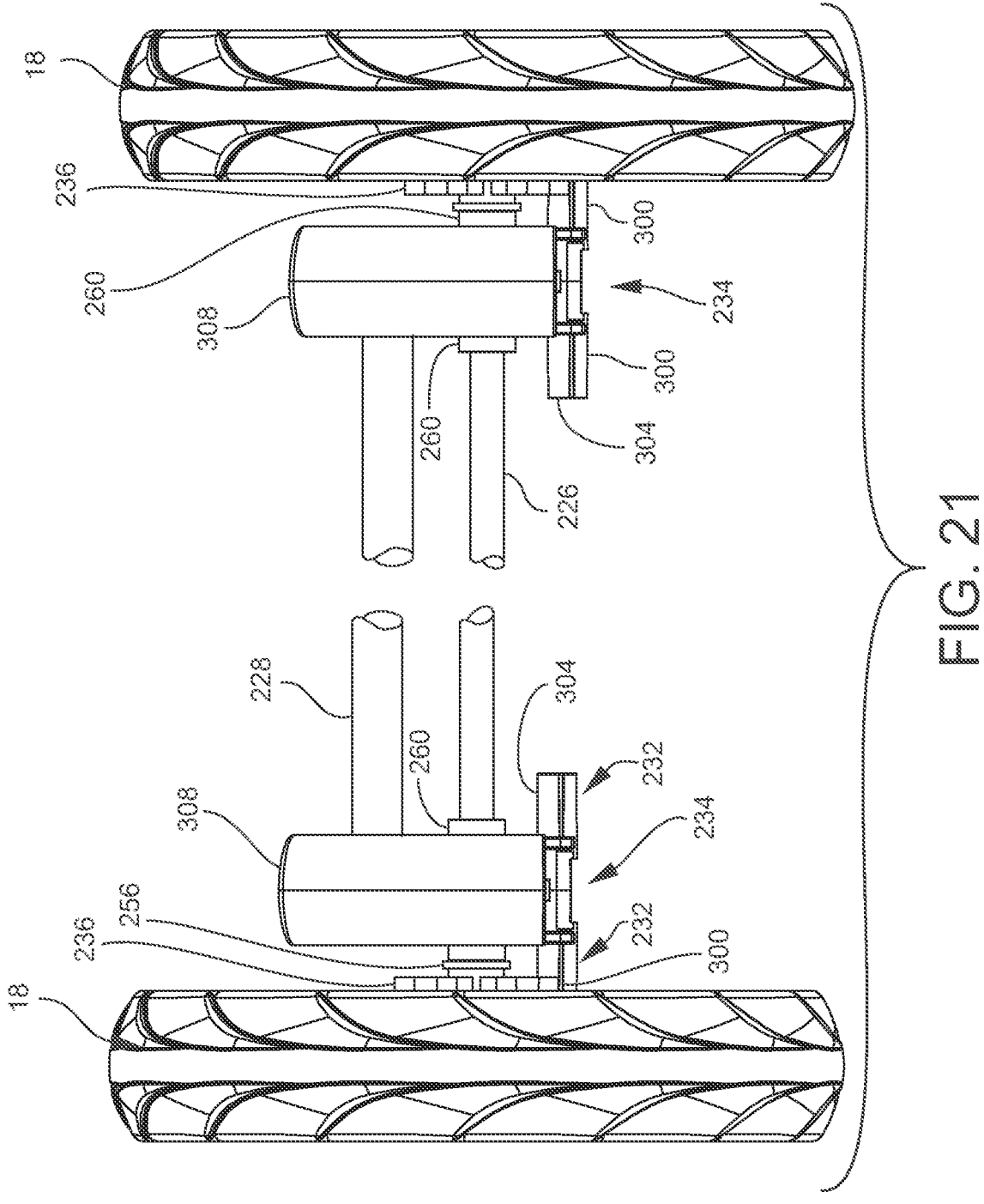
FIG. 21 is a front detailed view of the wheel arrangement of FIG. 15.
Figure 22:
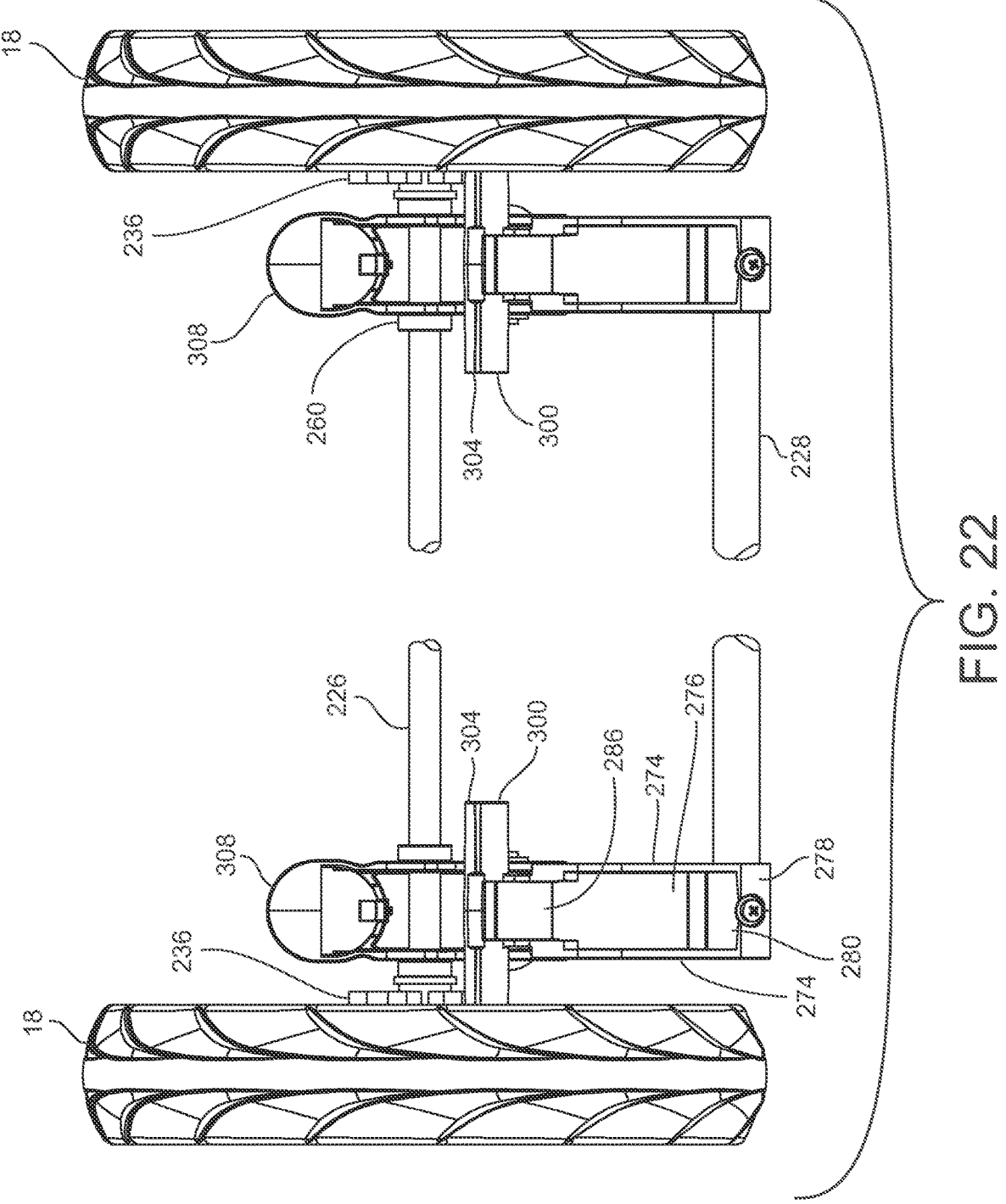
FIG. 22 is a bottom detailed view of the wheel arrangement of FIG. 15.
Figure 23B:
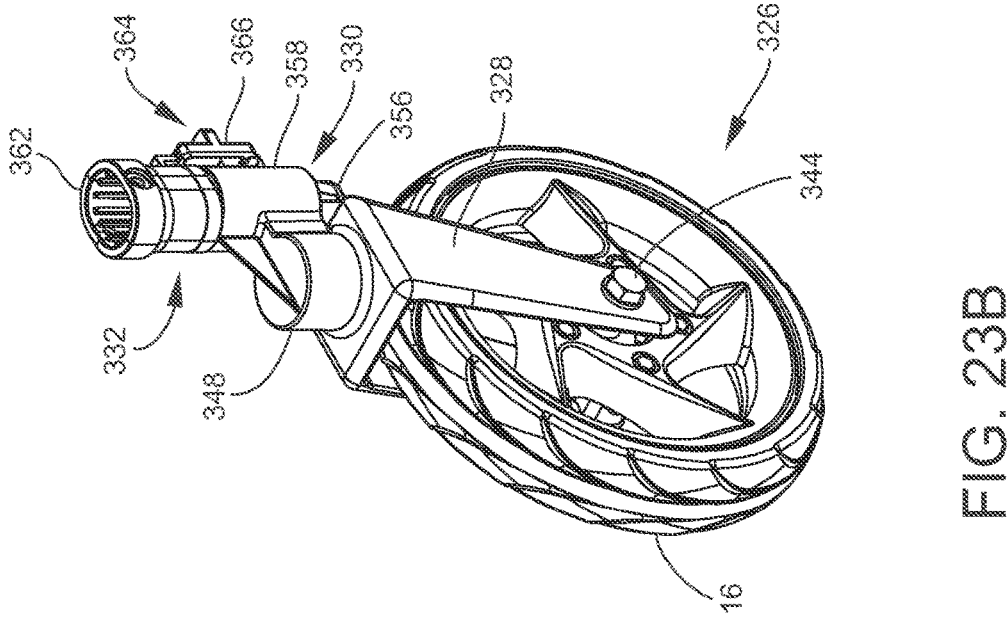
FIG. 23B is a perspective assembled detailed view of the front wheel arrangement of FIG. 23A.
Figure 23A:
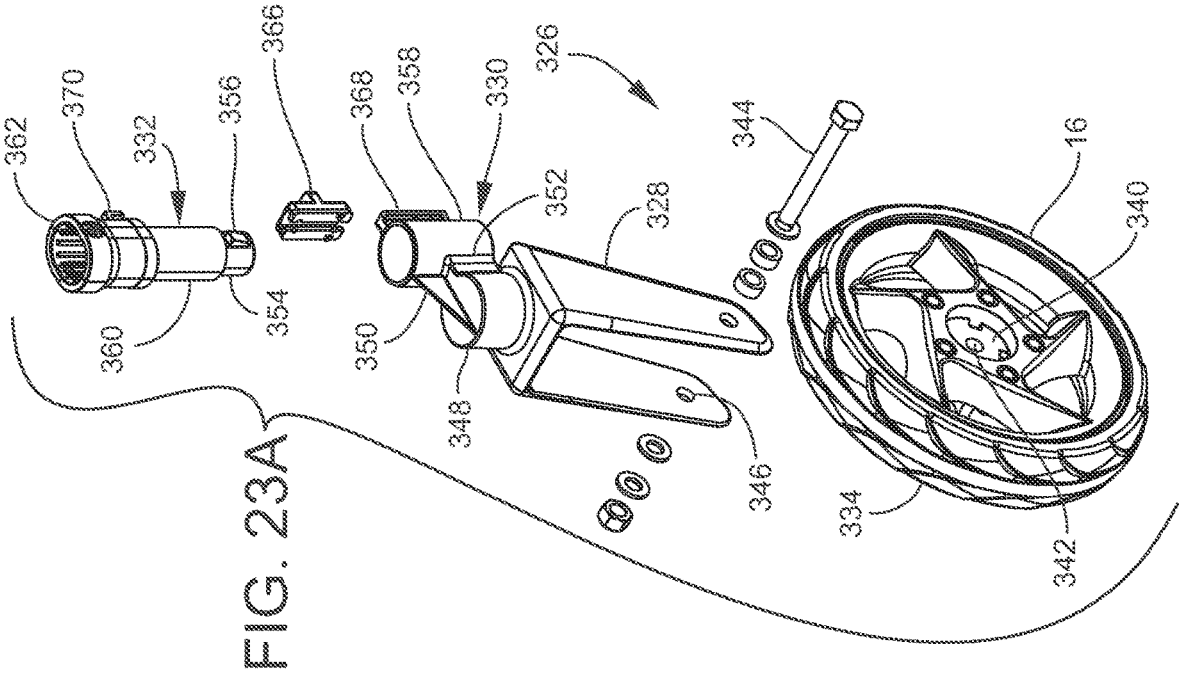
FIG. 23A is a perspective exploded detailed view of a front wheel arrangement of the pet wagon of FIG. 1.
Figures 24A, 24B, 24C:
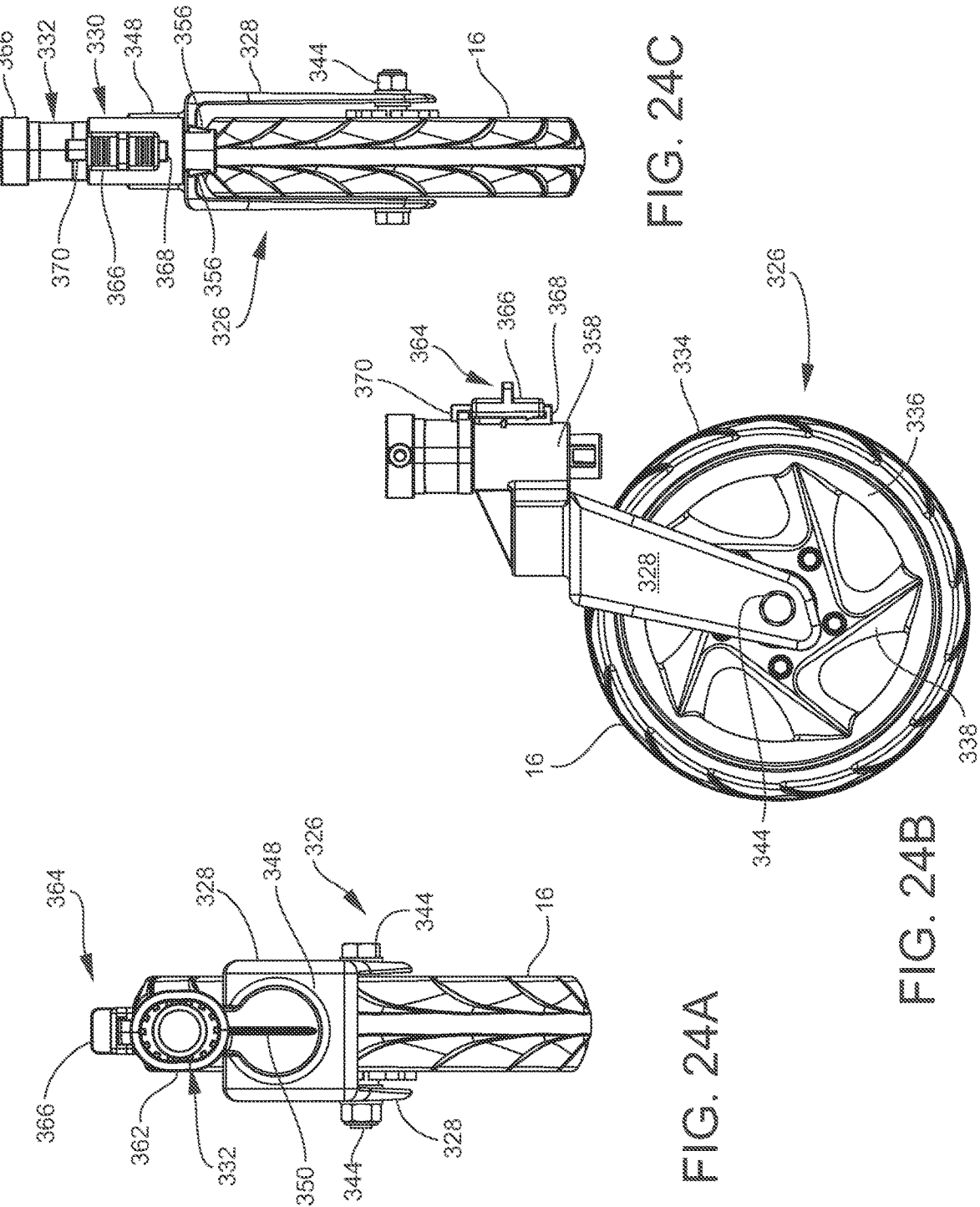
FIG. 24A is a top detailed view of the front wheel arrangement of FIG. 23B.
FIG. 24B is a side elevation detailed view of the front wheel arrangement of FIG. 23B.
FIG. 24C is a rear end detailed view of the front wheel arrangement of FIG. 23B.

FIGS. 20A and 22 show an inside of the pivot lever 230. Proximal end portion 270 includes first and second opposing sides 274 and a top 276. First and second sides 274 are plate portions. Top 276 is formed in the shape of a hook with a rounded rear end 278. The rounded rear end 278 includes a cylindrical receptor 280 therein that forms the inner opening 264 for reception of an end of the foot push elongate member 228.

As shown in FIGS. 19A and 19B, the upper edge of each of the sides 274 includes a curvature of convex shape and the lower edge of each of the sides 274 undulates.

As shown in FIGS. 19A and 20A, each of the proximal sides 274 extends inwardly to make a transition 282 from the proximal end portion 270 to the distal end portion 272. The transition 282 in turn leads integrally into a respective one of first and second sides 284 of the distal end portion 272. First and second sides 284 mount a top convex portion 286, which in turn leads integrally into a front concave portion 288. First and second sides 284 lead integrally to interior walls 290, 292 that are disposed at right angles relative to sides 284. First and second sides 284 and interior walls 290, 292 mount a cylindrical pivot pin receiver 294. A further interior wall 296 extends integrally from convex portion 288 to cylindrical pivot pin receiver 294. Each of the sidewalls 284 of the distal portion 272 includes a nub or tab 298 extending from its respective sidewall 284.

As shown in FIG. 20A, extension 232 includes a pair of tubular support members 300 extending from the sides 284 of the distal end portion 272. Tubular support members 300 are mounted to sides 284 by pin connectors 302.

As shown in FIG. 19A, the tubular support members 300 mount a single elongate member 304 that extends to each of the ends of the tubular support members 300. Single elongate member 304 is supported by an integral connection to tubular support members 300. Single elongate member 304 extends to the outer ends of the tubular support members 300 and further extends between the inner ends of the tubular support members 300. Single elongate member 304 is the structural piece that engages the fins 236 to brake or lock the pet wagon 10. One end of the elongate member 304 engages the fin 236. The other end of the elongate member 304 serves as a visual aid to the user. Also, it should be noted that the pivot lever 230 is symmetrical such that one given pivot lever 230 may be used on either side of the rear wheel arrangement 222, such that manufacturing costs are minimized, and such that ease of assembly is maximized.

As shown in FIG. 19A, pin receptor 294 is cylindrical and is co-axial with convex surface 286 and transition 282. Pin receptor 294 includes two open ends. Each of the open ends is adjacent to one of the tabs or nubs or pin heads 298, which tab or nub or pin head 298 projects from its respective flat sidewall 284.

Pivot lever 230 is engaged to base 234. Base 234 includes an oblong shaped leg receptor 308 that engages one of the oblong shaped vertical support members 22. Base 234 includes a pair of ears 310 extending rearwardly from the leg receptor 308. Base 234 further includes an upper brace 312 extending between upper edges of the ears 310 to maintain the ears 310 in a parallel plane and minimize a spreading of the ears 310. Each of the ears 310 includes a pin receptor 314 for engagement of a pin 316 therein. Each of the ears 310 includes a first opening 318, a second opening 320, and a slot 322 between the openings 318, 320. The tab 298 is engaged by the first opening 318, the second opening 320, and the slot 322. Base 234 further includes a pair of U-shaped receptors 324 for engaging elongate member 304. Receptors 324 work as a stop to a pivoting of pivot lever 230. Frame portion 306 further includes the axle openings 262. One axle opening 262 is formed in one of the ears 310.

Distal end portion 272 is received between the ears 310. Pin receptor 294 of the distal end portion 272 lines up with the pin receptors 314 of the ears 310. Convex portion 286, concave portion 288, and the whole of the distal end portion 272 is received between the ears 310 with the exception of outwardly extending portions of the fin engaging extensions 232.

As shown in FIG. 20A, pivot lever 270 can pivot to an up position where the fin engaging extensions 232 are out of engagement and displaced from the fins 236, where tab 298 is engaged in receptor or hole 318, and where elongate member 304 is out of engagement with the U-shaped receptors 324.

As shown in FIG. 20B, pivot lever 270 can pivot to a down position where the fin engaging extensions 232 engage the fins 236, where tab 298 is engaged in receptor or hole 320, and where elongate member 304 is stopped by the U-shaped receptors 324.

FIGS. 23A, 23B, 24A, 24B, and 24C show a front wheel arrangement 326 that includes front wheel 16, a fork 328, a lower base portion 330, and an upper base portion 332.

Front wheel 16 includes a tire 334 mounted on a rim 336. Wheel 16 further includes spokes 338 between a bearing portion 340 and the rim 336. Bearing portion 340 forms an axle opening 342 for reception of an axle 344.

Fork 328 is U-shaped and includes a pair of axle openings 346. Fork 328 includes thereon a cylindrical mount 348 that supports the lower base portion 330 in a cantilever fashion via a triangular brace 350 and weldments 352. The triangular brace 350 and weldments 352 extend from the mount 348 to the lower base portion 330. Lower base portion 330 pivotally mounts the upper base portion 332.

Lower base portion 330 is cylindrical in shape and includes a bottom opening that is sized to rotatable receive a bottom portion 354 of the upper base portion 332. The bottom portion 354 includes a spring biased button 356 with an oblique face and a stop end such that, to lift the upper base portion 332 out of the lower base portion 330, the spring biased button 356 is depressed until the stop end is pushed within the outside diameter of the bottom portion 354, whereby the bottom portion 354 may be withdrawn from the bottom opening formed in the bottom of the lower base portion 330.

Upper base portion 332 includes a cylindrical portion 360 that rotates in the associated cylindrical portion 358 of the lower base portion 330. Integrally engaged on top of the cylindrical portion 360 of the upper base portion 332 is an oblong leg receiver 362 for engaging one of the front leg support members 20.

Front wheel 16 is rotatable by axle 344. Front wheel 16 and fork 328 are spinnable by cylindrical portions 358, 360 spinning or pivoting or rotating relative to each other.

Upper base portion 332 and lower base portion 330 are lockable to each other so as to prevent spinning relative to each other by a lock 364. Lock 364 includes a slide 366 that engages a track 368 on lower portion 330. Lock 364 further includes an L-shaped extension 370 on the upper base portion 332. Slide 366 engages extension 370 in a friction fit manner to fix the lower and upper base portions 330, 332 against spinning relative to each other. When slide 366 is slid downwardly and disengaged from extension 370, but still engaged with track 368, lower and upper base portions 330, 332 may spin relative to each other such that front wheel 16 may spin. As shown in FIG. 4B, lock 364 is disposed on rear portions of the lower and upper base portions 330, 332 and, as shown in FIG. 4A, the lock 364 is not shown on the lower and upper base portions 330, 332.

In operation, to push or pull the pet wagon 10 from the back of the pet wagon 10, the user places the handle 14 in the position shown in FIG. 1. That is, the handle 14 is engaged by the cradles 202 with the upper and lower portions 66, 68 of the handle 14 being disposed in the same plane. As the user walks and pushes the pet wagon 10, force is transmitted from the handle 14 through the pivot pins 65, then into the oblique support members 40, 44, then into the U-shaped members 42, then into the front and rear lower support members 24, 26, and then into the rest of the frame 12, including the support platform 46, front posts 20, rear posts 22, front U-shaped support member 28, and rear U-shaped support member 34.

Figure 5:
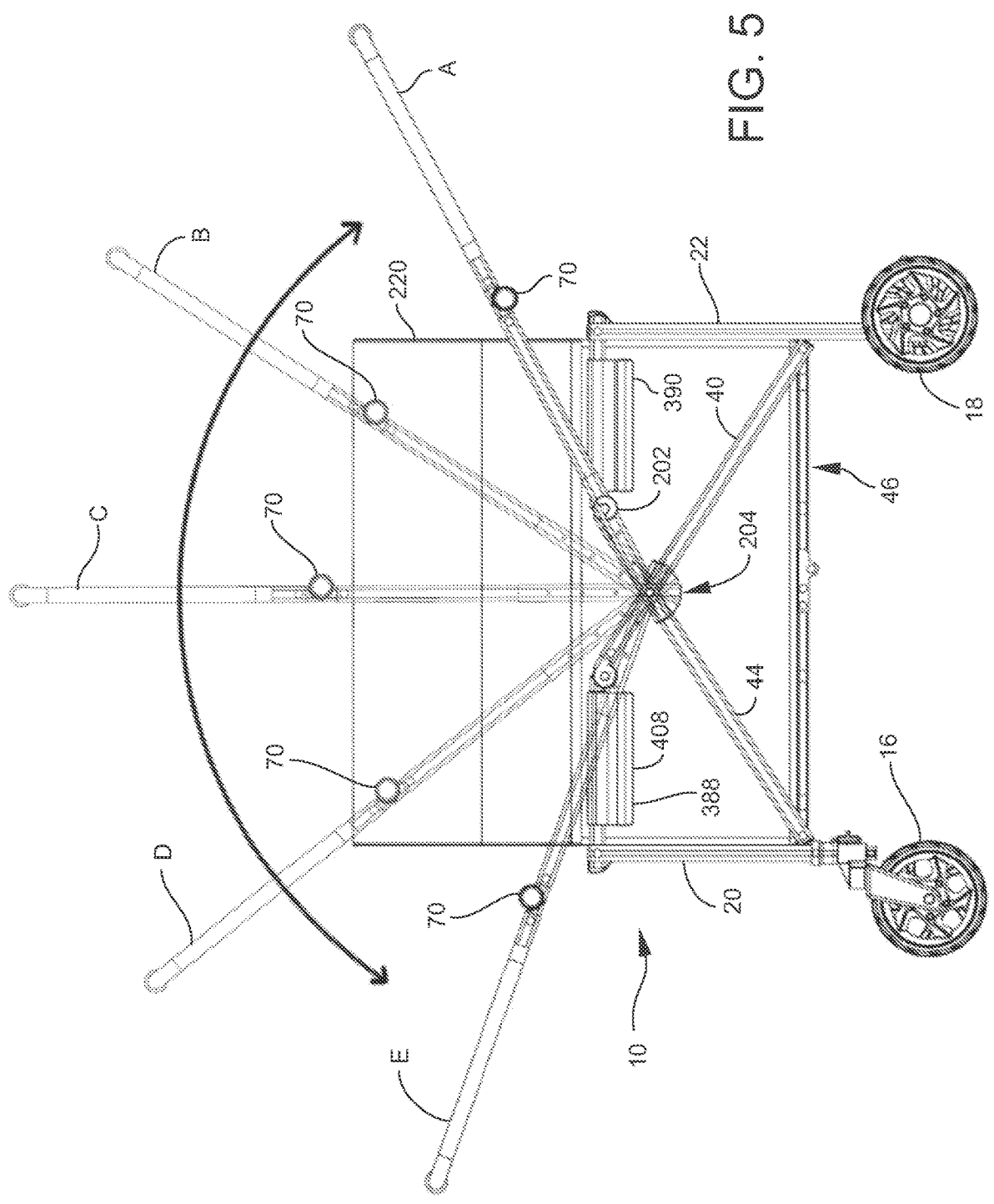
FIG. 5 is a side view of the frame of the pet wagon of FIG. 1, and shows a pivoting of a handle of the pet wagon to and from front and rear ends of the wagon.
Figures 6A, 6B, 6C, 6D, 6E:
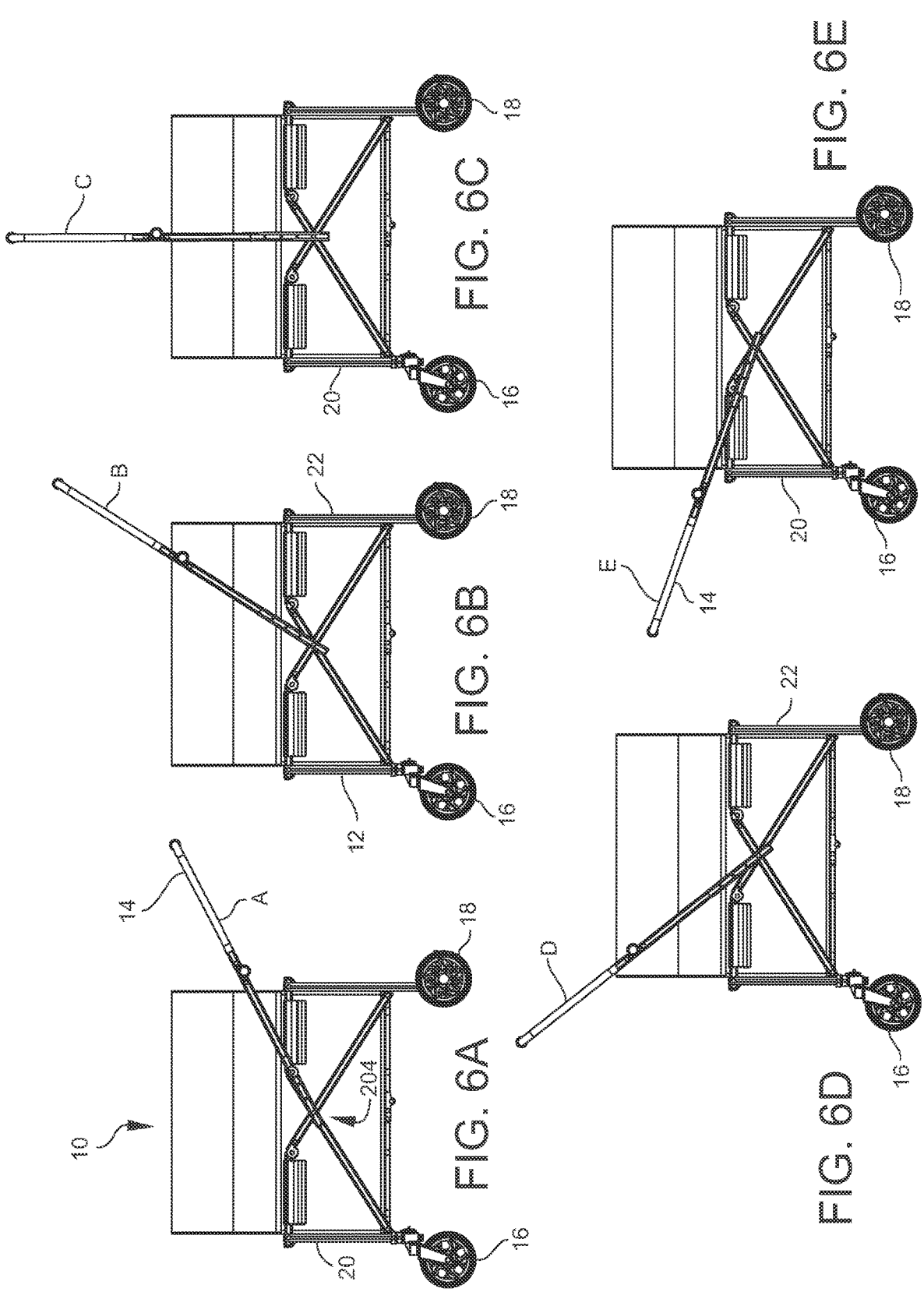
FIG. 6A is a side elevation view of the pet wagon of FIG. 1 and shows one pull or push position of the handle of FIG. 5 at an end of the pet wagon.
FIG. 6B is a side elevation view of the pet wagon of FIG. 1 and shows the handle in the process of being pivoted from one end of the pet wagon to the other end of the pet wagon.
FIG. 6C is a side elevation of the pet wagon of FIG. 1 and shows the handle in the process of being pivoted from one end of the pet wagon to the other end of the pet wagon.
FIG. 6D is a side elevation of the pet wagon of FIG. 1 and shows the handle in the process of being pivoted from one end of the pet wagon to the other end of the pet wagon.
FIG. 6E is a side elevation of the pet wagon of FIG. 1 and shows one pull or push position of the handle of FIG. 5 at an end of the pet wagon.

If the user desires to push or pull the pet wagon 10 from the front of the pet wagon 10, the handle 14 is pivoted to, or close to, pull position E shown in FIG. 6E. As the handle 14 is rotated from the position A to the position E, as shown in FIG. 5, the handle 14 passes over the canopy 220. In position E, as shown in FIG. 6E, the handle 14 is not engaged by the cradles 14. As the user walks and pulls or pushes the pet wagon 10, force is transmitted the same way as it is when pushing or pushing the wagon when the handle is in position A. That is, when pushing or pulling the pet wagon 10 when the handle is in position E, force is transmitted from the handle 14 through the pivot pins 65, then into the oblique support members 40, 44, then into the U-shaped members 42, then into the front and rear lower support members 24, 26, and then into the rest of the frame 12, including the support platform 46, front posts 20, rear posts 22, front U-shaped support member 28, and rear U-shaped support member 34.

If pulling or pushing the pet wagon 10 it may be desirable to stop the pet wagon 10 or lock the pet wagon 10 so that the pet wagon 10 does not roll away. One way to stop the pet wagon 10 is by pulling on the handle 14 so as to reverse a pushing motion. Another way to stop the pet wagon 14 is by ceasing to push on the handle 14 and holding the handle 14 so it cannot go forward. Another way to stop the pet wagon 10 is to step on one of the pivot levers 230 or to step on the foot push tube 228.

When the foot push tube 228 is stepped upon, proximal end portions 270 of the pivot levers 230 pivot downwardly and the distal end portions 272 of the pivot levers 230 pivot upwardly. The distal end portions 272 include elongate member 304, which is pivoted upwardly and into engagement with rotating fins 236, which rotation is thereby stopped. As the fins 236 are engaged by the elongate member 304, the elongate member 304 is thrust upwardly such that the elongate member 304 is then pinched between a fin 236 and the U-shaped receptor or stop 324. Further rotation of the fins 236 and rear wheels 18 are thereby prevented. To again push the pet wagon 10, the pet wagon 10 may be reversed a bit by a pull action to release the elongate member 304 from the fins 236 and/or by pulling up on the foot push tube 228 such as with the top of one's toes or the top of the front of the foot.

It should be noted that, as the foot push tube 228 is stepped up to pivot the proximal end portion 270 of the pivot levers 230 upwardly and the distal end portions 272 of the pivot levers upwardly, the tabs 298 are pushed out of openings 318, to and through slots 322, and into openings 320. When the foot push tube 228 is lifted up manually by the top front of the foot, the tabs 298 are pushed out of openings 320, to and through slots 322, and into openings 318. The friction fit of the tabs 318 in openings 318 and the relatively narrow slot 322 keeps the tabs 318 in their respective openings 318 and minimize the tabs 318 from sliding out of the openings 318 and into the relatively narrow slot 322 unless force is applied such as a pressing down upon of a shoe on the push rod tube 228. Such keeps the tabs 318 in the openings 318 and thus keeps the foot push tube 228 in an up position.

In operation, to steer the pet wagon 10, the pet wagon 10 is provided with front wheels 16, each of which spins about a vertical axis for 360 degrees. Namely, the upper base portion 332 that engages the front post 20 spins relative to lower base portion 330. Rear wheels 18 do not spin about a vertical axis. The pet wagon 10 can be steered from either the position A shown in FIG. 6A or the position E shown in FIG. 6E. The vertical plane defined by each of the rear wheels 18 stays in a fixed position. Rear wheels 18 have an axle 226 engaging the rear wheels 18. There is no common axle between front wheels 16. Each of the front wheels 16 spins independently of the other front wheel 16 about its own vertical axis. Each of the rear wheels 18 rotates independently of the other rear wheel 18. Each of the front wheels 16 rotates independently of the other front wheel 16. Each of the wheels 16, 18 rotates independently of each of the other wheels 16, 18.

In operation, the upper portion 66 of the handle 14 may be set at a desired angle relative to the lower portion 68 of the handle 14. This is done by using the connection 70. From the position shown in FIG. 10A, where the axes of the upper and lower portions 66, 68 define a straight line, the upper portion 66 can be dropped to the position shown in FIG. 10B by taking the following steps: 1) unlocking the connection 70 by rotating in a first direction second lock portion 178 shown in FIGS. 12B, 13A, and 13B, 2) pivoting the upper portion 66 of the handle 14 downwardly relative to the lower portion 68 of the handle 14, and 3) locking the connection 70 by rotating in a second direction second lock portion 178 to fix the upper portion 66 of the handle 14 to the lower portion of the handle 14 in the position shown in FIG. 10B. These steps may be used to fix the upper handle portion 66 to any angle between 180 degrees (the position shown in FIG. 10A) and 360 degrees (where the underside 200 of the upper handle portion 66 is adjacent to the underside 198 of the lower portion 68 of the handle 14). The undersides 200, 198 of the upper and lower portions 66, 68 of the handle 14 are shown in FIG. 11.

In operation, the length of the handle 14 is increased and decreased by increasing and decreasing the length of the lower portion 68 of the handle 14. To do this, the support member portions 82 and 84 of the lower portion 68 are telescoped in and out relative to each other by operating button spring 86.

Figures 27A, 27B:
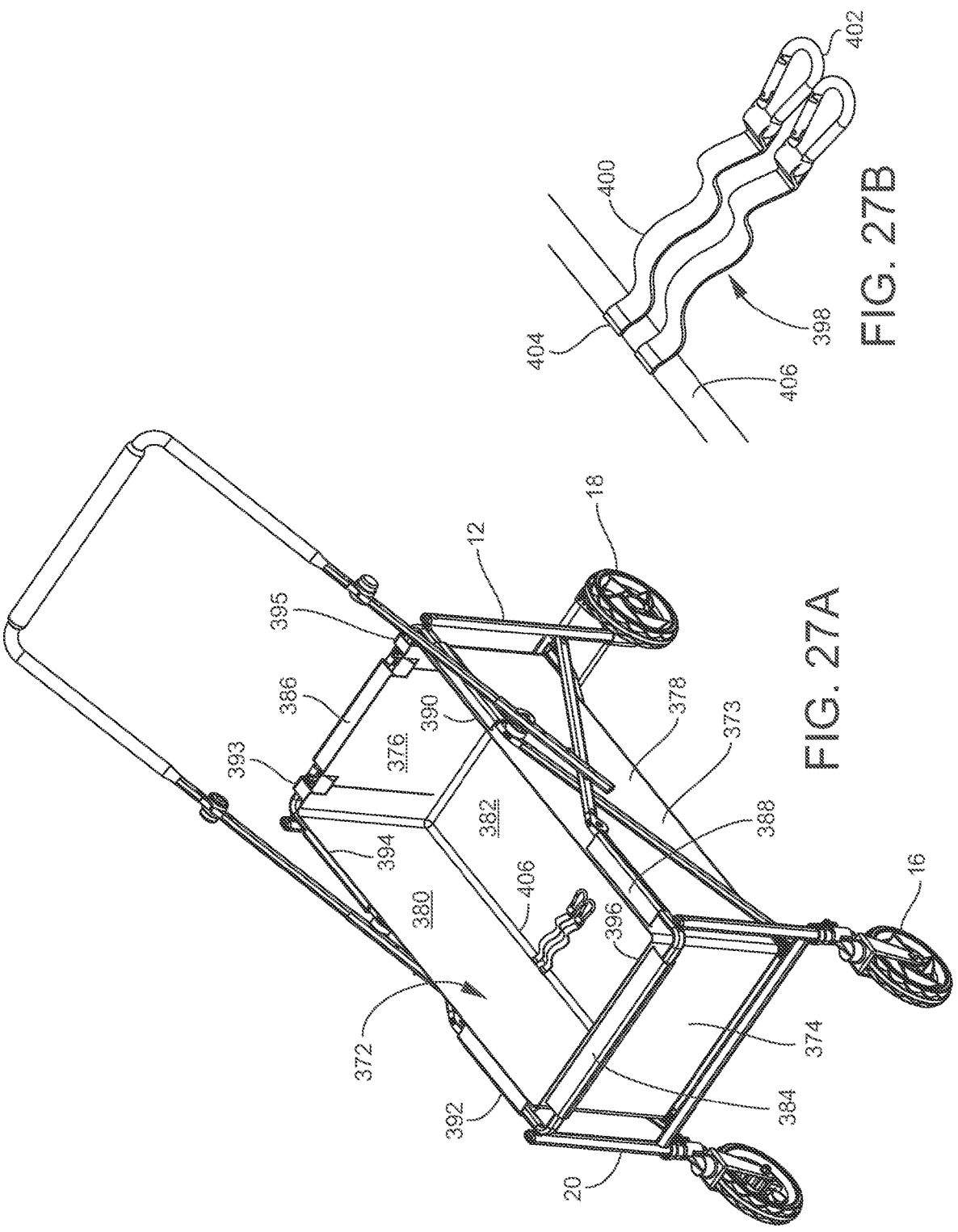
FIG. 27A is a perspective view of the pet wagon frame of FIG. 1 having a receptacle in the frame.
FIG. 27B is a detail view of pet tethers shown in FIG. 1.

FIG. 27A shows a receptacle 372 in the pet wagon frame 12. The receptacle 372 includes a main body 373. The main body 373 is formed by front wall 374, a rear wall 376, a first sidewall 378, a second sidewall 380, and a floor 382. The floor 382 is engaged at right angles to the front wall 374, rear wall 376, first sidewall 378, and second sidewall 380. Sidewall 380 is engaged at right angles to front wall 374 and rear wall 376. Sidewall 378 is engaged at right angles to front wall 374 and rear wall 376. Receptacle 372 has an open top. The receptacle 372 is formed of a flexible material such as a fabric. If desired, the receptacle 372 may be formed of a relatively rigid material such as a plastic, wood, a wood composite, or engineered wood, where such a receptacle 372 is quickly engagable and disengagable from the frame 12 with quick connects, and where such a receptacle is disengaged from the frame 12 prior to the frame 12 being folded in or collapsed.

Whether formed of a relatively rigid material or a flexible material, receptable 372 includes a front removable sleeve 384, a rear removable main sleeve 386, a first front side removable sleeve 388, a first rear side removable sleeve 390, a second front side removable sleeve 392, and a second rear side removable sleeve 394. Receptacle 372 further includes rear short sleeves 393 and 395.

Front removable sleeve 384 engages support member portion 30. Rear removable sleeve 386 engages support member portion 36. First front side removable sleeve 388 engages support member portion 32. First rear side removable sleeve 390 engages support member portion 38. Second front side removable sleeve 392 engages support member portion 32. Second rear side removable sleeve 394 engages support member portion 38. Short sleeves 393, 395 engage support member 36.

Each of the sleeves 384, 386, 388, 390, 392, 393, 394, and 395 extend from a perimeter top edge 396 of the receptacle 372, or from a location adjacent to the perimeter top edge 396, to an outside face of the receptacle 372. Each of the sleeves 384, 386, 388, 390, 392, 393, 394, and 395 includes a quick connector, such as Velcro®, where such sleeve engages the outside face of the receptacle 372.

Sleeves 384, 386, 388, 390, 392, 393, 394, and 395 may be formed of a flexible material such as fabric or be formed of a relatively rigid material having a flexible seam such as at the receptacle perimeter 396 such that such sleeves can pivot up and down over their respective portions of the frame 12 when being engaged or disengaged from the frame 12 by their respective quick connectors.

The receptacle main body 373 is disposed inwardly of the frame 12. In other words, the main body 373 is disposed inwardly of the U-shaped frame members 28, 34, the oblique support members 40, 44, the handle 14, the posts 20, 22, and the support platform 47.

FIGS. 27A and 27B show a pair of tethers 398. Each of the tethers 398 includes a flexible strap 400 and a quick connect such as a carabiner clip 402. The proximal end of each of the straps 400 is engaged to a junction 406 between sidewall 380 and floor 382. The carabiner clip 402 may be quickly clipped to and unclipped from a D-shaped ring on the collar of a pet such as a dog.

Figure 28:
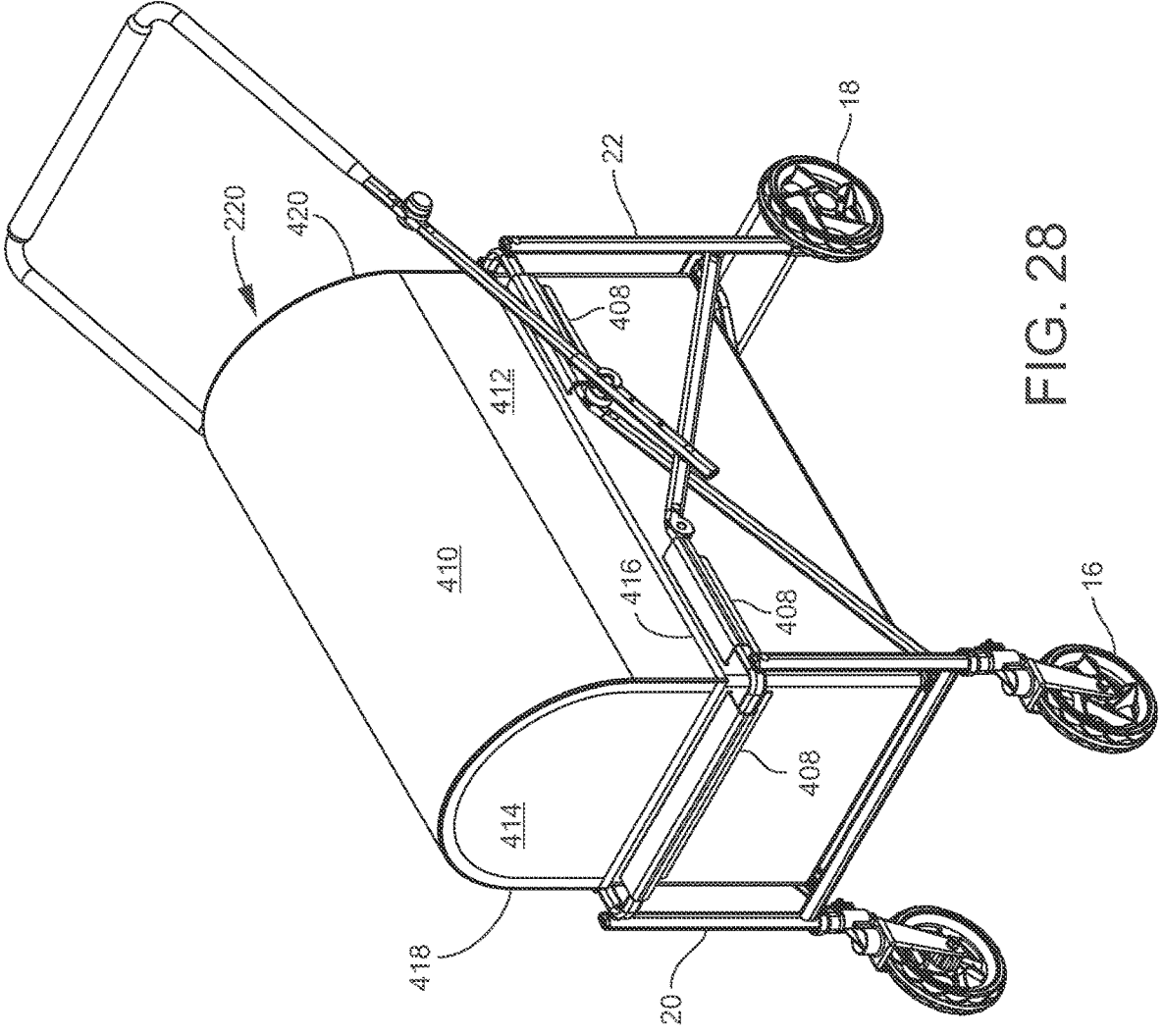
FIG. 28 is a perspective view of the pet wagon of FIG. 27A having a first embodiment canopy over the receptacle.

FIG. 28 shows bottom portions 408 of the sleeves 384, 386, 388, 390, 392, 393, 394, and 395. These bottom portions 408 are what is removably engaged to the faces of the front wall 374, rear wall 376, sidewall 378, and sidewall 380.

FIG. 28 shows canopy 220. Canopy 220 is also shown in FIG. 5. Canopy 220 is U-shaped in section. Canopy portion 410 is cylindrical shaped. Canopy portion 412 defines a plane. Canopy portion 414 is an end wall. Canopy portions 410, 412, 414 are preferably formed of a flexible material such as fabric that minimizes UV transmission. Canopy 220 includes a rectangular lowermost perimeter 416 that abuts or rests upon the perimeter 396 of the main body 373 and is engaged to the frame 12 such as by a quick connect, where the quick connect may be Velcro® or magnets or a mechanical device such as a clip.

Canopy 220 includes a U-shaped rear support member 418 and a U-shaped front support member 420. Opposite of the end wall canopy portion 414 is a U-shaped opening such that the pet caregiver can see into the canopy 220 and main body 373 of the receptacle 372.

Figure 29:
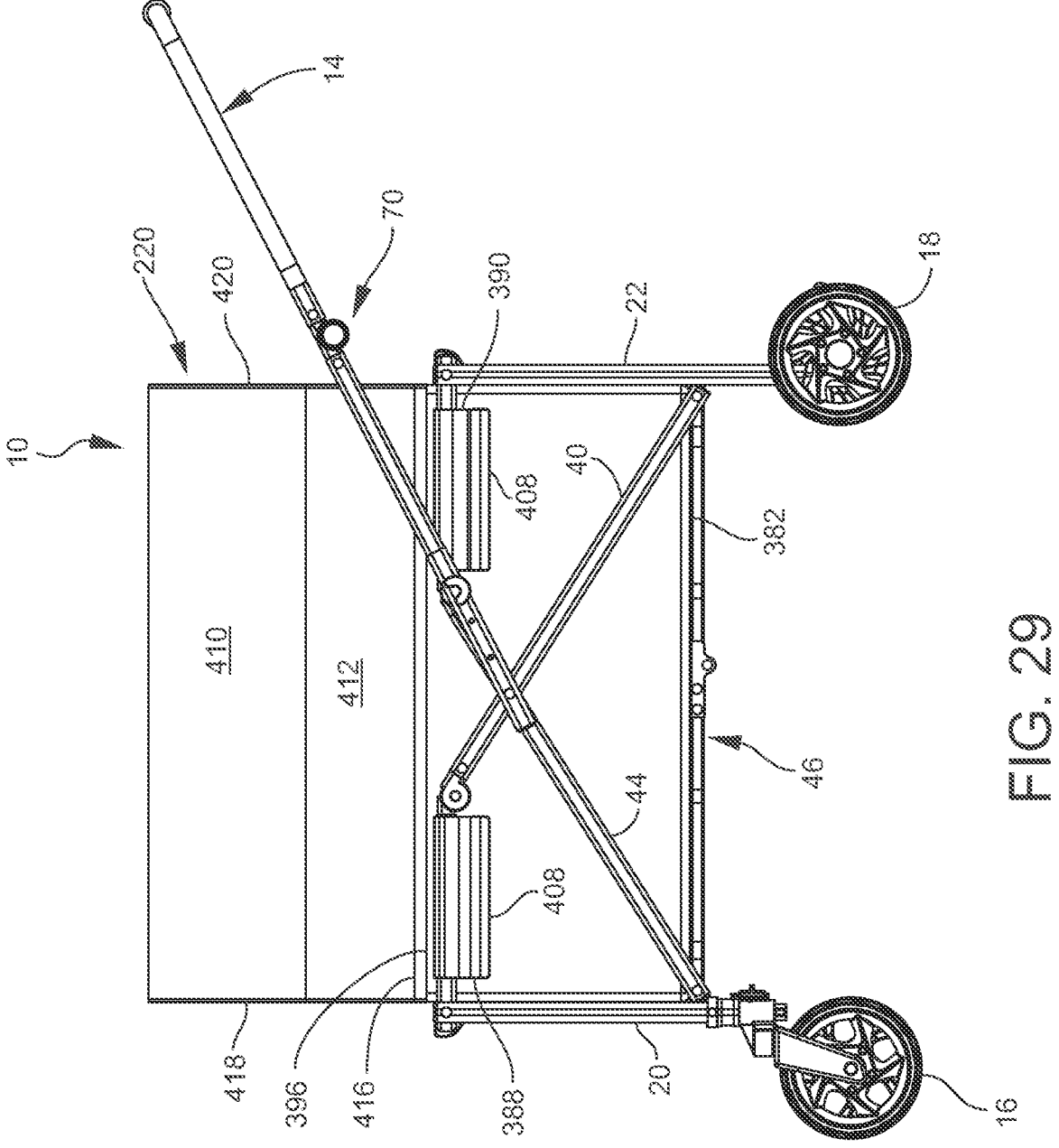
FIG. 29 is a side view of the pet wagon of FIG. 28.

FIG. 29 shows the bottom portions 408 of front side sleeve 388 and rear side sleeve 390. FIG. 29 shows that sleeves 388 and 390 extend from the main body 373 at a location immediately below the top edge perimeter 396. The other sleeves 384, 392, 394, 393, 395, and 386 also are engaged to the main body 373 at a location immediately below the top edge perimeter 396.

FIG. 29 shows that the floor 382 of the receptacle 372 rests on and is supported by the support base 46. The support base 46 is shown in FIG. 3 and includes support members 50, 52, 54, 56, 58, 60, and 62, channel receiver 64, and U-shaped receivers 42.

Figure 30:
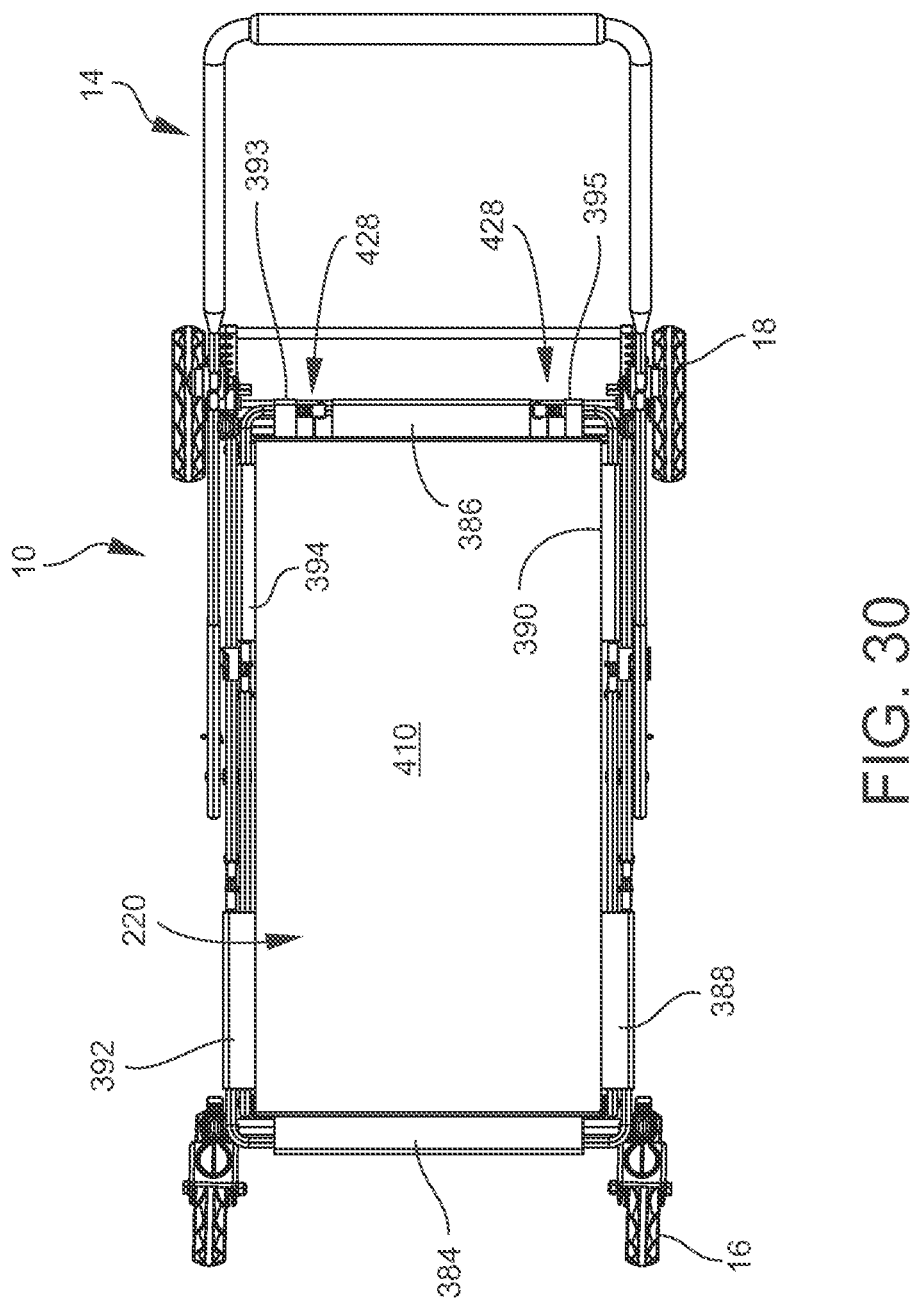
FIG. 30 is a top view of the pet wagon of FIG. 28.

FIG. 30 shows a top view of the pet wagon 10 having the canopy 220. FIG. 30 further shows a top view of the sleeves 384, 386, 388, 390, 392, 394, 393, and 395.

It should be noted that, instead of being integral, the support member portion 36 of rear U-shaped support member 34 may include a removable support member 422, a short support member 424, and a short support member 426, as shown in FIG. 1. A quick connect connection 428, as shown in FIG. 30, is disposed between short end support member 424 and middle support member 422, and another quick connect connection 428 is disposed between short end support member 426 and middle support member 422. Short sleeve 393, shown in FIG. 31, engages short support member 424. Short sleeve 395 engages short support member 426. Sleeve 386 engages middle support member 422.

Figure 31:
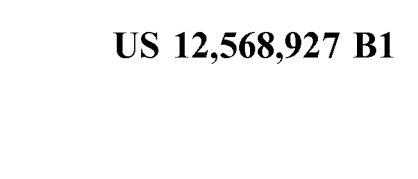
FIG. 31 is a rear end view of the pet wagon of FIG. 28.

FIG. 31 shows a rear door 430. Rear door 430 is flexible and integral with the flexible receptacle 372. Rear door 430 is a portion of the rear wall 376 of the receptacle 372. Rear door 430 further includes sleeve 386 and middle support member 422, both of which swing up and down as part of the rear door 430 when middle support member 422 is disengaged from the frame 12. Rear door 430 is swingable inwardly into the receptacle 372 and outwardly out of the receptacle 372. When swingable outwardly of the receptacle 372 and when the rear wall 376 is formed of a relatively rigid material, the rear door 430 may engage the foot push member 228, which in turn engages the extensions 232 with the fins 236 to brake or lock the pet wagon 10 so that, when the pet jumps or climbs in through the opening left by the rear door 430, movement of the pet wagon 10 is minimized.

Rear door 430 may include a seam or hinge portion 432 whether the rear door 430 is formed of a relatively rigid material or a flexible material such as fabric.

FIG. 31 further shows a U-shaped front opening 434 defined by the front U-shaped support member 420. End wall 414 of the canopy 220 is seen through the front opening 434.

Figure 32:
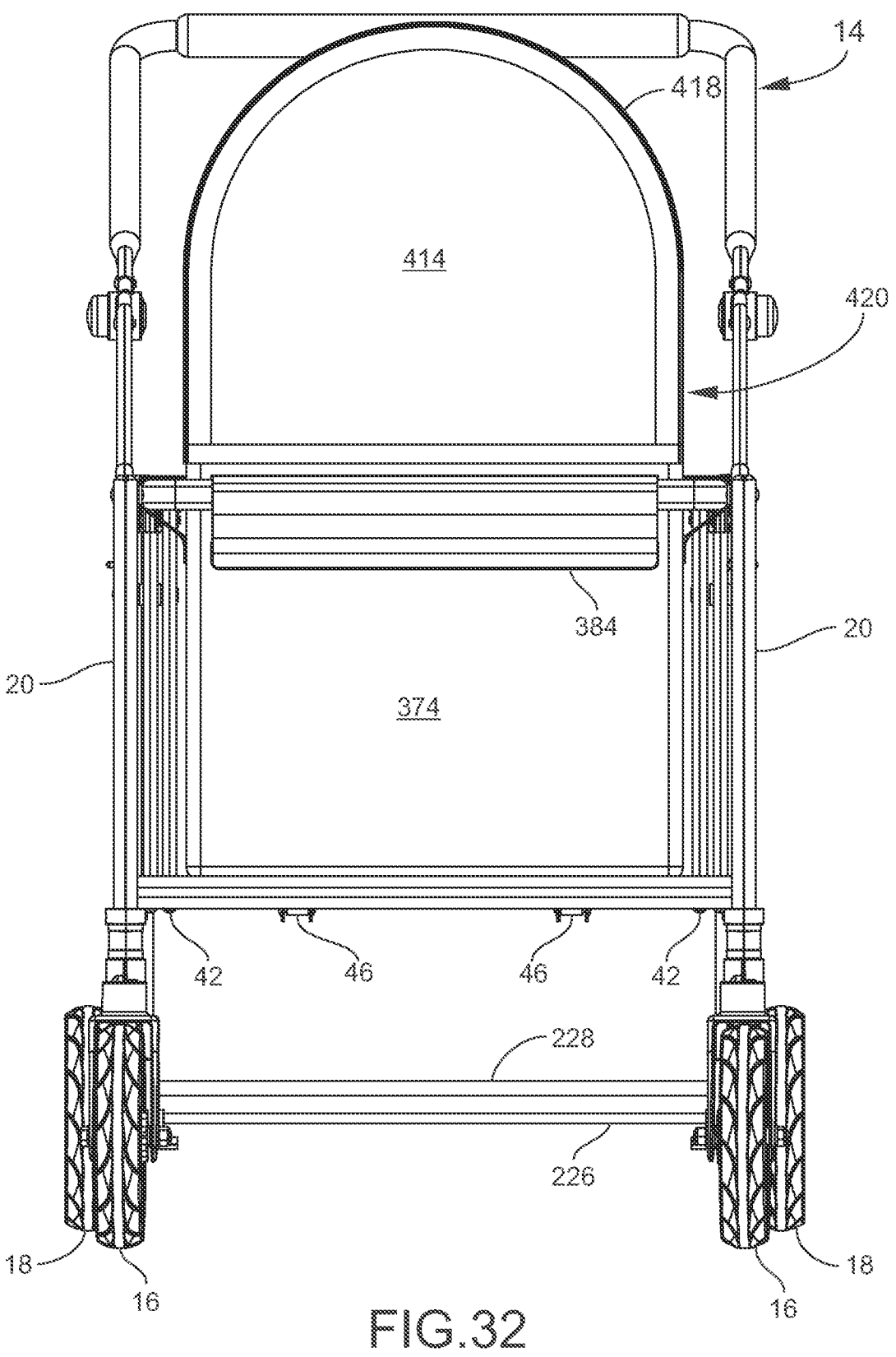
FIG. 32 is a front end view of the pet wagon of FIG. 28.

FIG. 32 shows a front view of the pet wagon 10 with the canopy 220. FIG. 32 shows the front side 414 of the canopy 220, the front wall 374 of the receptacle 372, and sleeve 384.

Figure 33:
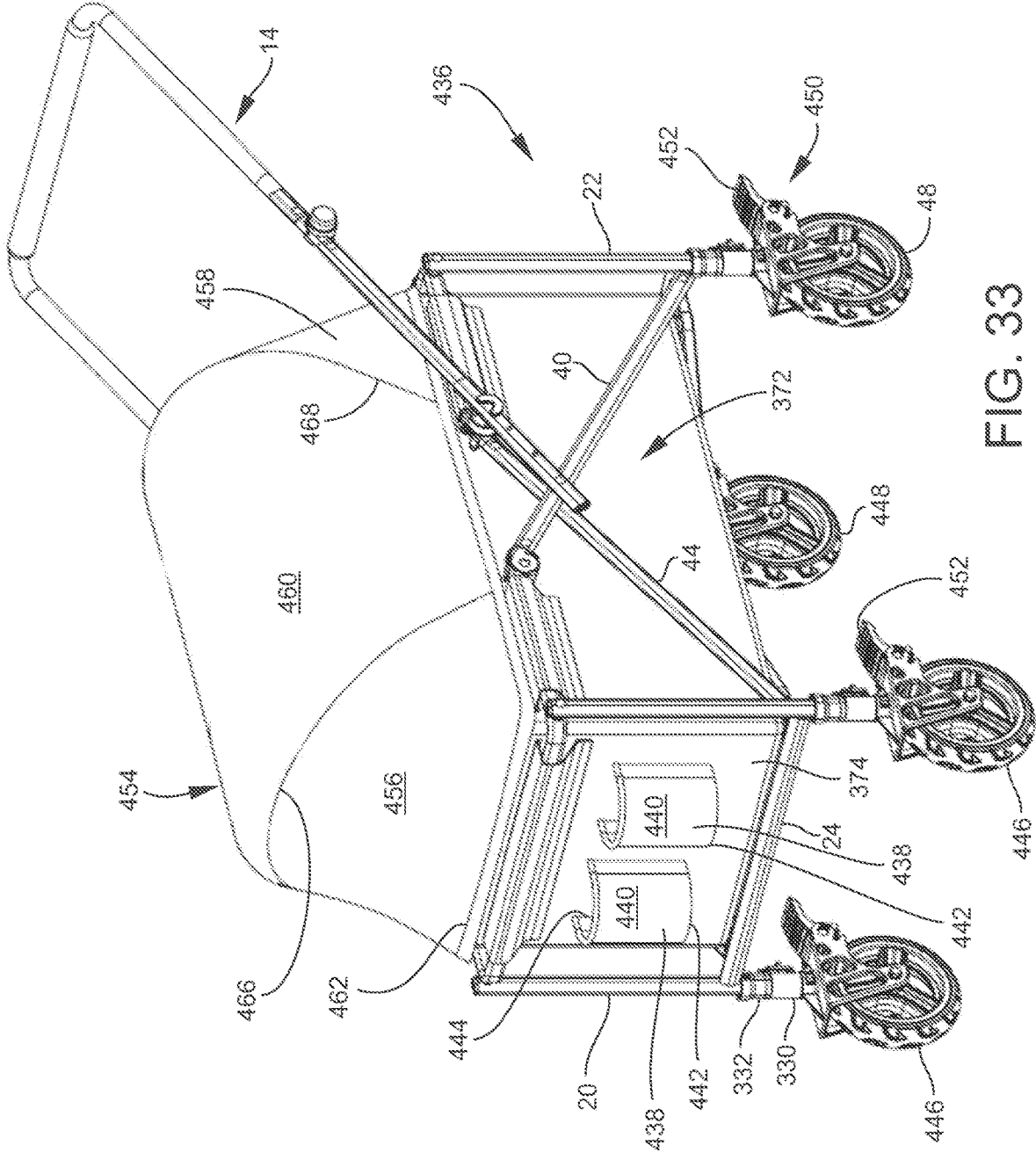
FIG. 33 is a perspective view of the pet wagon frame of FIG. 1 having the receptacle of FIG. 27 and a second embodiment canopy, with pockets having been added to the receptacle of FIG. 27.

FIG. 33 shows an alternate embodiment of the pet wagon designated as reference number 436. Pet wagon 436 includes the frame 12 including the front posts 20, rear posts 22, front lower support member 24, rear lower support member 26, front U-shaped support member 28, rear U-shaped support member 34, oblique support members 40, 44, and support base 46. Pet wagon 436 further includes the receptacle 372.

Figure 40B:
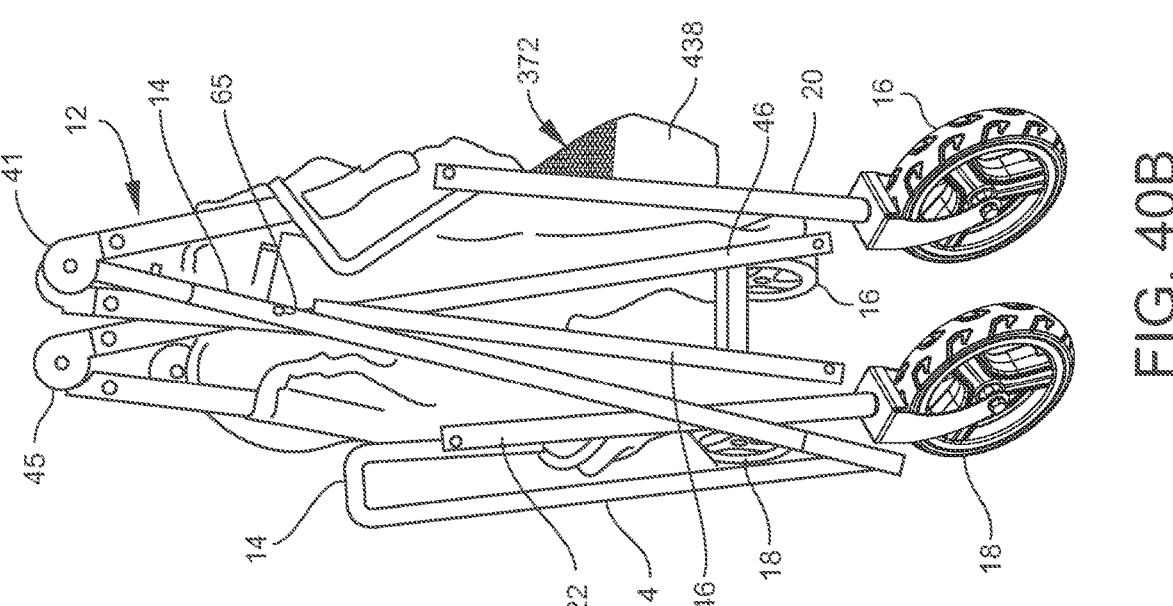
FIG. 40B is a side view of the pet wagon of FIG. 33 in a folded in and collapsed form, with the receptacle also in a folded in and collapsed form.
Figure 40A:
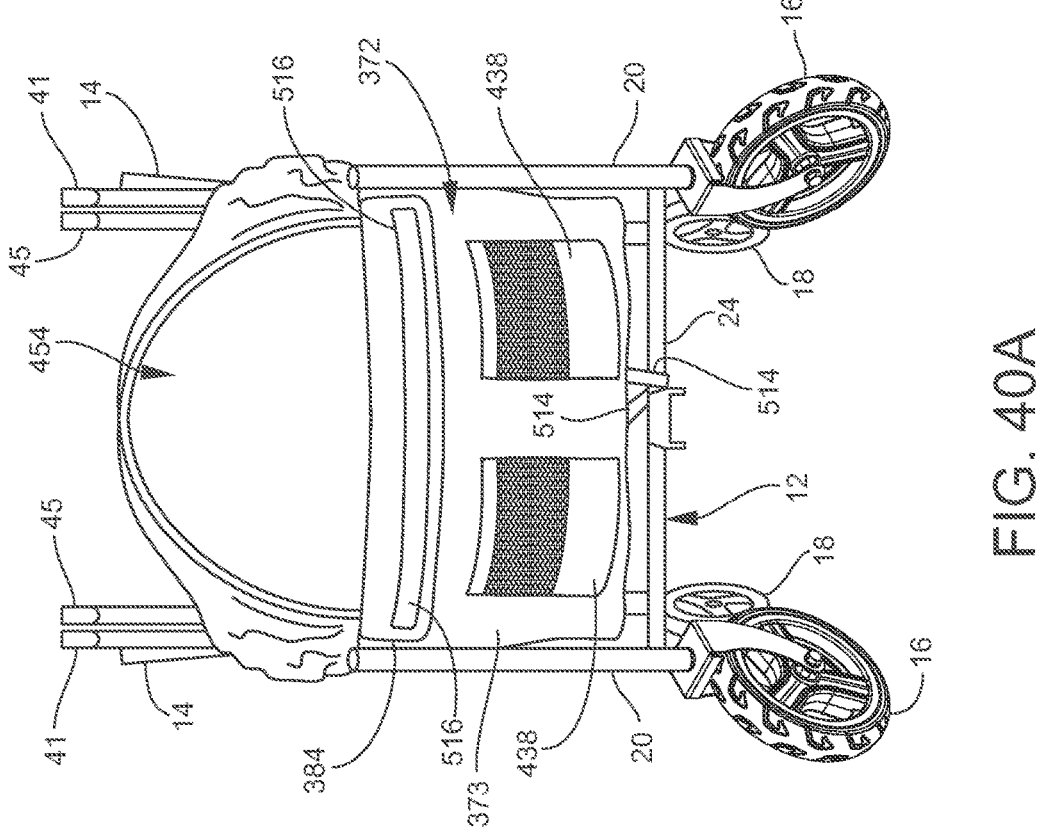
FIG. 40A is a front view of the pet wagon of FIG. 33 in a folded in and collapsed form, with the receptacle also in a folded in and collapsed form.

Pet wagon 436 includes first and second pockets 438 mounted on the front wall 374 of the receptacle 372. Each of the pockets 438 includes a U-shaped sidewall 440 and a closed bottom 442. The pockets 438 may be formed of a relatively rigid material or a flexible material. Inner edge portions 444 of the U-shaped sidewall 440 are engaged to the front wall 374. Edge portions 444 may extend at a right angle from front wall 374 prior to transitioning into the U-shape of the sidewall 440. A U-shaped top portion of each of the pockets 438 may be formed of a mesh material as shown in FIGS. 40A and 40B.

FIG. 33 shows that pet wagon 436 includes front wheels 446 and rear wheels 448. Each of the wheels 446, 448 are identical. Each of the wheels 446, 448 includes a locking mechanism 450 with a pivoting pedal 452. A pet caregiver locks the locking mechanism 450 by pressing down on the pedal 452, which locks such wheel against rotation and which stays down in the locked position after the caregiver takes his or her foot off the pedal. To unlock the locking mechanism 450, the pet caregiver takes the upper part of his or her shoe or fore front of the shoe, places it under the pivoting pedal 452, and draws the tip of the pivoting pedal upwardly, which thereby permits such wheel to rotate.

FIG. 33 shows that each of the wheels 446, 448 are spinnable on a vertical axis. Each of the wheels 446, 448 includes the lower and upper portions 330, 332 of front wheel 16 of pet wagon 10. The vertical axis on which the wheels 446, 448 spin is the axis of one of the posts 20, 22. Each of the wheels 446, 448 is independently spinnable and independently lockable against rotation relative each of the other wheels 446, 448.

In pet wagon 436, as shown in FIG. 33, the axis of each of the front posts 20 intersects the rotational axis of its adjacent front wheel 446. In pet wagon 436, as shown in FIG. 33, the axis of each of the rear posts 22 intersects the rotational axis of its adjacent rear wheel 448. In pet wagon 10, as shown in FIG. 2, the axis of each of the front posts 20 is offset from the rotational axis of its adjacent front wheel 16. In pet wagon 10, as shown in FIG. 2, the axis of each of the rear posts 22 is offset from the rotational axis of its adjacent rear wheel 18.

Figure 34:
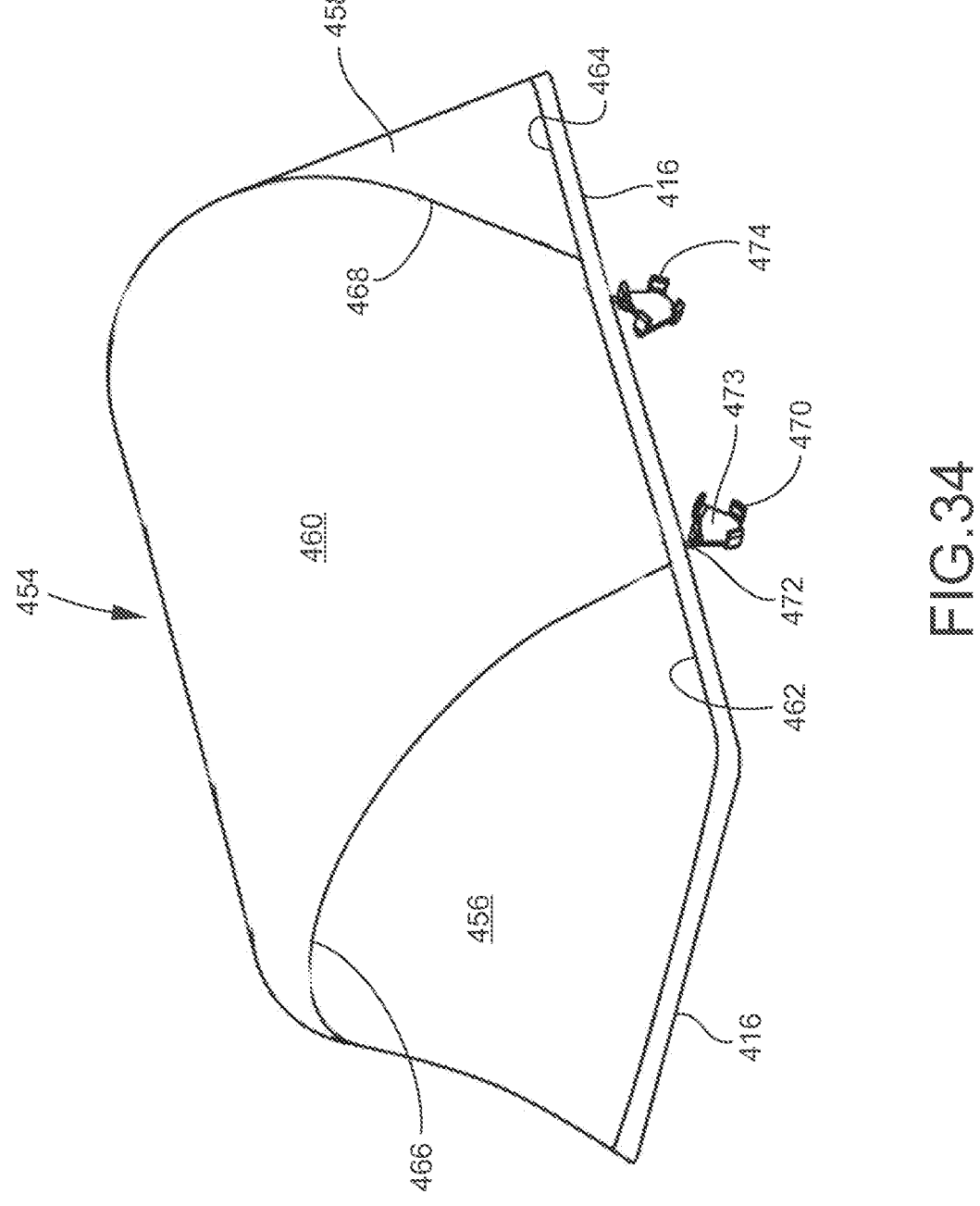
FIG. 34 is an isolated view of the second embodiment canopy of FIG. 33 along with connectors for connecting the canopy to the pet wagon frame.

As shown in FIGS. 33 and 34, pet wagon 436 includes a canopy 454 that is different from canopy 220. Canopy 454 includes a front closed end 456, a rear closed end 458, and an intermediate portion 460 between the ends 456, 458. Each of the front and rear closed ends 456, 458 is concave. Front closed end has a lowermost edge portion 462 that is U-shaped. Rear closed end has a lowermost edge portion 464 that is U-shaped. A transition portion 466 is circular or rounded and extends from the first rear end of lowermost edge portion 462 to the second rear end of the lowermost edge portion 462. A transition portion 468 is circular or rounded and extends from the first front end of lowermost edge portion 464 to the second front end of the lowermost edge portion 464.

Figure 35:
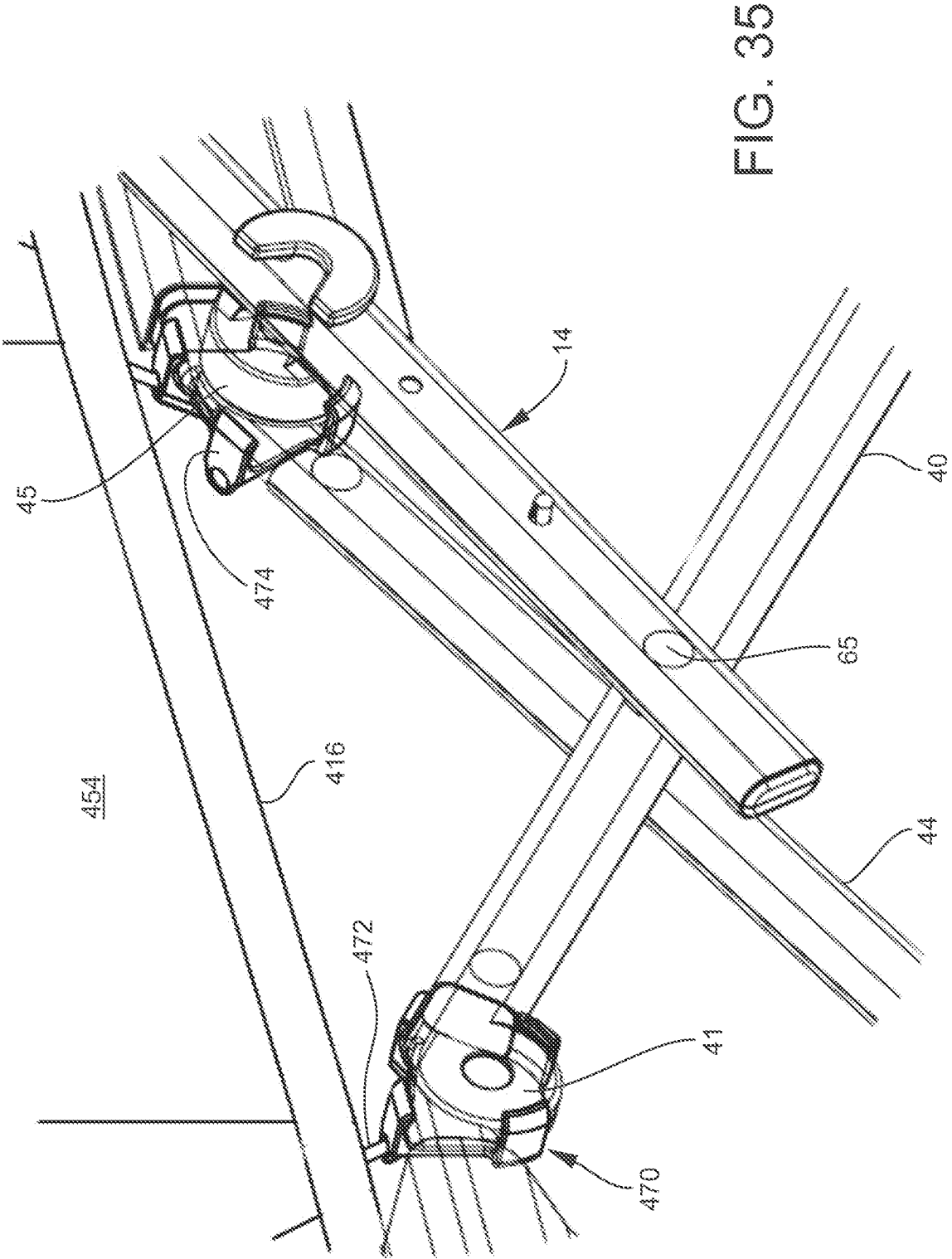
FIG. 35 is a detail view of the connectors of FIG. 34.
Figure 36A:
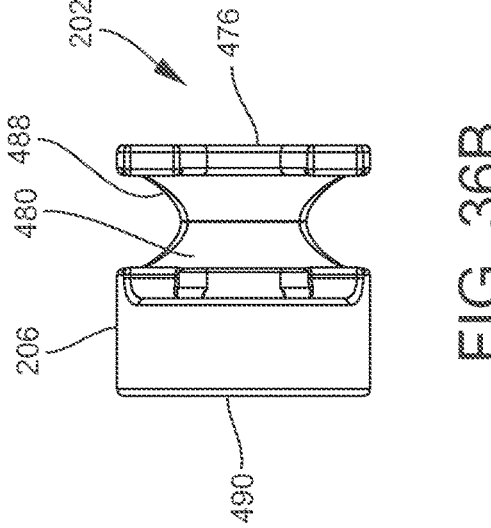
FIG. 36A is a perspective detail view of the handle cradle shown in FIG. 14B.
Figure 36B:
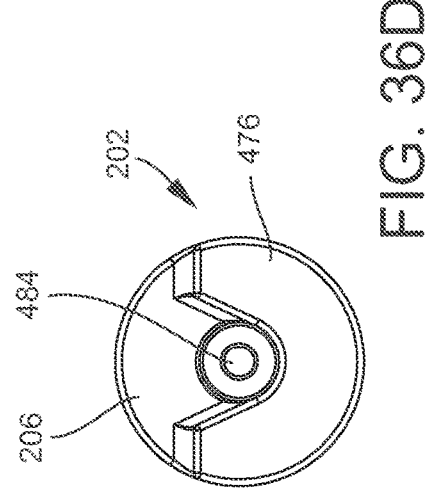
FIG. 36B is a top view of the handle cradle of FIG. 36A.
Figure 36C:
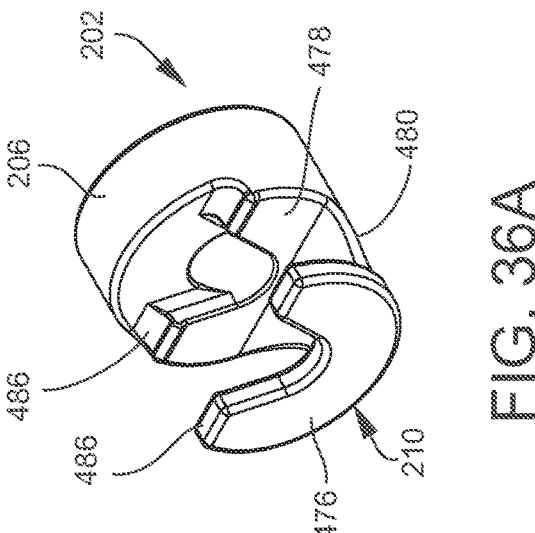
FIG. 36C is an end view of the handle cradle of FIG. 36A.
Figure 36D:
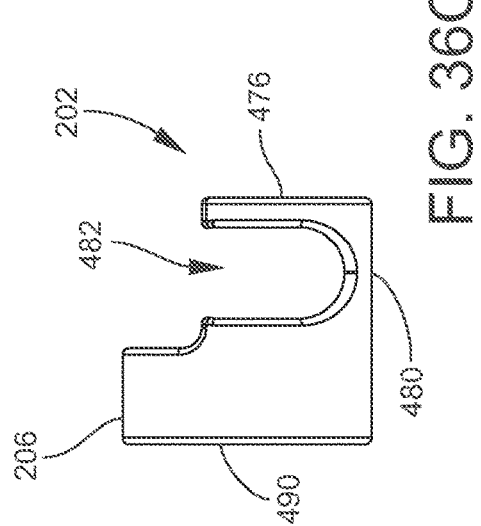
FIG. 36D is a side view of the handle cradle of FIG. 36A.
Figures 37A, 37B, 37C, 37D:
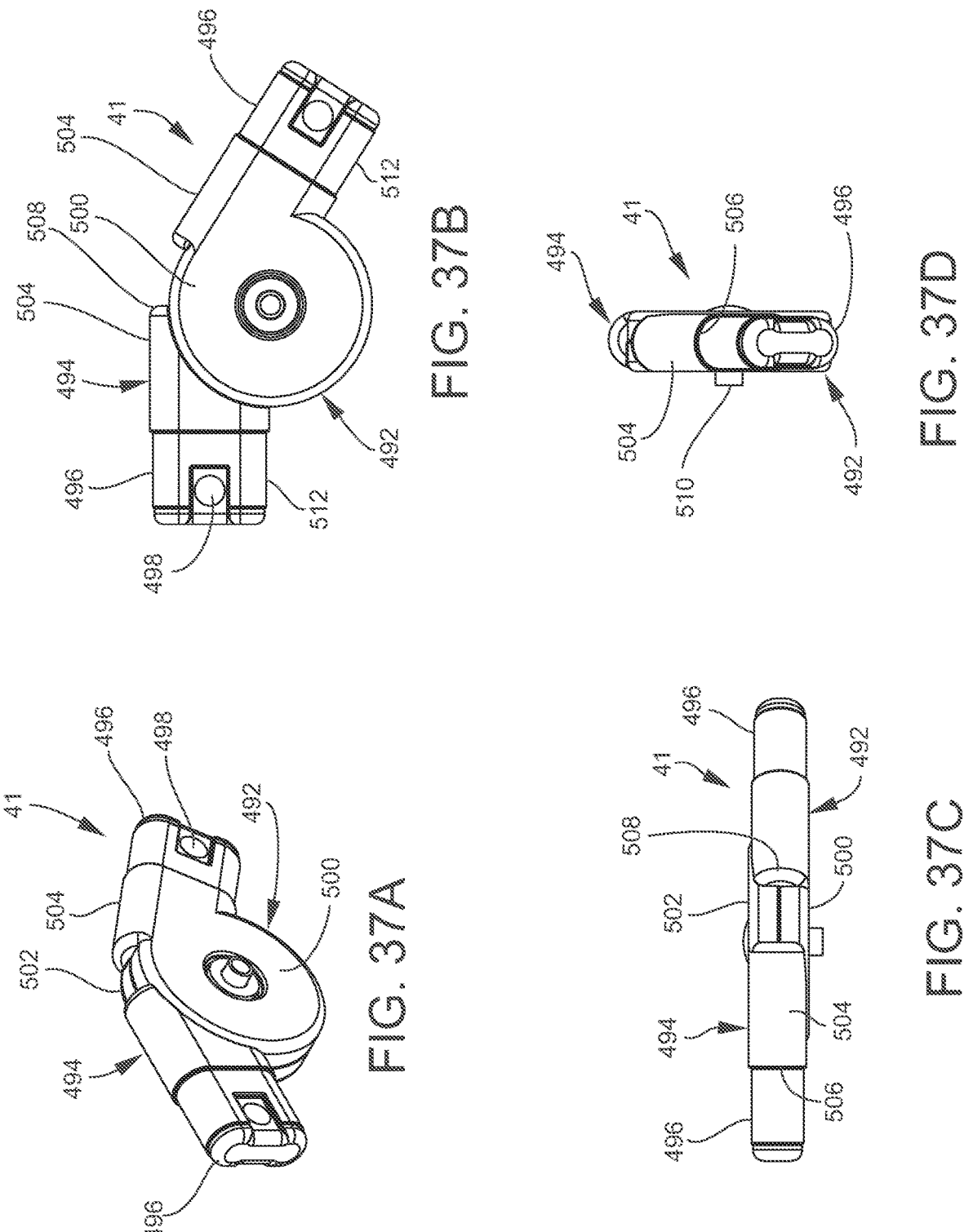
FIG. 37A is a perspective view of a support member pivot shown in FIG. 14A.
FIG. 37B is a side view of the support member pivot of FIG. 37A.
FIG. 37C is a top view of the support member pivot of FIG. 37A.
FIG. 37D is an end view of the support member pivot of FIG. 37A.

Like canopy 220, canopy 454 includes a rectangular lowermost perimeter 416 that abuts or rests upon the perimeter 396 of the main body 373 and is engaged to the frame 12 such as by a quick connect, where the quick connect may be Velcro® or magnets or a mechanical device such as a clip. One example of a clip is clip 470 is shown in FIGS. 34 and 35. Clip 470 is engaged to canopy 454, such as to the lowermost perimeter 416, by a tether 472. Clip 470 includes a base 473 and four prongs 474 extending from a perimeter of the base 473. Prongs 474 may be resiliently bendable away from a center of the base 473 and are of sufficient length to extend to pivot hub 41 or 45 from an inside of the frame 12. For example, in the case of pivot hub 45, base 473 abuts the inside face of oblique member 44 and then prongs 474 extend about the oblique member 44 to engage the sides of pivot hub 45. In the case of pivot hub 41, base 473 abuts the inside face of one or more of support member 32, oblique member 40, and pivot hub 41 and then the prongs 474 extend about one or more of the support member 32, oblique member 40, and pivot hub 41 to engage the sides and front of pivot hub 41. Each of the prongs 474 includes a flat portion and a clawed or bent distal end bending inwardly toward an axis of the center of the base 473 such that the clawed or bent distal end engages an outer portion of pivot hub 41 or 45.

FIGS. 36A, 36B, 36C, and 36D show the handle cradle 202. Handle cradle 202 includes an outer C-shaped side retainer 476, an inner C-shaped side retainer 478, and a bottom retainer 480 that bridges the side retainers 476, 478. Handle cradle 202 further includes base 206. Side retainers 476, 478, bottom retainer 480, and base 206 are one piece and integral. Base 206 is formed in the shape of a disk. Base 206 includes a central pin receiving opening 484. Handle cradle 202 is engaged to the outer face of pivot hub 45 by a pin engaging opening 484 and further engaging pivot hub 45. As shown in FIG. 36, the cradle 202 forms an oblong shaped receiver 482 for reception therein of the handle 14 that includes in section an oblong shape. Cradle 202 and handle 14 are sized such that the fit between the receiver 482 and handle 14 is a friction fit. Each of the outer retainer 476 and inner retainer 478 has first and second top ends 486. The set of four top ends 486 define a plane. The C-shape of the retainers 476, 478 minimize surface area and thereby minimize friction between the handle 14 and the cradle 202. The inwardly extending U-shaped edge 488 of the bottom retainer 480 further minimize surface area and thereby minimize friction between the handle 14 and the cradle 202. Base 202 includes an inner face 490 and it is this inner face 490 that abuts the outer face of pivot hub 45.

FIGS. 37A, 37B, 37C, and 37D show pivot hub 41. Pivot hub 41 includes first and second half portions 492, 494. The half-portions 492, 494 are identical. Each of the half portions 492, 494 includes a male oblong extension 496 that engages an open oblong female end of an oblong support member, such as oblique support member 40 or straight support member 32. Male extension 496 is oblong in section. Each of the male extensions 496 includes a pin opening 498 for receiving a pin to engage the male extension 496, its respective half portion 492 or 494, and the pivot hub 41 to the respective support member such as support member 32, 40. Each of the half portions 492, 494 includes a respective disk portion 500, 502. Each of the disk portions 500, 502 includes an inner face that rides on the adjacent inner face of the other disk portion. Each of the disk portions 500, 502 includes an extension base 504 that leads into the extension 496. An oblong ridge 506 defines a transition from the extension base 504 to the male extension 496. Oblong ridge 506 is a stop that stops the sliding of the male extension 496 into the open female end of the support member, such as oblique support member 40 or straight support member 32. Ridge 506, all about its oblong shape, is a step down from the extension base 504 to the male extension 496. Each of the disk portions 500, 502 includes a pin receiver opening for receiving a pin 510, about which the half portions 500, 502 rotate. Each of the base extensions 504 includes a stop 508 that, upon abutting the stop of the other base extension 504 stops the rotation of one disk portion 492 relative to the other disk portion 494. However, such stops 504 are not employed, or are safety stops, because the channel connection 64 stops the unfolding or opening of the frame 12 prior to the stops 508 abutting each other. One direction of rotation is where the stops 508 rotate toward each other. The other direction of rotation is where the undersides 512 of the male extensions 496 rotate toward each other. When the frame 12 is in the folded in or collapsed position, such undersides 512 are adjacent to each other.

Figure 38:
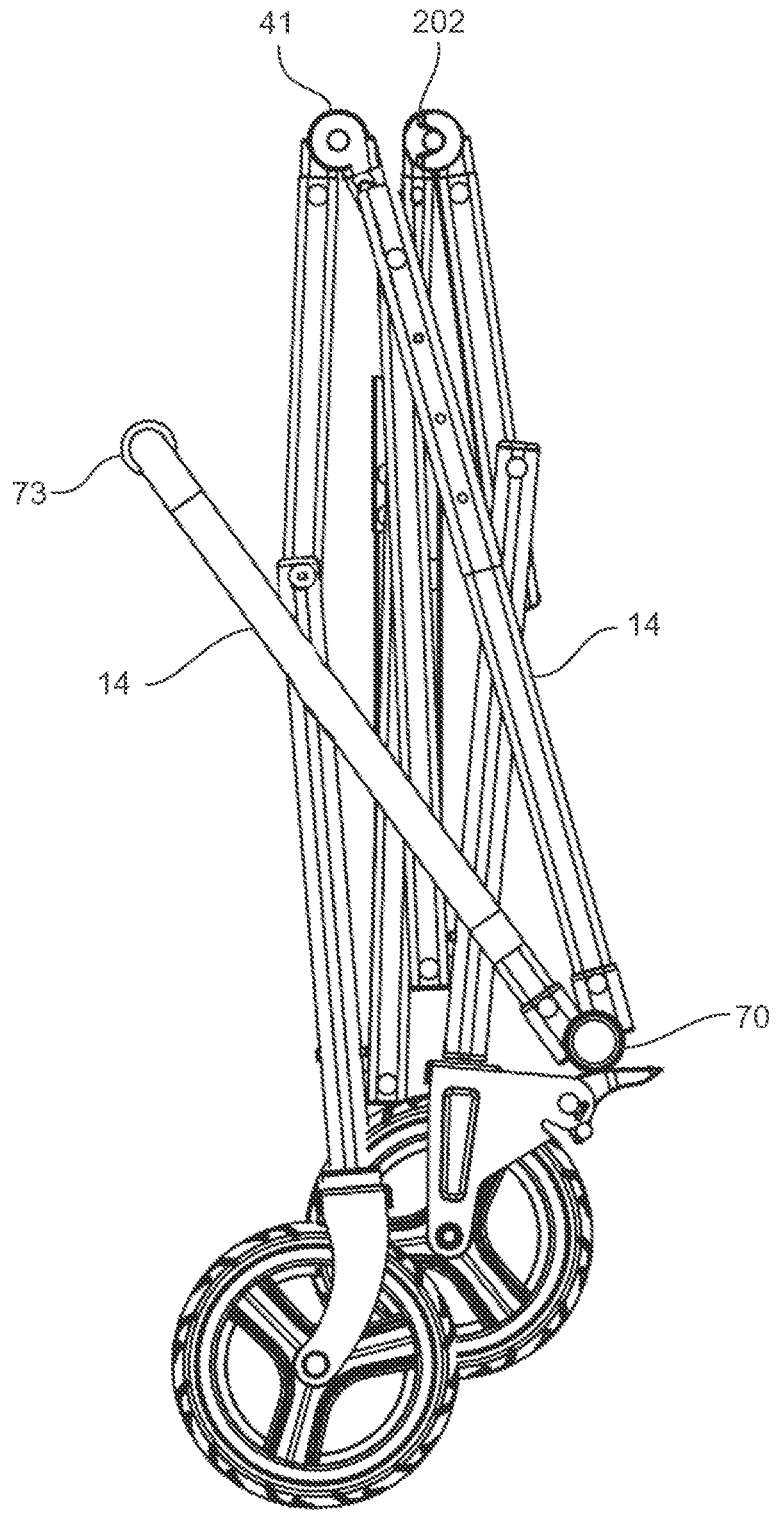
FIG. 38 is a side view of the frame of the pet wagon of FIG. 33 in a folded in and collapsed form.
Figure 39:
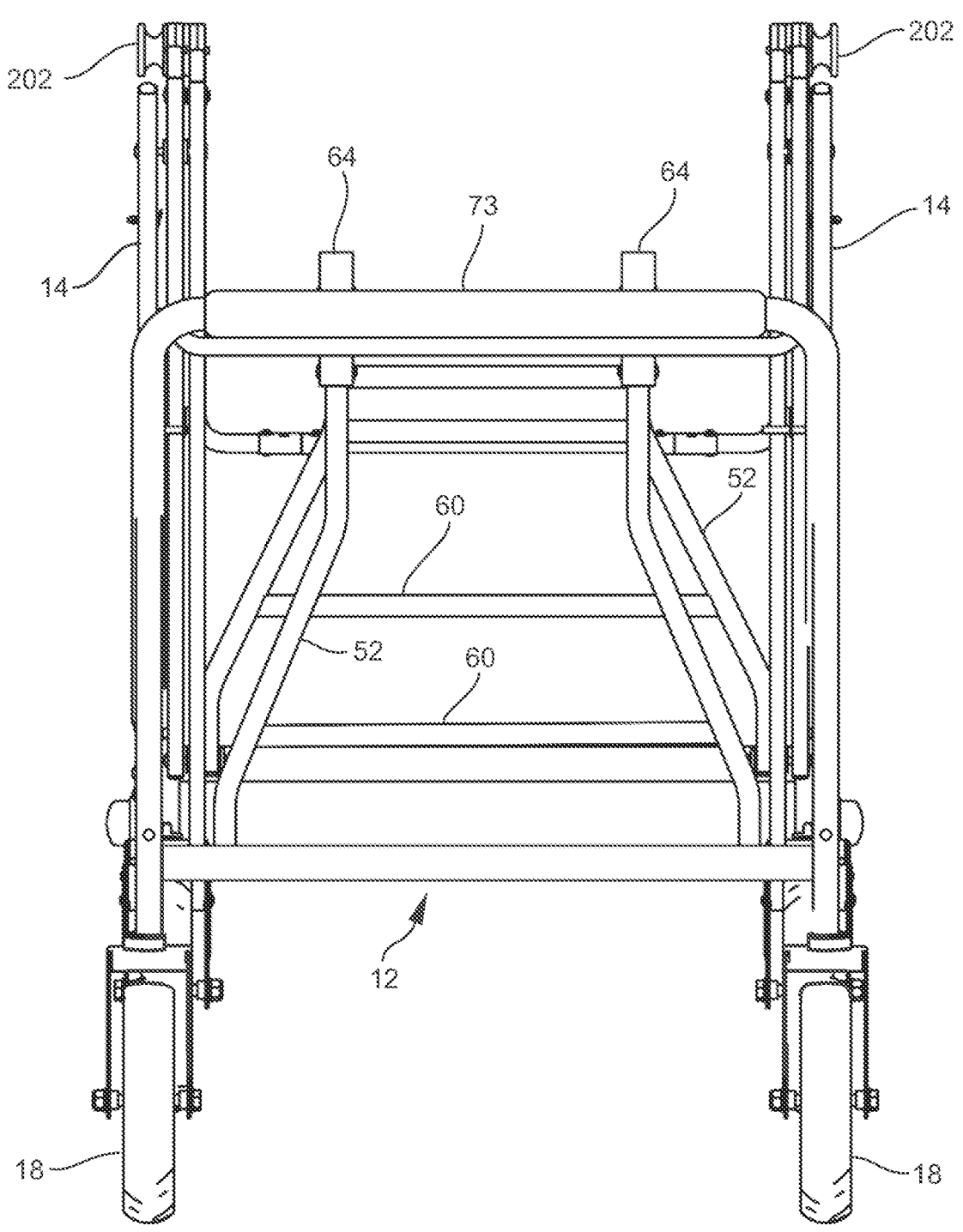
FIG. 39 is a front view of the frame of the pet wagon of FIG. 33 in a folded in and collapsed form.

FIGS. 38 and 39 show the frame 12 in a folded in or collapsed state without the receptacle 372. FIGS. 40A and 40B show the frame 12 in a folded in or collapsed state with the receptacle 372. FIGS. 40A and 40B show that in the folded in or collapsed state of the frame 12 the right front wheel 16 is adjacent to the right rear wheel 18 and the left front wheel 16 is adjacent to the left rear wheel 18 and, in such folded in or collapsed state, the front wheels 16 are spaced apart as in their operating state and the rear wheels 18 are spaced apart as in their operating state. FIGS. 40A and 40B show that in the folded in or collapsed state of the frame 12 the front pivot hub 41 is adjacent to the rear pivot hub 45. FIGS. 39 and 40B show that in the folded in or collapsed state the support base 46 is oblique relative to the horizontal and vertical and is more vertical than horizontal. FIG. 40A shows that the receptacle 372 may engage the lower front support member 24 by a looped flexible strap 514. FIG. 40A shows a horizontal backing 516 for an inner Velcro® strip to engage a sleeve 384 to the front outer face of the main body 373 of the receptacle 372 about the front upper support member 30.

Figure 41:
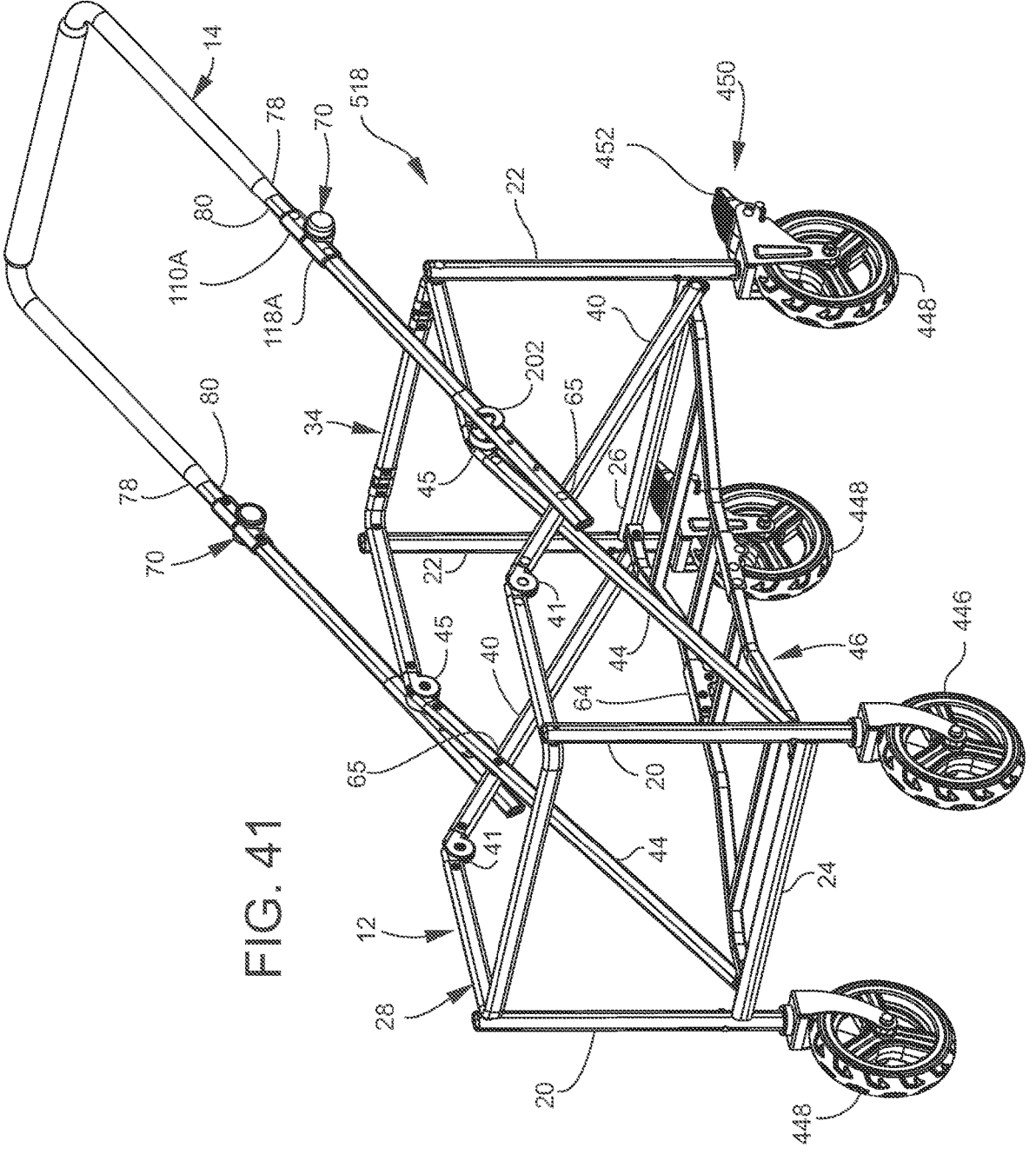
FIG. 41 is a perspective view of a pet wagon having the frame of FIG. 1 and a wheel arrangement where the front wheels spin on a vertical axis, where the rear wheels are fixed on a vertical axis, where the front wheels have no brakes, and where the rear wheels have brakes.

FIG. 41 is a perspective view of a pet wagon 518 having the frame 12 of FIG. 1 and a wheel arrangement where the front wheels 446 spin on a vertical axis, where the rear wheels 448 are fixed on a vertical axis, where the front wheels 446 have no brakes, and where the rear wheels 448 have brake arrangements 450 or locking mechanisms 450. As indicated above with respect to FIG. 33, each of the rear wheels 448 includes a locking mechanism 450 with a pivoting pedal 452. A pet caregiver locks the locking mechanism 450 by pressing down on the pedal 452, which locks such wheel 448 against rotation and which pedal 452 stays down in a locked position after the caregiver takes his or her foot off the pedal. To unlock the locking mechanism 450, the pet caregiver takes the upper part of his or her shoe or fore front of the shoe, places it under the pivoting pedal 452, and draws the tip of the pivoting pedal 452 upwardly, which thereby permits such wheel 448 to rotate.

As shown in FIG. 41, frame 12 includes front posts 20, rear posts 22, front lower lateral support member 24, rear lower lateral support member 26, front U-shaped upper support member 28, rear U-shaped upper support member 34, oblique support member 40, oblique support member 44, and support base 46 and its channel connection 65.

FIG. 41 further shows handle 14 and cradle 202.

FIG. 41 further shows that, whereas connection 118 of hub 106 as shown in FIGS. 7 and 12B is a male connection, the connection 118A shown in FIG. 41 is a female connection with handle support member 82 fitting in female connection 118A.

FIG. 41 further shows that, whereas connection 110 of hub 102 as shown in FIGS. 7 and 12B is a male connection, the connection 110A shown in FIG. 41 is a female connection with handle support member 80 fitting in female connection 110A.

FIG. 41 further shows pivot hubs 41, pivot hubs 45, and pivot pin 65.

Figure 42:
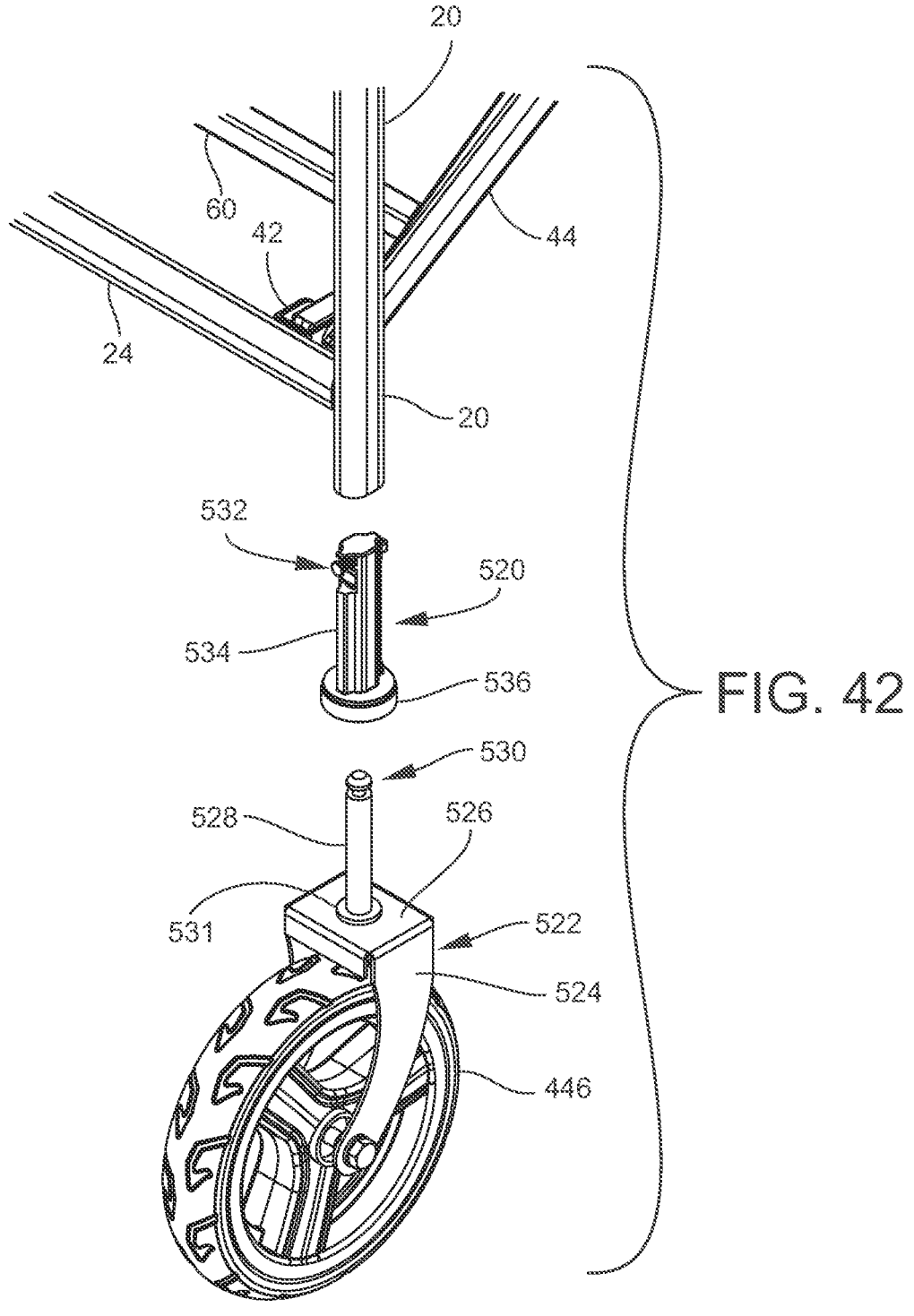
FIG. 42 is a perspective view of a front interconnection disposed between the frame of the pet wagon of FIG. 41 and the front wheel forks of FIG. 41.

FIG. 42 is a perspective view of a front interconnection 520 disposed between the frame 20 of the pet wagon 518 of FIG. 41 and a front wheel fork arrangement 522 of FIG. 41. Front wheel fork arrangement 522 includes first and second forks 524 extending downwardly from a base 526. Rigidly affixed to base 526 and extending upwardly therefrom is a vertical spinning shaft 528 that spins as one-piece with the fork arrangement 522 and wheel 446. At its upper end, vertical shaft 528 includes an upper connection 530. The main body of vertical shaft 528 is cylindrically shaped and is engaged in a cylindrically shaped inner opening formed in interconnection 520. At a lower end vertical shaft 528 includes an annulus 531 rigidly fixed to vertical shaft 528 and to fork base 526. The upper connection 530 of spinning shaft 528 is engaged by an upper spring biased connection 532 of the interconnection 520. Interconnection 520 includes an oblong body 534 that is oblong shaped in section and that is inserted into the open lower end of tubular support member 20 that is oblong shaped in section. Interconnection 520 may be friction fit in tubular support member 20 or adhesively fixed therein. Interconnection 520 includes a base 536 that confronts base 526 of fork arrangement 522.

Figures 43A, 43B:
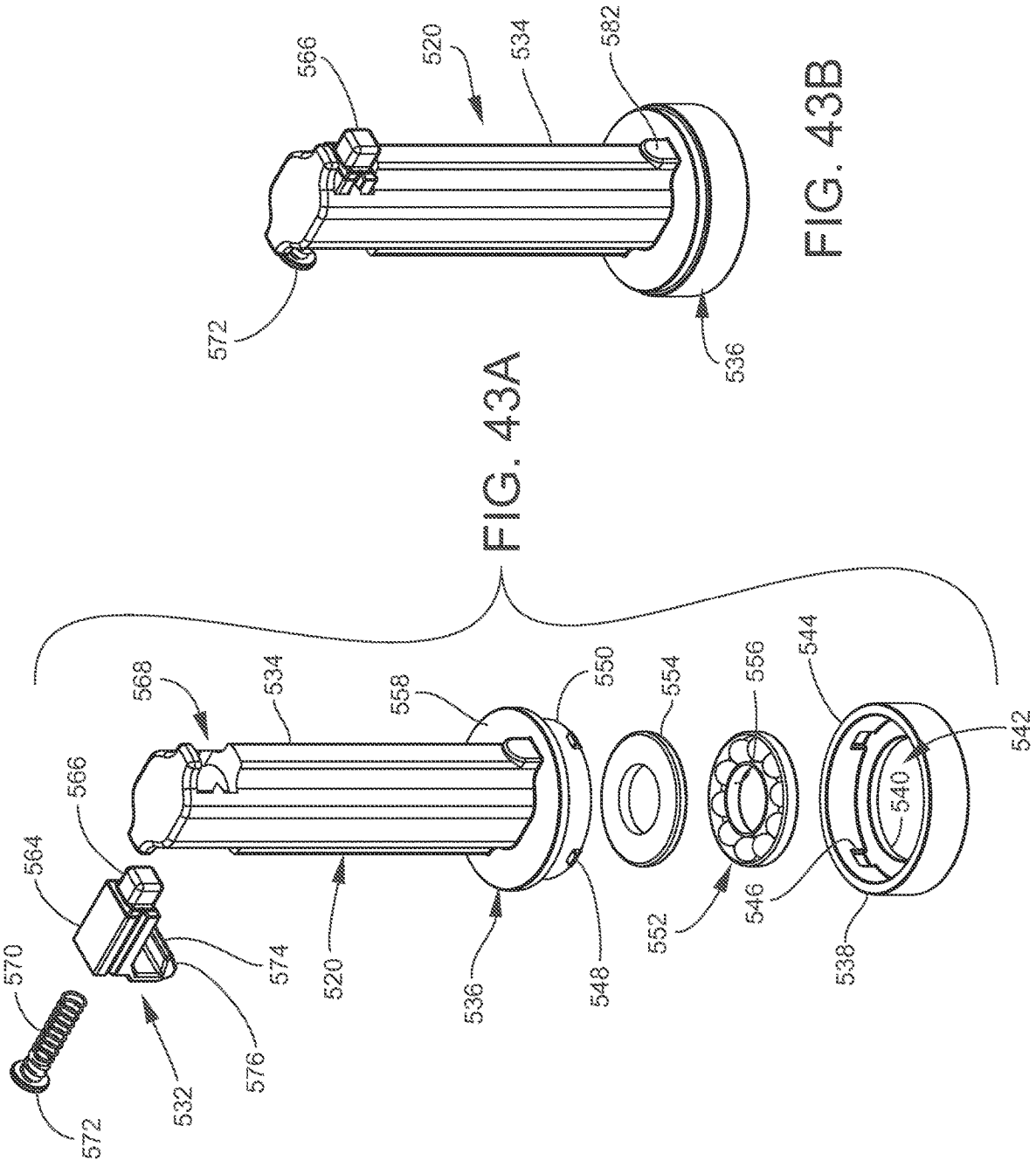
FIG. 43A is a perspective exploded view of the front interconnection of FIG. 42.
FIG. 43B is a perspective assembled view of the front interconnection of FIG. 43A.

FIG. 43A is a perspective exploded view of the front interconnection 520 of FIG. 42. As shown in FIG. 43A, base 536 of interconnection 520 includes a retainer 538 that is L-shaped in section. Retainer 538 includes a circular edge 540 that defines a circular opening 542. An outer endless sidewall 544 of retainer 538 includes tab openings 546 for receiving outwardly extending tabs 548 of an inner endless sidewall 550. Inner endless sidewall 550 fits inside of outer endless sidewall 544 when tabs 548 are engaged in tab opening 546. Endless ball bearing arrangement 552 includes a retaining covering 554. Endless ball bearing arrangement 552 includes an inner circular edge 556 that confronts the outer circular edge of annulus 531. Ball bearing arrangement 552 is packed between a) retaining covering 554 and the upper plate 558 of base 536 and b) base 526 of the fork arrangement 522 to provide a rotating, floating, and stable assembly between the fork arrangement 522 and the interconnection 534 to provide for a 360 degree spinning of the fork arrangement 522 and front wheel 446 relative to interconnection 520, front post 20, and frame 12.

As shown in FIGS. 44A and 44B, upper connection 530 of the vertical shaft 528 includes a cap 560 spaced from a main body of the vertical shaft 528 to define an endless slot 562.

Spring biased connection 532 shown in FIG. 43A includes a base 564 having therein a sliding button 566. Base 564 itself slides in a through opening 568 formed in an upper portion of the oblong main body 534. Spring biased connection 532 further includes a coil spring 570 having engaged therein in an end a pin 572. The other end of the coil spring 570 is engaged in an inner end of the button 566. The head of the pin 572 is engaged by the inner tubular face of front post 20 and the outer end of button 566 is engaged by the opposite inner tubular face of front post 20 so as to squeeze the spring biased connection 532 between inner face portions of the front post 20. Base 564 includes a lip 574 having an oblique underface 576. Lip 574 engages the lower face of cap 560 and extends into the endless slot 562. When vertical shaft 528 is inserted upwardly into interconnection 520 when interconnection 520 is engaged in front post 20, the oblique endless upper face 578 of cap 560 hits the oblique underface 576 of base 564 to push base 564 outwardly until the lip 574 snappingly slips automatically under pressure from coil spring 570 into the endless slot 562 to lock the vertical shaft 528 to the interconnection 520.

As further shown in FIGS. 44A and 44B, forks 524 includes lower openings 580 for a bolt or axle 582 for rotatably engaging front wheel 446.

As shown in FIGS. 43A and 43B, main body 534 of interconnection 520 includes a U-shaped nub 582 that engages an opening in a rear lower end portion of post 20.

Figure 45:
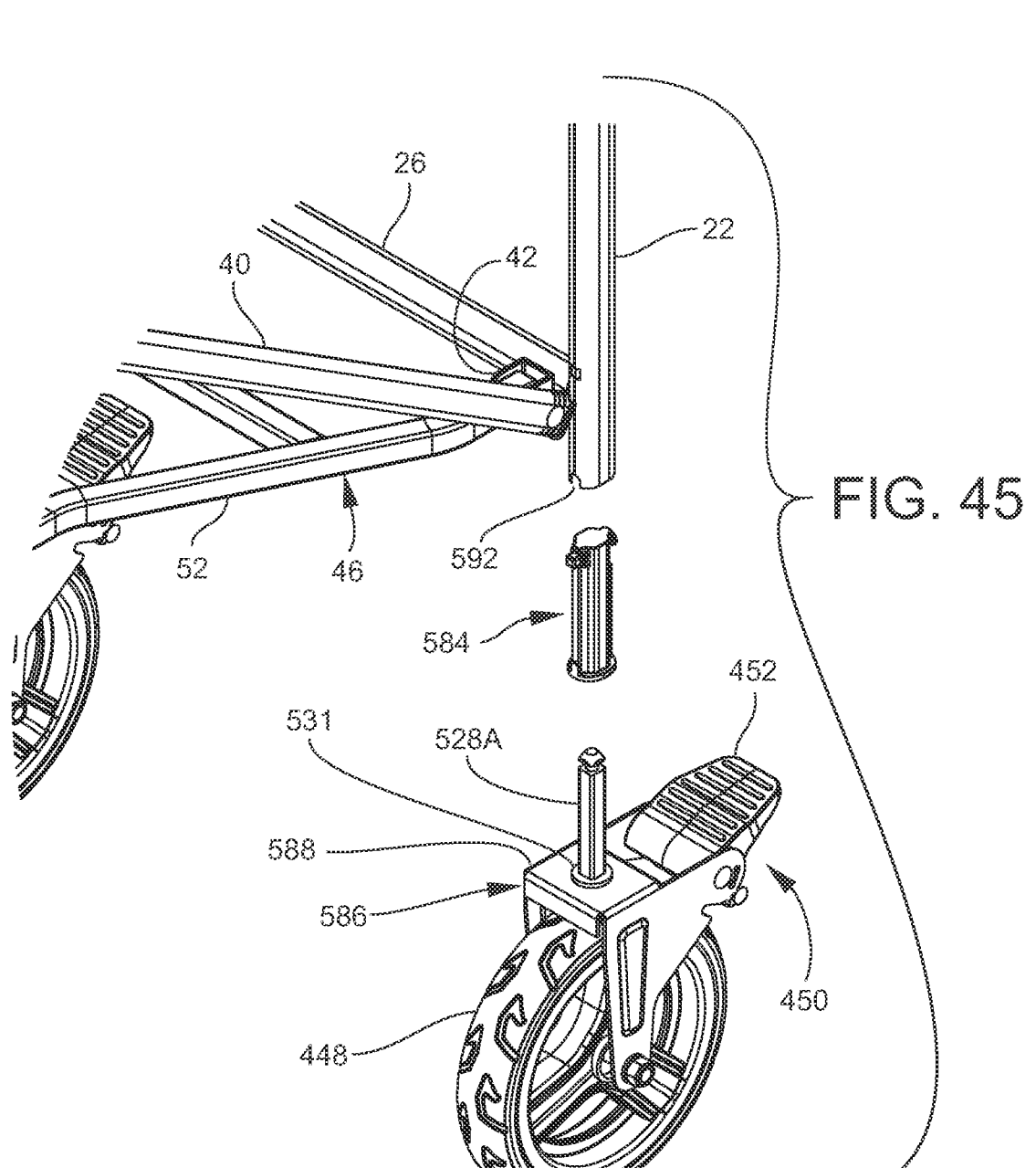
FIG. 45 is a perspective view of a rear interconnection disposed between the frame of the pet wagon of FIG. 41 and the rear wheel forks of FIG. 41.

FIG. 45 shows a rear interconnection 584 disposed between the frame 12 of the pet wagon 518 of FIG. 41 and a rear wheel fork arrangement 586 of FIG. 41. Rear wheel fork arrangement 586 includes a base 588 having a vertical shaft 528A extending upwardly therefrom. Vertical shaft 528A is the same as vertical shaft 528 except that, whereas vertical shaft 528 has a cylindrical main body, the main body of vertical shaft 528A is square in section. Annulus 531 is fixed rigidly to the bottom of vertical shaft 528A and is further anchored to base 588 such as by welding.

Figure 46B:
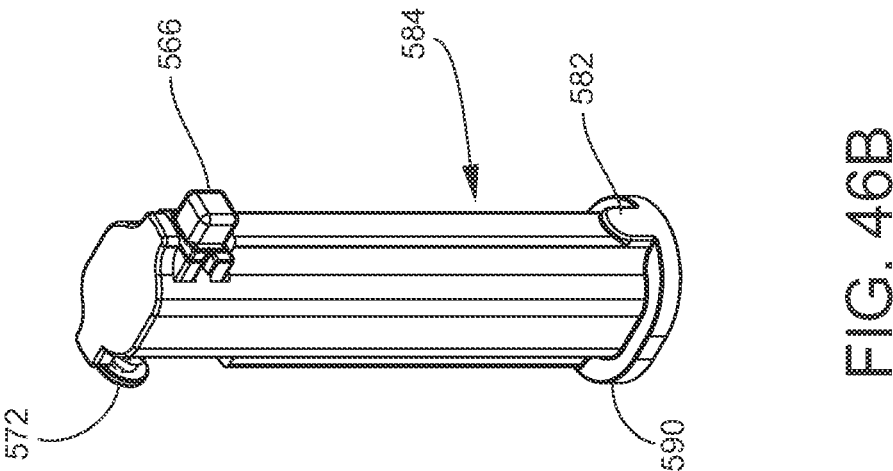
FIG. 46B is a perspective assembled view of the rear interconnection of FIG. 46A.
Figure 46A:
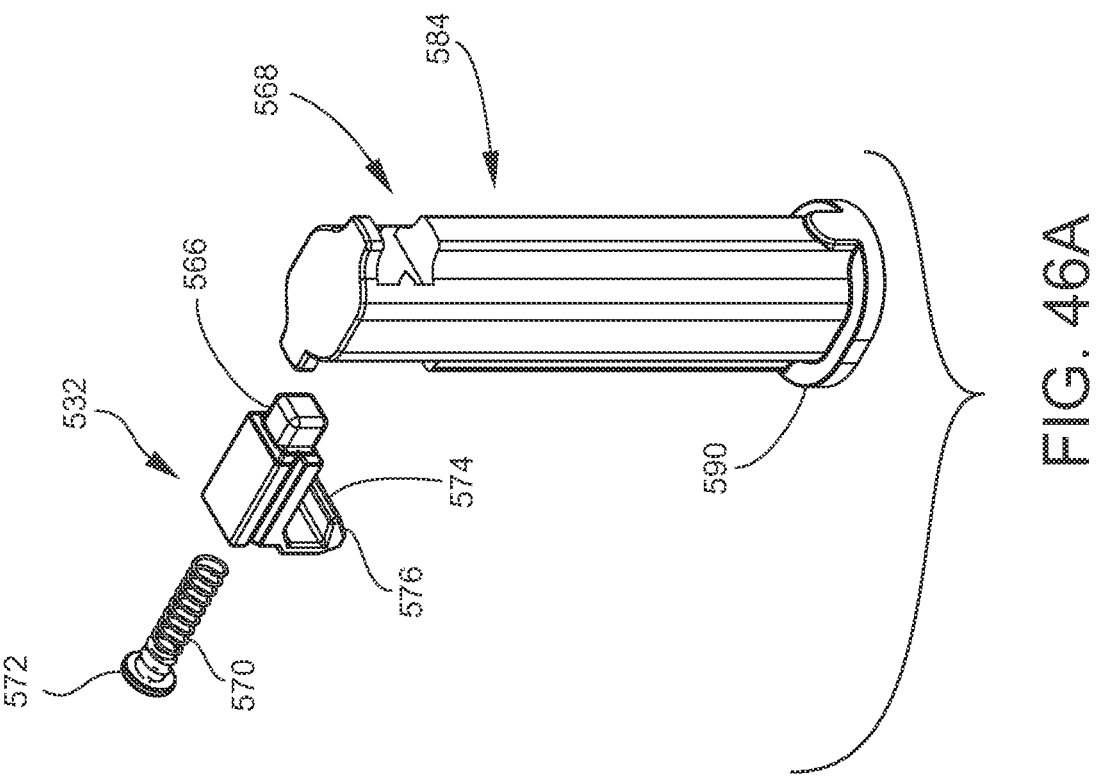
FIG. 46A is a perspective exploded view of the rear interconnection of FIG. 45.

FIGS. 46A and 46B show the rear interconnection 584. Rear interconnection 584 includes the same structure as front interconnection 520 except that there is no base 536 having the ball bearing arrangement 552, retainer 538, and covering 554. Instead rear interconnection 584 includes a base 590 that receives annulus 531 and confronts base 588 of the rear wheel fork arrangement 588. Further, there is no cylindrical opening in the main body of the rear interconnection 584. Instead there is an opening that is square in section to receive the vertical shaft 528A that is square in section to prevent rotation between vertical shaft 528A and the rear interconnection 584 so as to prevent spinning of vertical shaft 528A and spinning of rear wheel fork arrangement 586.

Base 590 includes nub 582 that is received in a U-shaped receiver 592, shown in FIG. 45, of rear post 22.

As shown in FIGS. 46A and 46B, rear interconnection 584 includes the spring biased connection 532.

Figures 47A, 47B:
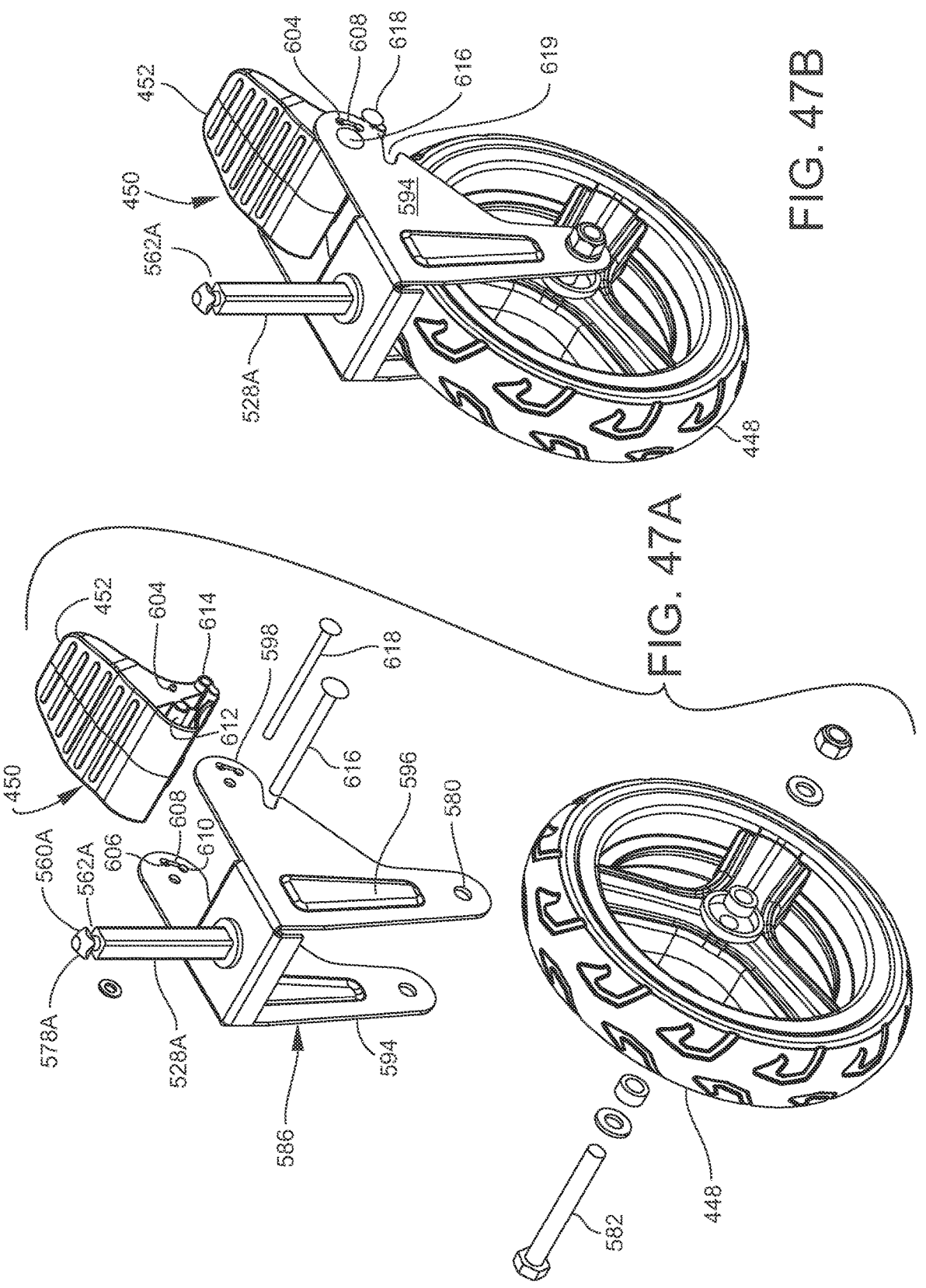
FIG. 47A is a perspective exploded view of the rear wheel arrangement of the pet wagon of FIG. 41.
FIG. 47B is a perspective assembled view of the rear wheel arrangement of FIG. 47A.

FIGS. 47A and 47B show the vertical shaft 528A that is square in section. Vertical shaft 528A includes a cap 560A that includes a conical oblique face 578A. Cap 560A includes a square underface such that endless slot 562A is square in section. Such square underface opposes the upper end of the main body of vertical shaft 528A that is square in section.

FIGS. 47A and 47B show that fork arrangement 586 includes forks 594, each of which includes opening 580 for axle or bolt 582 for rotatably engaging rear wheel 448. Each of the forks 594 further includes through opening 596. Each of the forks 594 further includes a rear ear 598. Engaged to and between rear ears 598 is L-shaped pedal 452.

L-shaped pedal 452 is part of the locking mechanism 450. L-shaped pedal 452 includes a roughened surface 602 for engaging the underside of a foot of a user. Pedal 452 includes first and second opposing and outwardly extending nubs 604. Each of the nubs 604 engages an upper opening 606, a slot 608, and a lower opening 610. Opening 606, slot 608, and opening 610 are formed in each of the ears 598 and extend laterally through their respective ears 598. Slot 608 communicates with each of the openings 606, 610.

Pedal 452 further includes laterally extending receivers 612, 614 for receiving pins 616 and 618 respectively. Pin 616 is a pivot pin about which pedal 452 pivots. Pin 618 is a locking or braking pin for making contact with the tire of the wheel 448. Then the pedal 452 is pushed down, nub 604 travels from upper opening 606, where brake or lock pin 618 is spaced from the tire of the rear wheel 448, through slot 608 to lower opening 610, where brake or lock pin 618 makes contact with the tire of the rear wheel 448 to prevent the rear wheel 448 from rotating. Brake or lock pin 618 is receivable in opposing U-shaped receivers 619, formed in each of the forks 594. The closed ends of U-shaped receivers 619 act as stops for the lock pins 618. Frontwardly rotation of the wheels 448 will urge the lock pins 618 against the closed ends of the receivers 619 to further lock the wheels 448, while a rearwardly rotation of the wheels 448 unlocks and withdraws the brake or lock pins 618.

Rear wheel 448 rotates about axle 582. Rear wheel 448 does not spin about vertical shaft 528A that is square in section and received in a square receptor inside of rear interconnection 584.

Figure 48:
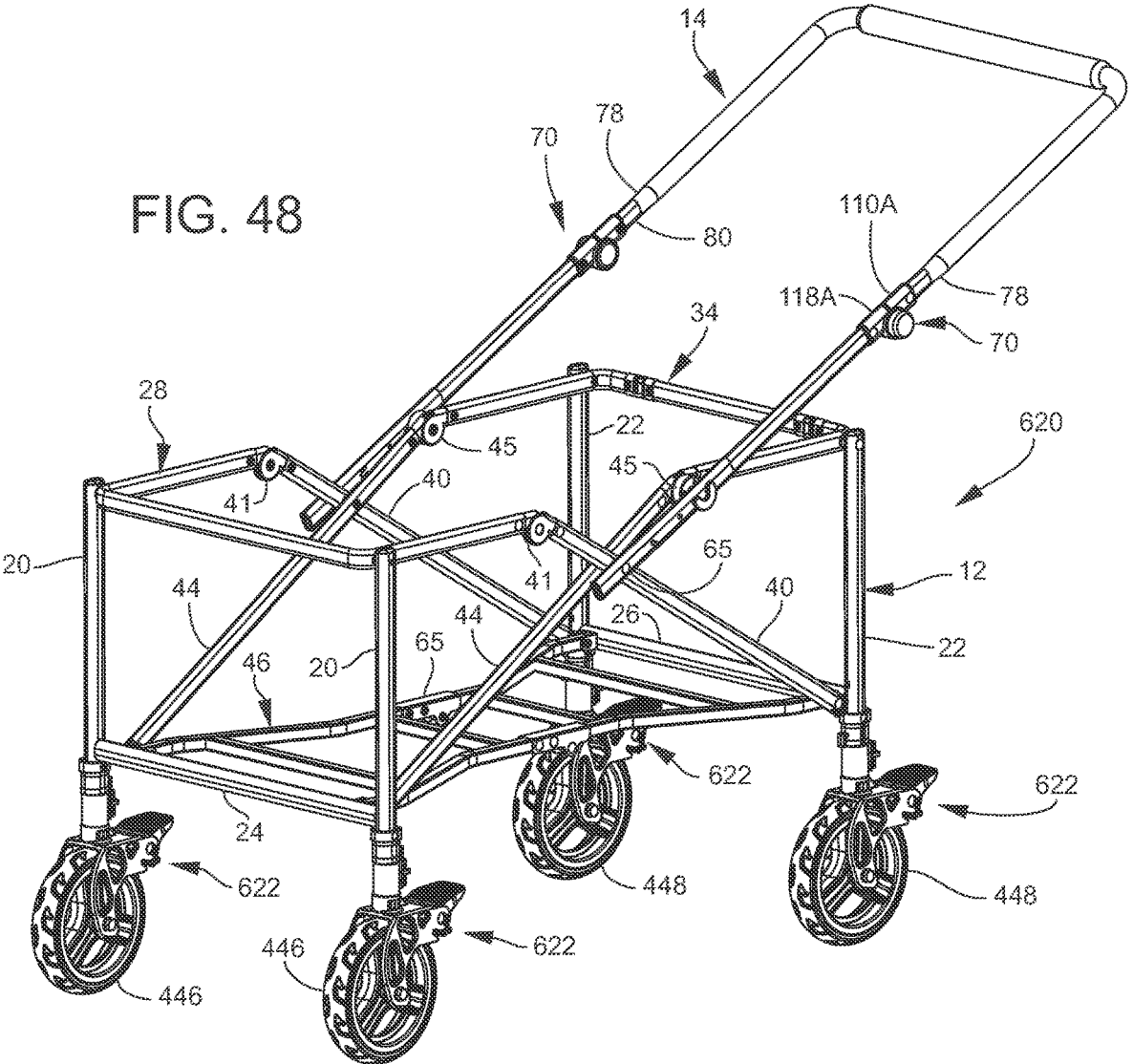
FIG. 48 is a perspective view of a pet wagon having the frame of FIG. 1 and a wheel arrangement where each of the front and rear wheels is spinnable on a vertical axis or is lockable against such spinning on a vertical axis, and where each of the front and rear wheels is rotatable on a horizontal axis or lockable against such rotation on a horizontal axis.

FIG. 48 is a perspective view of a pet wagon 620 having the frame 12 of FIG. 1 and a wheel arrangement 622 where each of the front and rear wheels 446, 448 is spinnable on a vertical axis or is lockable against such spinning on a vertical axis (by vertical spin lock and unlock assembly 624), and where each of the front and rear wheels 446, 448 is rotatable on a horizontal axis or is lockable against such rotation on a horizontal axis (by locking mechanism 450). In other words, wheel arrangement 622 of FIGS. 48, 49A, and 49B includes vertical spin lock and unlock assembly 624 and locking mechanism 450.

Frame 12 of wagon 620 includes front posts 20, rear posts 22, front lower lateral support member 24, rear lower lateral support member 26, front U-shaped upper support member 28, rear U-shaped upper support member 34, oblique support member 40, oblique support member 44, and support base 46 and its channel connection 65.

FIG. 48 further shows handle 14 and cradle 202.

Whereas connection 118 of hub 106 as shown in FIGS. 7 and 12B is a male connection, the connection 118A shown in FIG. 48 is a female connection with handle support member 82 fitting in female connection 118A.

Whereas connection 110 of hub 102 as shown in FIGS. 7 and 12B is a male connection, the connection 110A shown in FIG. 48 is a female connection with handle support member 80 fitting in female connection 110A.

FIG. 48 further shows pivot hubs 41, pivot hubs 45, and pivot pin 65.

Figures 49A, 49B:
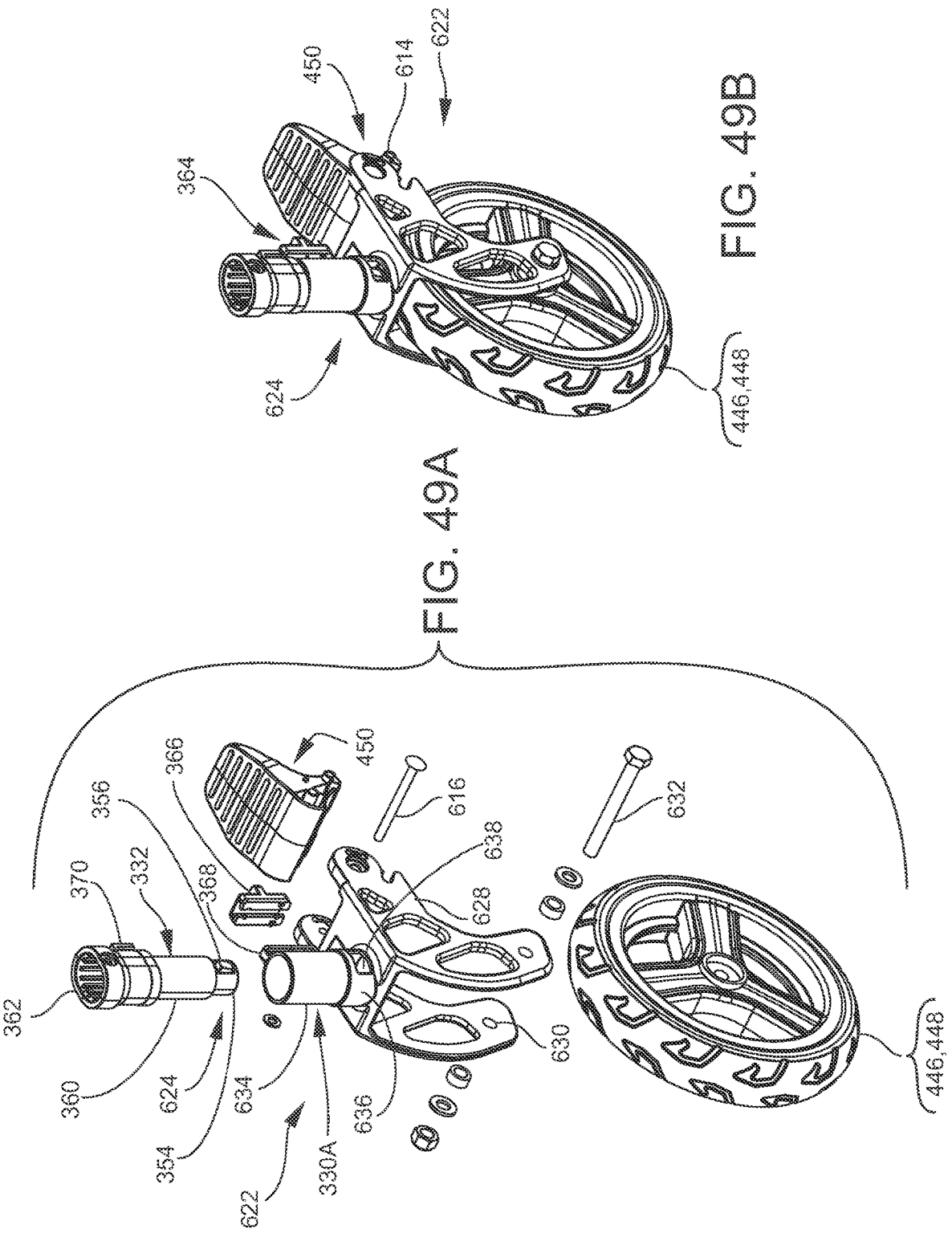
FIG. 49A is a perspective exploded view of the wheel and brake arrangement for each of the front and rear wheels of FIG. 48.
FIG. 49B is a perspective assembled view of the wheel and brake arrangement of FIG. 49A.

As shown in FIGS. 49A and 49B, wheel arrangement 622 includes a vertical spin lock and unlock assembly 624 that incorporates many of the features found in the assembly shown in FIGS. 23A, 23B, 24A, 24B, and 24C. These features include the lower base portion 330 and an upper base portion 332. Here, a lower base portion 330A pivotally mounts the upper base portion 332.

Lower base portion 330A is mounted on a horizontal plate 626 from which forks 628 depend. Forks 628 have horizontal axle openings 630 to receive a horizontal axle 632 about which wheel 446 or 448 rotates about a horizontal axis.

Lower base portion 330A includes two stacked cylinder portions. One stacked cylinder portion is middle portion 634 that is sized to rotatably receive middle portion 360 of the upper base portion 332. The other stacked cylinder portion is bottom portion 636 that is sized to rotatably receive bottom portion 354 of upper base portion 332 such that a spring based button 356 spins for 360 degrees in bottom portion 636 and such that the top portion of button 356 rides on or adjacent to the lower edge of cylinder portion 634. The diameter of cylinder portion 634 is less than the diameter of cylinder portion 636 to provide a lower edge inwardly of the inner cylindrical surface of cylindrical portion 636. This lower inward edge is the edge upon which the top portion of button 356 rides or is adjacent to.

The bottom portion 354 includes the spring biased button 356, which button 356 includes an oblique face and an upper stop end such that, to lift the upper base portion 332 out of the lower base portion 330A, the spring biased button 356 is depressed until the upper stop end is pushed within the inside diameter of cylindrical portion 634, whereby the bottom portion 354 and middle portion 360 of the lower base portion 330A may be withdrawn from the bottom portion 634 and middle portion 360 of the upper base portion 332. The oblique face of button 356 permits the button 356 to be automatically depressed by the upper edge of cylinder portion 634 and thereby permits the wheel and fork arrangement of lower base portion 330A to automatically snap onto the frame 12.

As indicated, upper base portion 332 includes the cylindrical portion 360 or middle portion 360 that rotates in the associated cylindrical portion 634 of the lower base portion 330A. Integrally engaged on top of the cylindrical portion or middle portion 360 of the upper base portion 332 is an oblong leg receiver 362 for engaging one of the front leg support members 20 or front post 20.

Front or rear wheel 446, 448 is rotatable about horizontal axle 632. Front or rear wheel 446, 448 and forks 628 are spinnable for 360 degrees by the lower base portion 330A being spinnable for 360 degrees relative to upper base portion 332. Spinning by the lower base portion 330A occurs for 360 degrees, just like spinning by lower base portion 330 in FIGS. 23A, 23B, 24A, 24B, and 24C occurs about a full 360 degrees.

Bottom portion 636 includes first and second opposing windows 638 that provide finger access to first and second opposing spring biased buttons 356. When buttons 356 are depressed inwardly and recede within the upper horizontal edges of such windows 638 and within the inside diameter of cylindrical portion 634, the lower base portion 330A and forks 628 and its attendant wheel 446 or 448 may be removed from the upper base portion 332 and frame 12.

Upper base portion 332 and lower base portion 330A are lockable to each other so as to prevent spinning relative to each other by a lock 364. Lock 364 includes a slide 366 that engages a track 368 on lower portion 330A. Lock 364 further includes an L-shaped extension 370 on the upper base portion 332. Slide 366 engages extension 370 in a friction fit manner to fix the lower and upper base portions 330A, 332 against spinning relative to each other. When slide 366 is slid downwardly and disengaged from extension 370, but still engaged with track 368, lower and upper base portions 330A, 332 may spin relative to each other such that wheel 446 or 448 may spin. Lock 364 is disposed on rear portions of the lower and upper base portions 330A, 332.

As shown in FIGS. 49A and 49B, wheel arrangement 622 includes the locking assembly 450 as well as the vertical spin lock and unlock assembly 624. Such locking mechanism 450 is shown in detail in FIGS. 47A and 47B.

Figure 50:
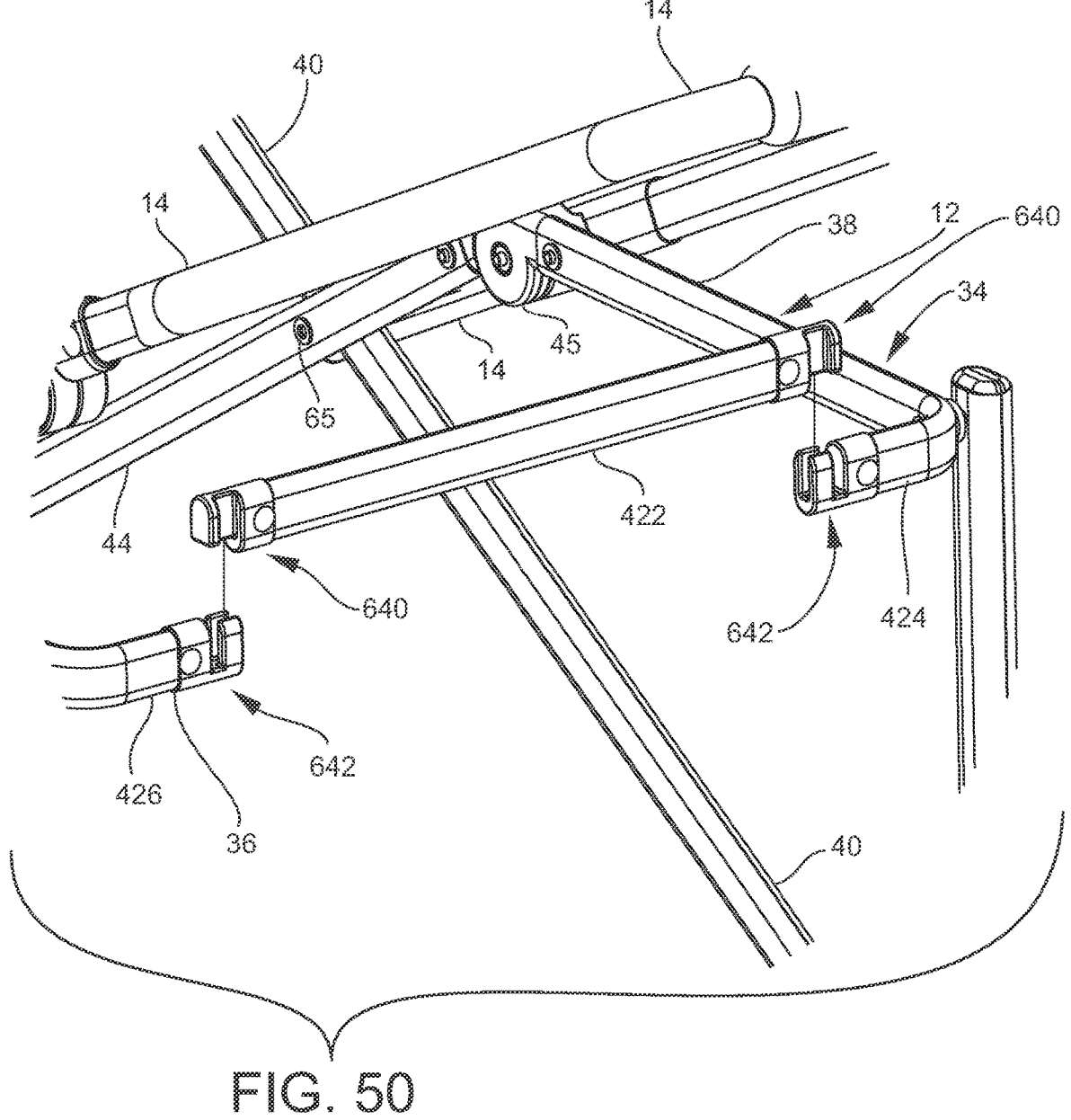
FIG. 50 is a perspective detail view of a frame portion of a rear door for the pet wagon of FIG. 1.

FIG. 50 shows middle support member 422, short support member 424, and short support member 426. Middle support member 422, short support member 424, and short support member 426 are part of rear U-shaped support member 34. Middle support member 422, short support member 424 and short support member 426 make up upper rear support member 36. Middle support member 422 is engagable to and disengagable from the frame 12 by first and second T-connections 640 and first and second Y-connections 642. Middle support member 422 includes a T-connection 640 at each of the ends of the main body of the middle support member 422. Each of the ends of the main body of the middle support member 422 works as a male connection and a portion of the T-connection 640 works as a female connection, which female portion is pinned, such as by a rivet, to the main body of the middle support member 422. The main body of each of the short or end support members 424, 426 works as a male connection and a portion of the Y-connection 642 works as a female connection, which female portion is pinned, such as by a rivet, to the main body of its respective short or end support member 424, 426. From its pinned portion, the Y-connection 642 extends inwardly and includes an upright U-shaped portion that is spaced from the pinned portion. From its pinned portion, the T-connection 640 extends outwardly and centrally and then fans out at a right angle into a frontwardly extending section and a rearwardly extending section. When the T-connection 640 and Y-connection 642 are engaged, the axis of the middle support member 422 is aligned with and makes a straight line with the axes of the short or end support members 424, 426. Middle support member 422 is disengaged from short or end support members 424, 426 by drawing the middle support member 422 upwardly. Pressure downwardly upon middle support member 422 does not disengage the middle support member 422 from the Y-connections 642. Drawing the end or short support members 424, 426 away from each other does not disengage the end or short support members 424, 426 from the middle support member 422. Pushing inwardly upon the end or short support members 424, 426 does not disengage the end or short support members 424, 426 from the middle support member 422. Pushing frontwardly or rearwardly upon the middle support member 422 does not disengage the middle support member 422 from the end of short support members 424, 426.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A foldable wagon, comprising:
    a) a frame that includes a folded out configuration and a folded in configuration, the foldable wagon being operable in the folded out configuration, the foldable wagon being in a compact state in the folded in configuration;
    b) the frame having front end support members, rear end support members, right side support members, left side support members, front corner support members, rear corner support members, and bottom support members;
    c) the frame having a first pivot location where right side support members are pivotally engaged, the frame having a second pivot location where the left side support members are pivotally engaged, the first pivot location being about one-half a distance between one of the front end support members and one of the rear end support members, the second pivot location being about one-half the distance between one of the front end support members and one of the rear end support members;
    d) a receptacle engaged to the frame, the receptacle being between the front end and rear end support members when the frame is in the folded out configuration, the receptacle being between the right side and left side support members when the frame is in the folded out configuration, the receptacle being on or above the bottom support members when the frame is in the folded out configuration;
    e) the receptacle being flexible such that the receptacle remains engaged to the frame when the frame is folded out to the folded out configuration from the folded in configuration and such that the receptacle remains engaged to the frame when the frame is folded in to the folded in configuration from the folded out configuration; and
    f) a handle engaged to the frame, the handle having first, second, and third handle support members, the third handle support member extending between the first and second handle support members, the first handle support member being pivotally engaged to the frame at the first pivot location, and the second handle support member being pivotally engaged to the frame at the second pivot location.

2. The foldable wagon of claim 1, wherein:
    a) the first handle support member includes a first elongate section, a second elongate section, and a first pivot connection, the first and second elongate sections of the first handle support member being engaged by the first pivot connection, the first and second elongate sections of the first handle support member extending away from the first pivot connection, the first elongate section of the first handle support member engaging the third handle support member, the second elongate section of the first handle support member being pivotally engaged to the frame;
    b) the second handle support member includes a first elongate section, a second elongate section, and a second pivot connection, the first and second elongate sections of the second handle support member being engaged by the second pivot connection, the first and second elongate sections of the second handle support member extending away from the second pivot connection, the first elongate section of the second handle support member engaging the third handle support member, the second elongate section of the second handle support member being pivotally engaged to the frame.

3. The foldable wagon of claim 2, wherein each of the first and second pivot connections are equidistant from the third handle support member such that the first elongate sections of the first and second handle support member may be pivoted as a unit relative to the second elongate sections of the first and second handle support members.

4. The foldable wagon of claim 2, wherein each of the first elongate sections of the first and second handle support members includes an underside and wherein each of the second elongate sections of the first and second handle support members includes an underside, and wherein the first elongate sections are pivotable as a unit about the first and second pivot connections such that the undersides of the first elongate sections can be drawn adjacent to the undersides of the second elongate sections.

5. The foldable wagon of claim 2, wherein:
a) the second elongate section of the first handle support member includes a first pivot opening for a first pivot pin for the first pivot location;
b) the second elongate section of the second handle support member includes a second pivot opening for a second pivot pin for the second pivot location;
c) the second elongate section of the first handle support member includes a first set of at least two button openings, the first set of button openings being between the first pivot opening and the connection;
d) the second elongate section of the second handle support member includes a second set of at least two button openings, the second set of button openings being between the second pivot opening and the connection;
e) each of the second elongate sections includes first and second portions that telescope relative to each other, one of the first and second portions having the button openings and the other of the first and second portions having a spring biased button engagable in the button openings to fix the first and second portions relative to each other, whereby each of the first and second handle support members can be extendible in length.

6. The foldable wagon of claim 1, and further comprising first and second handle rests, the first handle rest being engaged to a right side support member of the frame, the second handle rest being engaged to a left side support member of the frame, the first handle rest extending outwardly from the right side support member of the frame, the second handle rest extending outwardly from the left side support member of the frame, wherein:
a) the first handle rest is disposed at a location that is higher than the first pivot location;
b) the second handle rest is disposed at a location that is higher than the second pivot location;
c) the first handle support member is engagable on the first handle rest and is disposed at an oblique angle when the frame is in the folded out configuration, and
d) the second handle support member is engagable on the second handle rest and is disposed at an oblique angle when the frame is in the folded out configuration.

7. The foldable wagon of claim 1, wherein the first handle support member is engaged to the frame outwardly of the right side support members such that the first handle support member is disposed outwardly of the frame, and wherein the second handle support member is engaged to the frame outwardly of the left side support members such that the second handle support member is disposed outwardly of the frame.

8. A foldable wagon, comprising:
a) a frame that includes a folded out configuration and a folded in configuration, the foldable wagon being operable in the folded out configuration, the foldable wagon being in a compact state in the folded in configuration;
b) the frame having front end support members, rear end support members, right side support members, left side support members, first and second front corner support members, first and second rear corner support members, and bottom support members;
c) the frame having a first pivot location where right side support members are pivotally engaged, the frame having a second pivot location where the left side support members are pivotally engaged, the first pivot location being about one-half a distance between one of the front end support members and one of the rear end support members, the second pivot location being about one-half the distance between one of the front end support members and one of the rear end support members;
d) a receptacle engaged to the frame, the receptacle being between the front end and rear end support members when the frame is in the folded out configuration, the receptacle being between the right side and left side support members when the frame is in the folded out configuration, the receptacle being on or above the bottom support members when the frame is in the folded out configuration;
e) the receptacle being flexible such that the receptacle remains engaged to the frame when the frame is folded out to the folded out configuration from the folded in configuration and such that the receptacle remains engaged to the frame when the frame is folded in to the folded in configuration from the folded out configuration;
f) first and second fork arrangements depending respectively from the first and second front corner support members;
g) a pair of first and second front wheels, the first and second front wheels engaged to the first and second fork arrangements respectively, each of the first and second front wheels being independently spinnable about a vertical axis;
h) first and second receivers depending respectively from the first and second rear corner support members and engaging therein the first and second rear corner support members;
i) an axle engaging the first and second receivers and having first and second end portions;
j) a first rear wheel rotatably engaged on the first end portion of the axle and a second rear wheel rotatably engaged on the second end portion of the axle, a first receptor extending inwardly from the first rear wheel and a second receptor extending inwardly from the second rear wheel, the first receptor rigidly fixed to the first rear wheel and rotating therewith, the second receptor rigidly fixed to the second rear wheel and rotating therewith; and
k) first and second pedals pivotally engaged to the first and second receivers, each of the first and second pedals having a proximal end and a distal end, an elongate member engaged to and extending between the distal ends of the first and second pedals, each of the distal ends having an outwardly extending extension;
l) Such that when the elongate member is stepped upon the distal ends of the pedals are pivoted downwardly so as to pivot the proximal ends of the pedals upwardly such that the outwardly extending extensions of the pedals engage the first and second receptors that extend inwardly from the first and second rear wheels so as to brake or lock the pet wagon.

9. The foldable wagon of claim 8, wherein the first front corner support member and the first rear corner support member define a first plane, wherein the second front corner support member and the second rear corner support member define a second plane, wherein the vertical axis about which the first front wheel is spinnable being in the first plane, wherein the vertical axis about which the second front wheel is spinnable being in the second plane, wherein the first rear wheel rotates in a third plane that is disposed outwardly of the first plane, and wherein the second rear wheel rotates in a fourth plane that is disposed outwardly of the second plane.

10. The foldable wagon of claim 8, wherein the bottom support members define a plane, wherein the first and second front corner support members engage first and second fork arrangements at a location adjacent to the plane, and wherein the first and second rear corner support members engage the first and second receivers at a location below and spaced from the plane.

11. The foldable wagon of claim 8, wherein top portions of the first and second front wheels and top portions of the first and second rear wheels define a plane, where the first and second front corner support members engage first and second fork arrangements at respective locations above and spaced from the plane, and where the first and second rear corner support members engage the first and second receivers at respective locations below and spaced from the plane.

12. A foldable wagon, comprising:
   a) a frame comprising:
      i) first and second front corner posts;
      ii) first and second rear corner posts;
      iii) a lower front support member engaged to the first and second front corner posts;
      iv) a lower rear support member engaged to the first and second rear corner posts;
      v) a front U-shaped support member engaged to the first and second front corner posts and extending rearwardly therefrom, the front U-shaped support member having first and second rear ends;
      vi) a rear U-shaped support member engaged to the first and second rear corner posts and extending frontwardly therefrom, the rear U-shaped support member having first and second front ends;
      vii) a first oblique support member having front and rear ends, the front end of the first oblique support member being pivotally engaged to the first rear end of the front U-shaped support member, the rear end of the first oblique support member being pivotally engaged to the lower rear support member;
      viii) a second oblique support member having front and rear ends, the front end of the second oblique support member being pivotally engaged to the second rear end of the front U-shaped support member, the rear end of the second oblique support member being pivotally engaged to the lower rear support member;
      ix) a third oblique support member having front and rear ends, the rear end of the third oblique support member being pivotally engaged to the first front end of the rear U-shaped support member, the front end of the third oblique support member being pivotally engaged to the lower front support member;
      x) a fourth oblique support member having front and rear ends, the rear end of the fourth oblique support member being pivotally engaged to the second front end of the rear U-shaped support member, the front end of the fourth oblique support member being pivotally engaged to the lower front support member;
      xi) the first and third oblique support members being pivotally engaged at a first pivot location;
      xii) the second and fourth oblique support members being pivotally engaged at a second pivot location; and
   b) a flexible receptacle engaged to the frame for receiving a pet; and
   c) a handle engaged to the frame, the handle having first, second, and third handle support members, the third handle support member extending between the first and second handle support members, the first handle support member being pivotally engaged to the frame at the first pivot location, and the second handle support member being pivotally engaged to the frame at the second pivot location.

13. The foldable wagon of claim 12, and further comprising a support base, the support base comprising:
   a) a first base support member pivotally engaged to the lower front support member;
   b) a second base support member pivotally engaged to the lower front support member;
   c) a third base support member pivotally engaged to the lower rear support member and being pivotally engaged to the first base support member; and
   d) a fourth base support member pivotally engaged to the lower rear support member and being pivotally engaged to the third base support member.

14. The foldable wagon of claim 13, wherein the support base includes first and second front transverse support members extending to and between the first and second base support members.

15. The foldable wagon of claim 13, wherein the support base includes first and second rear transverse support members extending to and between the third and fourth base support members.

* * * * *